(12) United States Patent
Huttunen et al.

(10) Patent No.: US 10,051,407 B2
(45) Date of Patent: Aug. 14, 2018

(54) METHOD, APPARATUS, AND COMPUTER PROGRAM PRODUCT FOR MANAGEMENT OF CONNECTED DEVICES, SUCH AS IN A WIRELESS DOCKING ENVIRONMENT—INTELLIGENT AND AUTOMATIC CONNECTION ACTIVATION

(71) Applicant: Nokia Technologies Oy, Espoo (FI)

(72) Inventors: Juhani Huttunen, Veikkola (FI); Miraj Mostafa, Tampere (FI); Ari Aarnio, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/668,271

(22) Filed: Aug. 3, 2017

(65) Prior Publication Data
US 2017/0353822 A1 Dec. 7, 2017

Related U.S. Application Data

(60) Division of application No. 14/969,888, filed on Dec. 15, 2015, now Pat. No. 9,763,030, which is a (Continued)

(51) Int. Cl.
*H04B 7/00* (2006.01)
*H04W 4/00* (2018.01)
(Continued)

(52) U.S. Cl.
CPC ............ *H04W 4/008* (2013.01); *H04B 7/26* (2013.01); *H04M 1/7253* (2013.01); *H04W 4/80* (2018.02); *H04W 8/22* (2013.01)

(58) Field of Classification Search
CPC .......... H04W 4/008; H04W 8/22; H04B 7/26
See application file for complete search history.

(56) References Cited

U.S. PATENT DOCUMENTS 8,019,883 B1 9/2011 Margulis
8,462,734 B2 6/2013 Laine et al.
(Continued)

FOREIGN PATENT DOCUMENTS

GB 2499281 8/2013
WO WO2012153983 11/2012

*Primary Examiner* — Tuan Pham
(74) *Attorney, Agent, or Firm* — Locke Lord LLP

(57) ABSTRACT

Method, apparatus, and computer program product embodiments enable a wireless docking center device to manage one or more wireless and/or wired peripheral devices on behalf of a wireless dockee device. In an example embodiment, a wireless docking system may automatically provide only those peripherals to user's attention, which are in direct relation to user's activity and are meaningful to the user at each point in time. The set of offered peripherals may depend on the application, for example, video playing or web browsing, running in user's dockee device, such as a smartphone. An example embodiment may automatically take into account known user preferences/habits, location, etc. The selection of peripherals offered may automatically provide the best technical performance, for example, best quality display for a video. An example embodiment also enables the docking solution to allocate optimum peripheral resources on a dynamic usage basis for each user.

20 Claims, 36 Drawing Sheets

Related U.S. Application Data continuation of application No. 14/808,678, filed on Jul. 24, 2015, now Pat. No. 9,232,348, which is a continuation of application No. 13/973,439, filed on Aug. 22, 2013, now Pat. No. 9,131,335.

(51) Int. Cl.
  *H04B 7/26* (2006.01)
  *H04M 1/725* (2006.01)
  *H04W 8/22* (2009.01)
  *H04W 4/80* (2018.01)

(56) References Cited

U.S. PATENT DOCUMENTS

| | | |
|---|---|---|
| 8,554,970 B2 | 10/2013 | Suumaki et al. |
| 9,131,335 B2 | 9/2015 | Huttunen |
| 2006/0258289 A1 | 11/2006 | Dua |
| 2008/0195788 A1 | 8/2008 | Tamir et al. |
| 2008/0299951 A1 | 12/2008 | Karkanias et al. |
| 2009/0259612 A1 | 10/2009 | Hanson |
| 2009/0282371 A1 | 11/2009 | Curl |
| 2010/0057969 A1 | 3/2010 | Meiri et al. |
| 2010/0100200 A1 | 4/2010 | Kim et al. |
| 2010/0188567 A1 | 7/2010 | Ichimura et al. |
| 2011/0059800 A1 | 3/2011 | Anderson et al. |
| 2011/0069179 A1 | 3/2011 | Bathiche et al. |
| 2011/0125601 A1 | 5/2011 | Carpenter et al. |
| 2011/0238287 A1 | 9/2011 | Hayashi |
| 2011/0282526 A1 | 11/2011 | Mirle |
| 2012/0155443 A1 | 6/2012 | Cordeiro |
| 2012/0155643 A1 | 6/2012 | Hassan et al. |
| 2012/0265913 A1* | 10/2012 | Suumaki ............... H04W 4/08 710/303 |
| 2013/0016032 A1 | 1/2013 | Margulis |
| 2013/0166204 A1 | 6/2013 | Davies et al. |
| 2013/0204962 A1 | 8/2013 | Estevez et al. |
| 2013/0273847 A1 | 10/2013 | Le et al. |
| 2013/0309973 A1* | 11/2013 | Raveendran .......... H04M 1/723 455/41.2 |
| 2014/0146745 A1* | 5/2014 | Huang ................... H04L 63/20 370/328 |
| 2014/0170602 A1 | 6/2014 | Reed |
| 2014/0242911 A1 | 8/2014 | Holtman et al. |
| 2015/0072614 A1 | 3/2015 | Holtman et al. |

\* cited by examiner

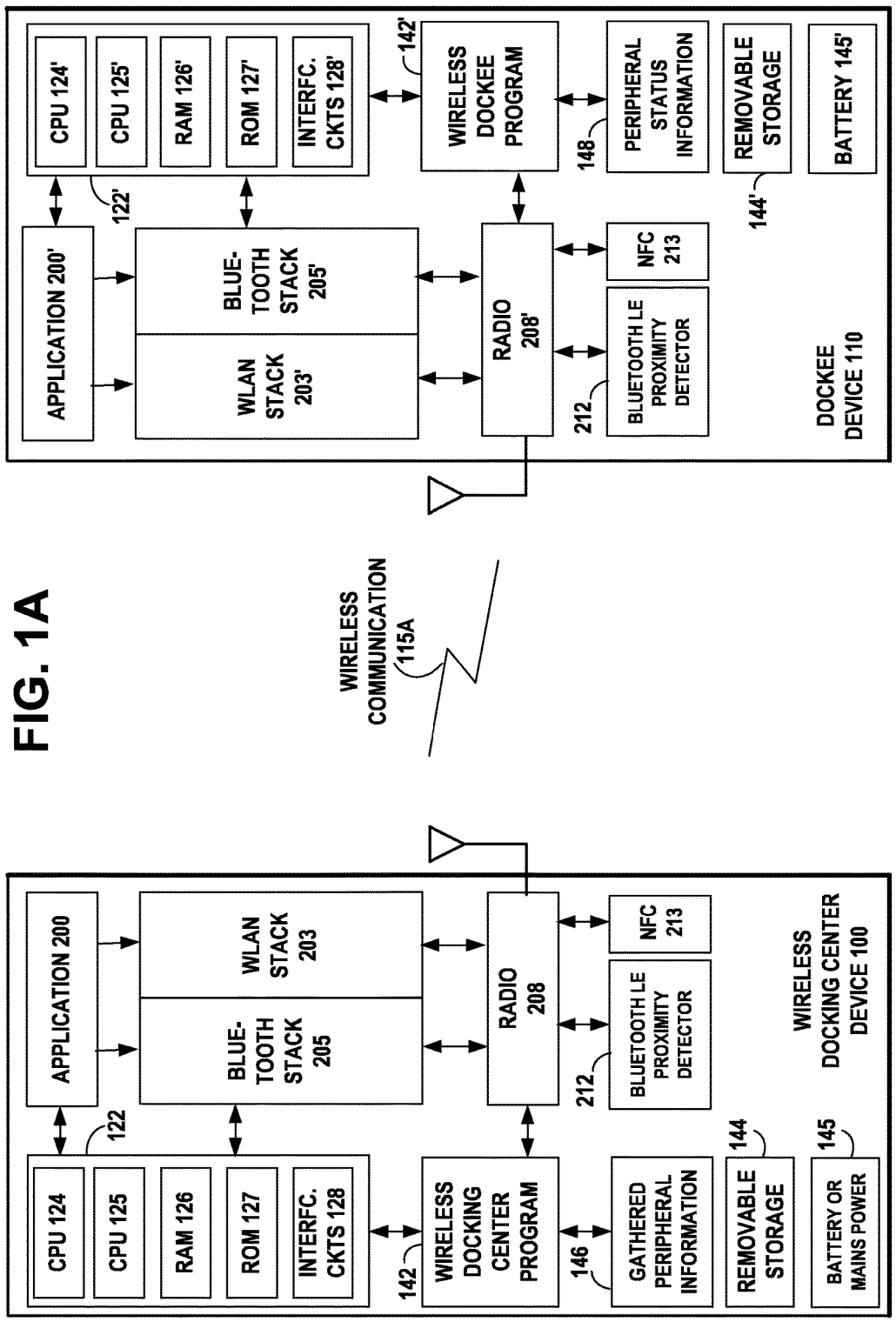

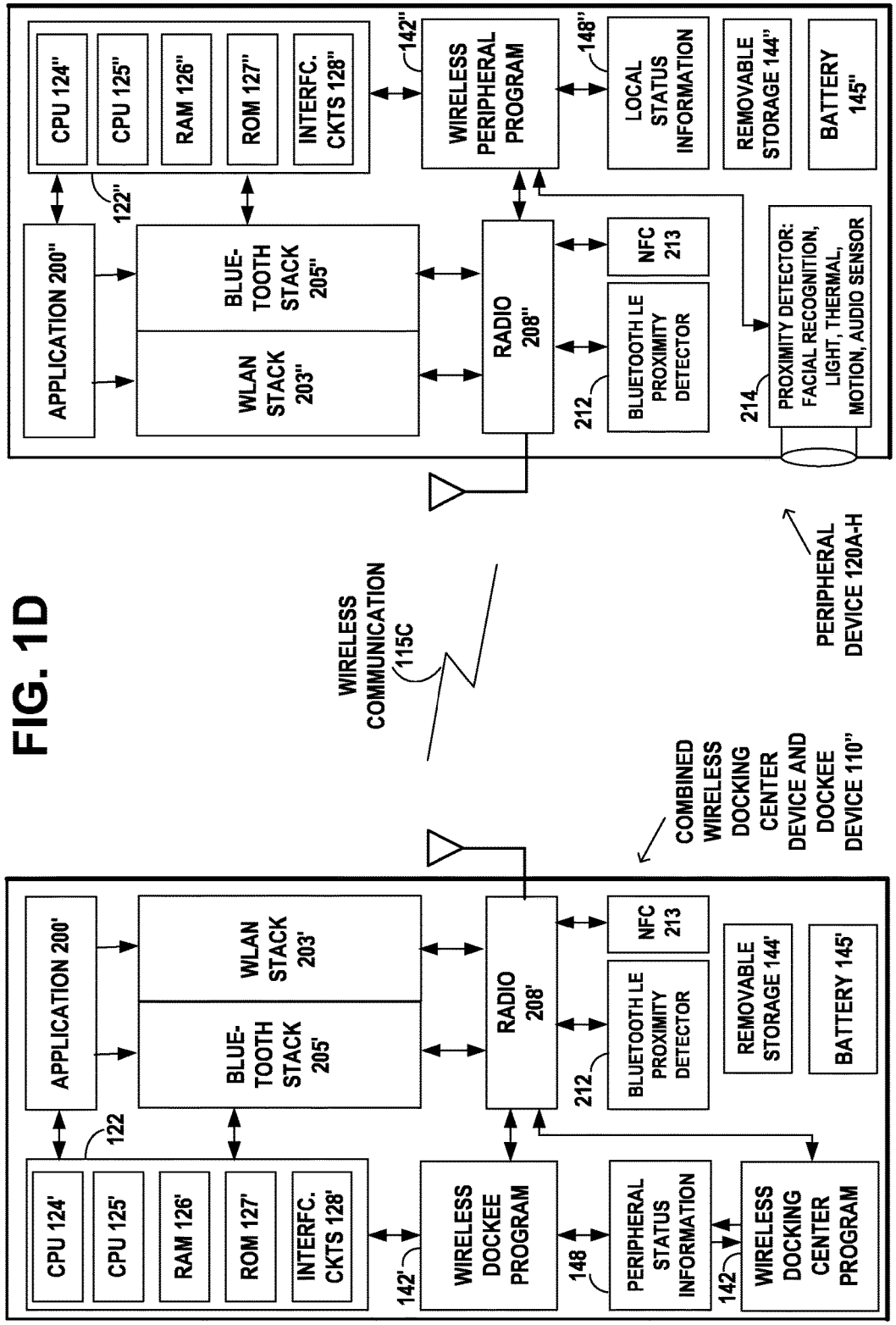

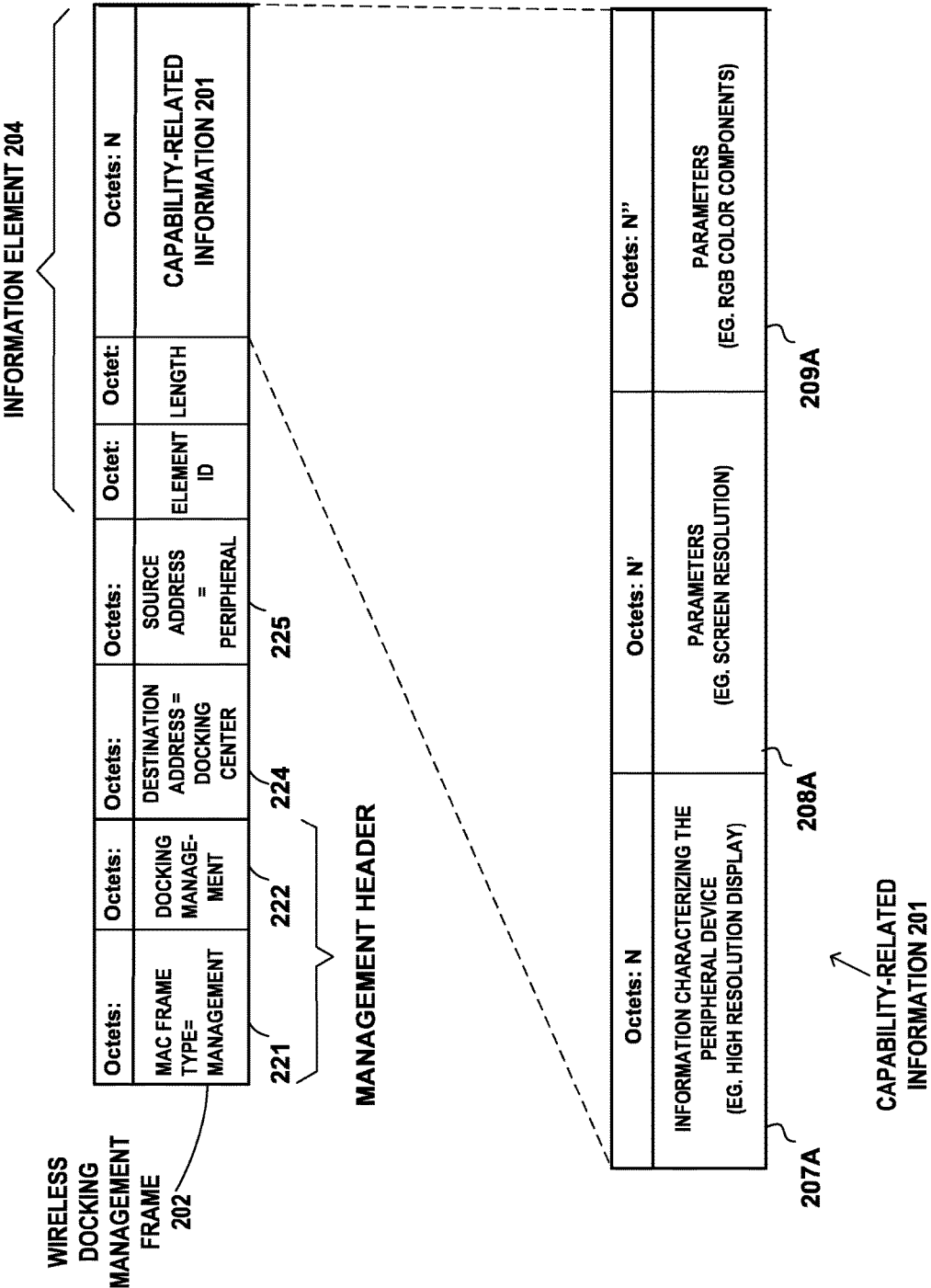
FIG. 1G1

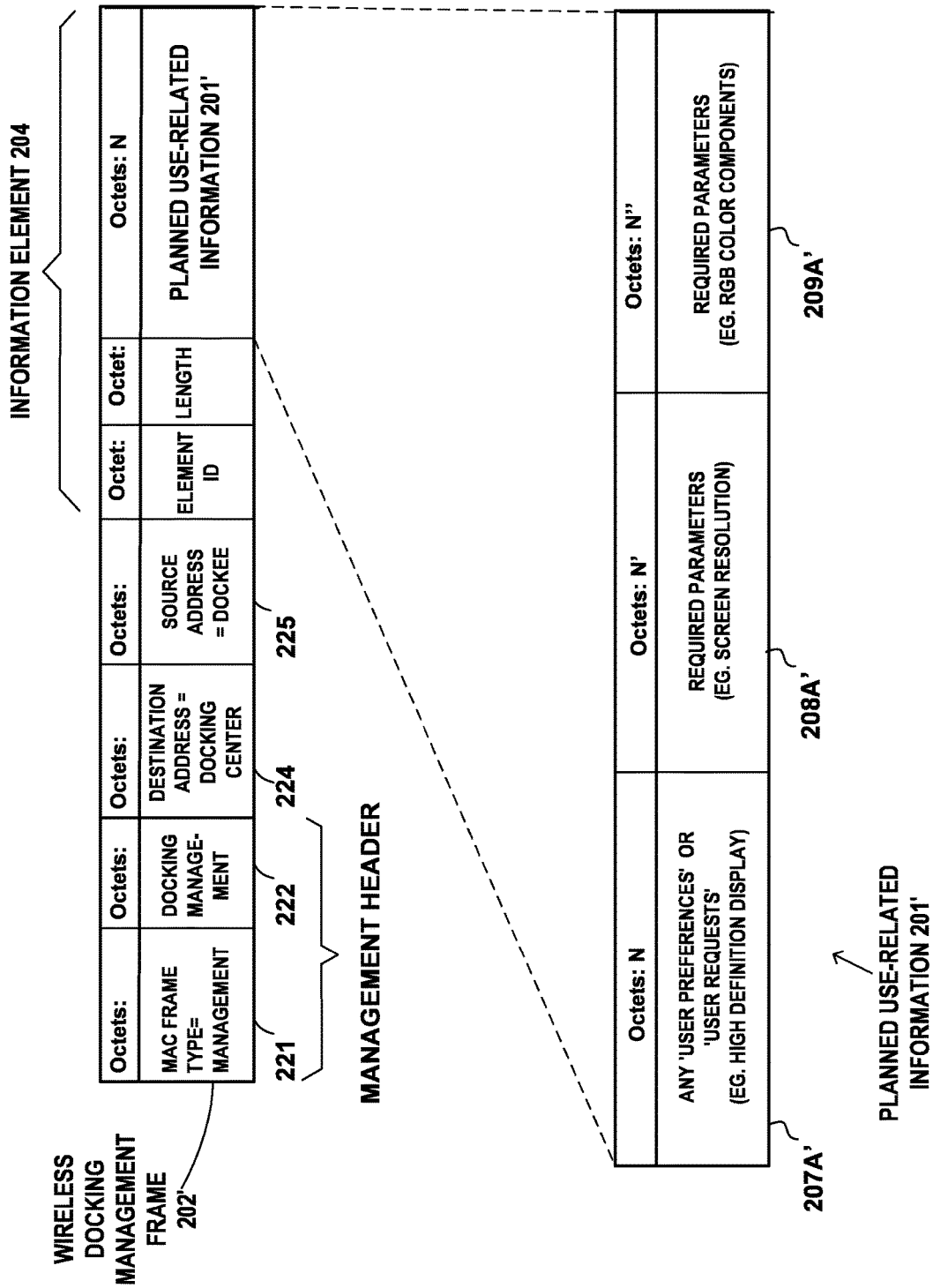

FIG. 1H

EXAMPLE PROCESS BY
WIRELESS DOCKING CENTER DEVICE

102

STEP 104: RECEIVING, BY A WIRELESS DOCKING CENTER DEVICE, AT LEAST FROM ONE OR MORE WIRELESS PERIPHERAL DEVICES, CAPABILITY-RELATED INFORMATION CHARACTERIZING AT LEAST THE ONE OR MORE WIRELESS PERIPHERAL DEVICES;

→

STEP 106: RECEIVING, BY THE WIRELESS DOCKING CENTER DEVICE, FROM A WIRELESS DOCKEE DEVICE, OR OTHER CAPABLE DEVICE, PLANNED USE-RELATED INFORMATION OF THE WIRELESS DOCKEE DEVICE; AND

→

STEP 108: ANALYZING, BY THE WIRELESS DOCKING CENTER DEVICE, THE RECEIVED CAPABILITY-RELATED INFORMATION AND PLANNED USE-RELATED INFORMATION, AND PERFORMING AN ACTION WITH RESPECT TO ONE OR MORE WIRELESS PERIPHERAL DEVICES CAPABLE OF PERFORMING AT LEAST A PORTION OF SERVICES REQUIRED BY THE PLANNED USE-RELATED INFORMATION OF THE WIRELESS DOCKEE DEVICE, BASED ON THE ANALYSIS.

FIG. 1I

EXAMPLE PROCESS BY
WIRELESS DOCKEE DEVICE

132

STEP 134: RECEIVING, BY A WIRELESS DOCKEE DEVICE, FROM A WIRELESS DOCKING CENTER DEVICE, CAPABILITY-RELATED INFORMATION CHARACTERIZING ONE OR MORE WIRELESS PERIPHERAL DEVICES;

STEP 136: ANALYZING, BY THE WIRELESS DOCKEE DEVICE, THE CAPABILITY-RELATED INFORMATION CHARACTERIZING THE ONE OR MORE WIRELESS PERIPHERAL DEVICES AND PLANNED USE-RELATED INFORMATION; AND

STEP 138: PERFORMING, BY THE WIRELESS DOCKEE DEVICE, AN ACTION WITH RESPECT TO ONE OR MORE WIRELESS PERIPHERAL DEVICES CAPABLE OF PERFORMING SERVICES REQUIRED BY THE PLANNED USE-RELATED INFORMATION, BASED ON THE ANALYSIS.

FIG. 1J

EXAMPLE PROCESS BY
COMBINED FUNCTION WIRELESS DEVICE

140

STEP 141: RECEIVING, BY A WIRELESS DEVICE, AT LEAST FROM ONE OR MORE WIRELESS PERIPHERAL DEVICES, CAPABILITY-RELATED INFORMATION CHARACTERIZING AT LEAST THE ONE OR MORE WIRELESS PERIPHERAL DEVICES;

STEP 143: GENERATING, BY THE WIRELESS DEVICE, PLANNED USE-RELATED INFORMATION; AND

STEP 147: ANALYZING, BY THE WIRELESS DEVICE, THE RECEIVED CAPABILITY-RELATED INFORMATION AND PLANNED USE-RELATED INFORMATION, AND PERFORMING AN ACTION WITH RESPECT TO ONE OR MORE WIRELESS PERIPHERAL DEVICES CAPABLE OF PERFORMING AT LEAST A PORTION OF SERVICES REQUIRED BY THE PLANNED USE-RELATED INFORMATION, BASED ON THE ANALYSIS.

FIG. 2B

PERIPHERAL
DEVICES 120A-H

| Devices | B / C | Charging status | Individual battery time | Operation mode | Trigger to charge | Next update | Docking | Remaining session time |
|---|---|---|---|---|---|---|---|---|
| Smartphone | B | | 10h | Normal | 10% | | WD | |
| Access Point | C | | | Normal | | | WDC | |
| Headset | B | | 1h | Sleep | 10% | 24h | P | |
| Keyboard | B | | 10d | Normal | 5% | 9d | P | 1h |
| Mouse | B | | 30d | Normal | 3% | 29d | P | |
| TV | C | | | | | | P | |
| Audio set | C | | | | | | P | |
| Printer | C | | | | | | P | |
| Memory | B | | 30d | Inactive | 3% | 29d | P | |

B = chargeable battery
C = wired (cable)

WD = Wireless Dockee
WDC = Wireless Docking Center
P = Peripheral

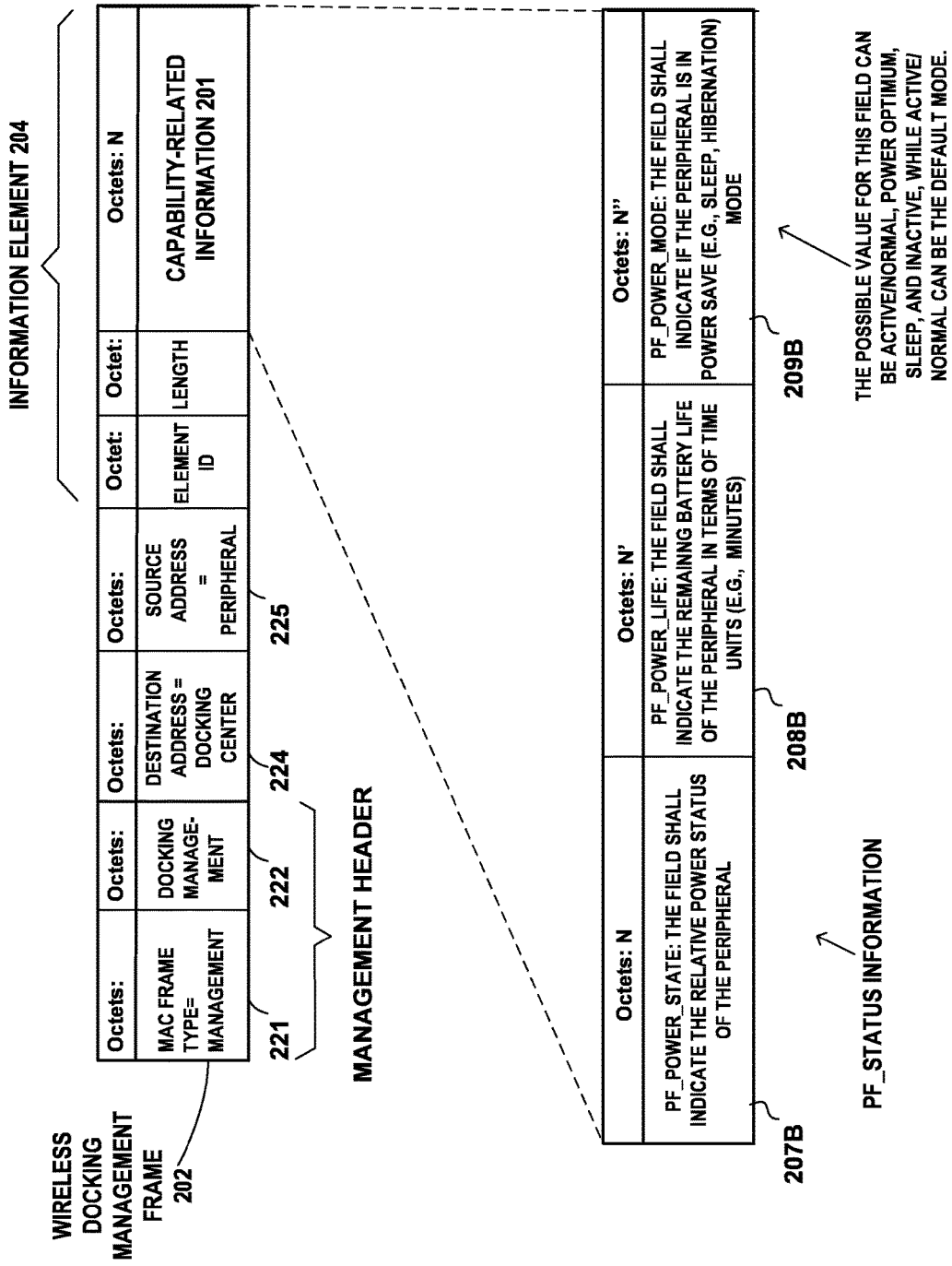
FIG. 2E1

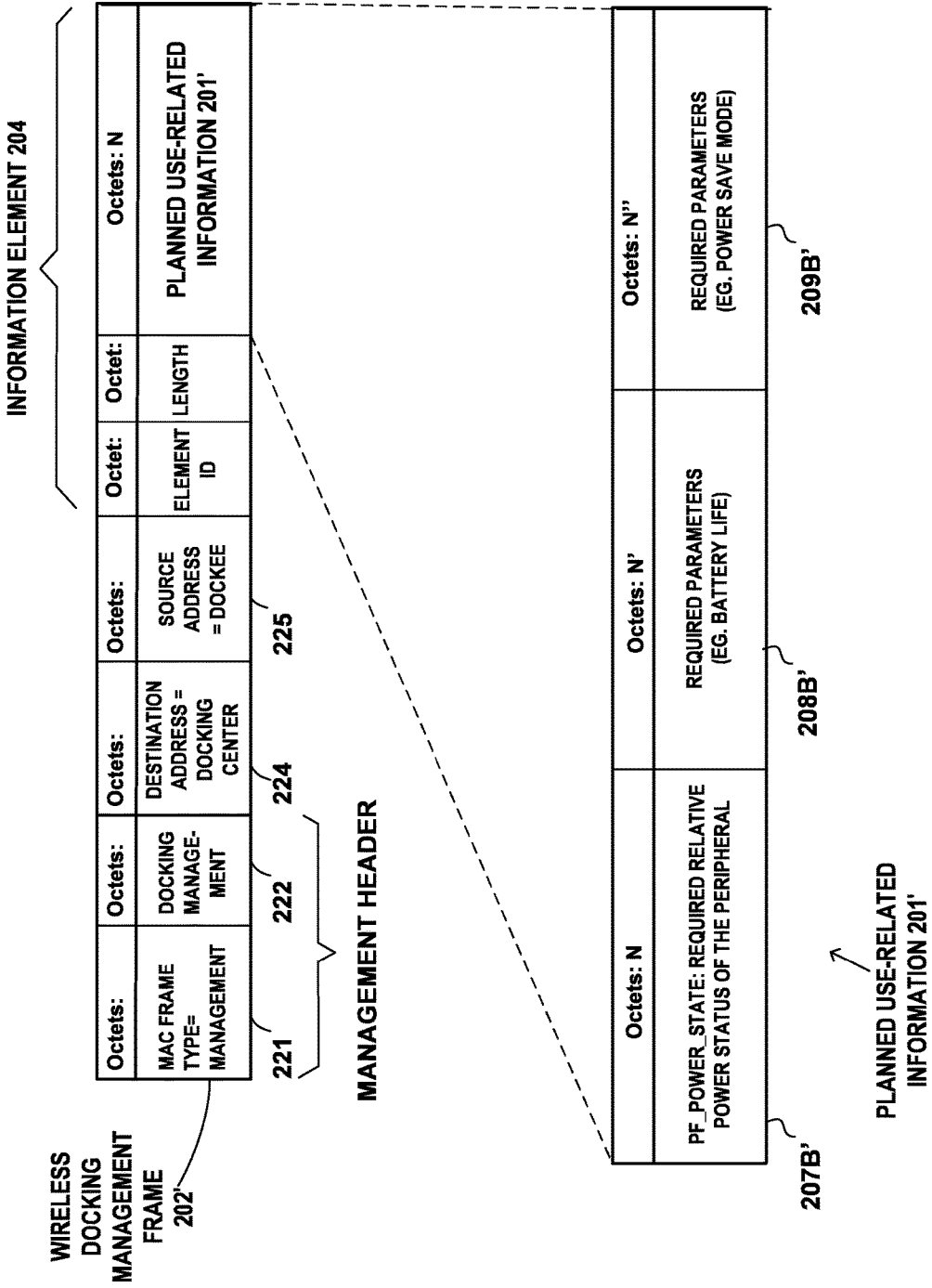
FIG. 2E2

FIG. 3C
PERIPHERAL DEVICES 120A-H

| Peripheral | Application Identifiers | Display low/high | Audio low/high | Text input | Trick modes | Point Scroll | User Preferences |
|---|---|---|---|---|---|---|---|
| Big screen TV | Video, picture gallery, game, web browsing, document editing, e-mail, | x | x | | | | Video and gaming, picture gallery during weekly get-together(Saturday) |
| Monitor | Video, picture gallery, game, web browsing, document editing, e-mail, | x | | | | | Web browsing, document editing, picture gallery |
| Keyboard | E-mail, document editing | | | x | | | |
| Mouse | Web browsing, document editing | | | | | x | |
| Mass storage | Document editing, content store | | | | | | |
| Headset | Music, video audio, call | | x | | | | Calls always, Music and video audio after 21:00 |
| Hi-Fi audio system | Music, video audio, call | | x | | | | Music |
| Remote controller | Video, music, picture gallery, call | | | | x | x | |
| Game controller | game | | | | x | x | |

FIG. 3D

PERIPHERAL DEVICES 120A-H

| Application | Display med/high | Audio med/high | Text input | Txt/ch match | Point Scroll | Game control | User Preferences | Peripherals |
|---|---|---|---|---|---|---|---|---|
| Video | x | x | | x | | | -Default<br>-Headset after 21:00 | -Big screen TV, Hi-fi audio<br>-Monitor, Head-set<br>-Remote controller, mouse |
| Picture gallery | x | x | | x | x | | -Get together<br>-Default | -Big screen TV, Hi-fi audio<br>-Monitor, Head-set<br>-Remote controller, mouse |
| Game | x | x | | | | x | -Default | -Big screen TV, Hi-fi audio<br>-Monitor, Head-set<br>-Game controller(s) |
| Web browsing | x | | | | x | | -Default | -Monitor<br>-Big screen TV<br>-Mouse |
| Document editing | x | | x | | x | | -Default | -Monitor<br>-Big screen TV<br>-Keyboard<br>-Mouse<br>-Mass storage |
| E-mail | x | | x | | | | | -Monitor<br>-Big screen TV<br>-Keyboard |
| Music | | x | | x | x | | -Default<br>-After 21:00 | -Hi-fi audio system<br>-Headset<br>-Remote controller |
| Call | | x | | x | | | -Default | -Hi-fi audio system<br>-Headset<br>-Remote controller |

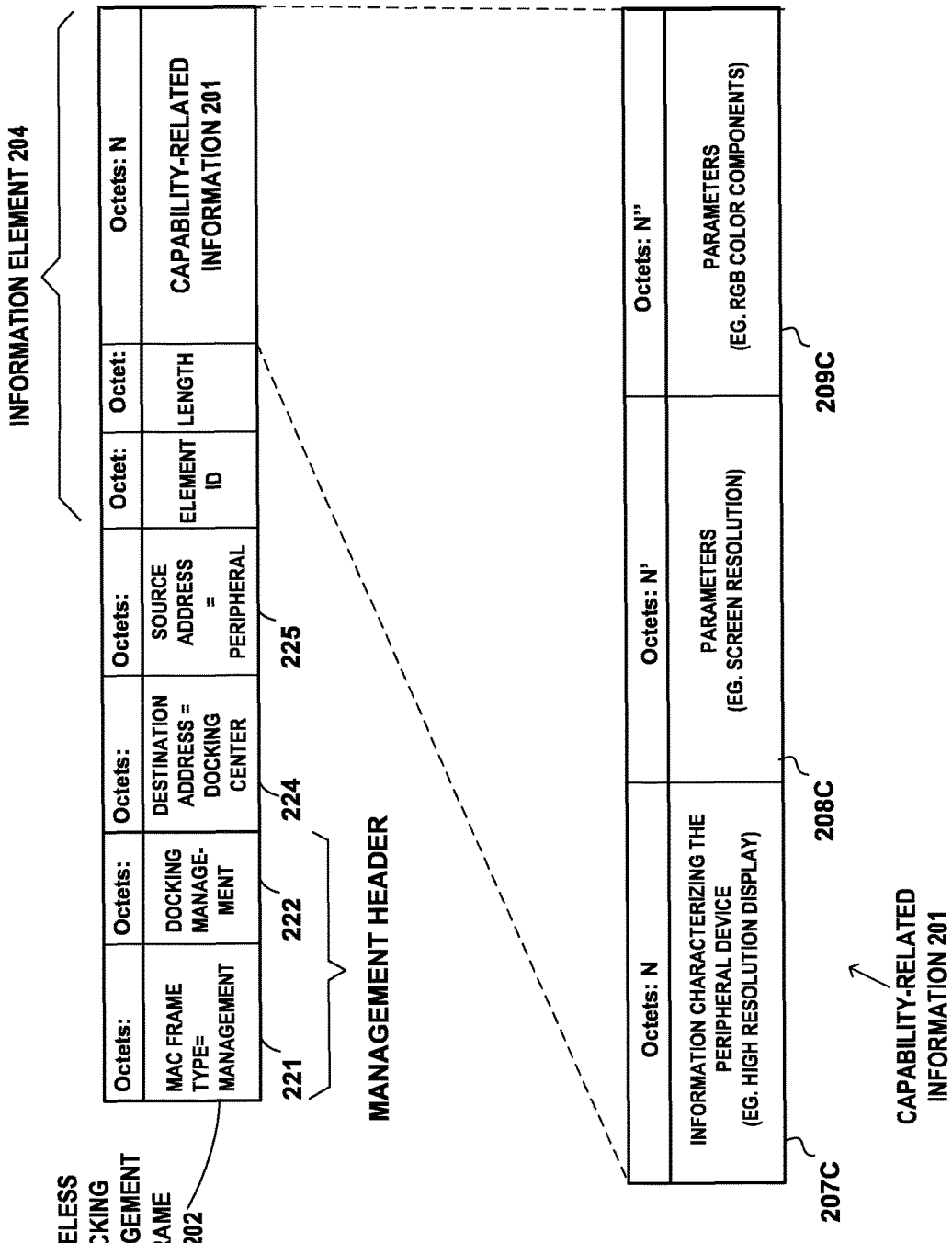
FIG. 3E1

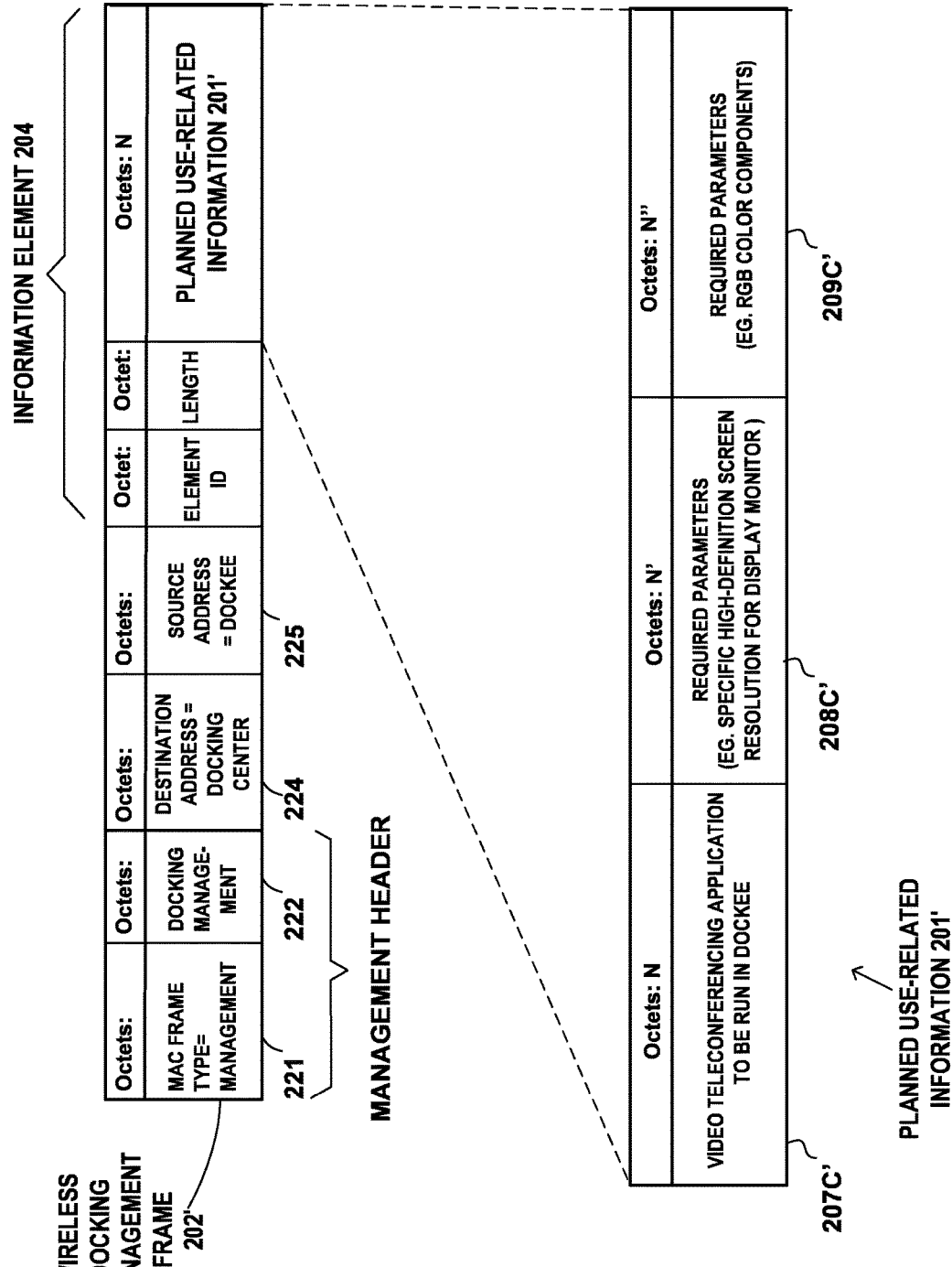
FIG. 3E2

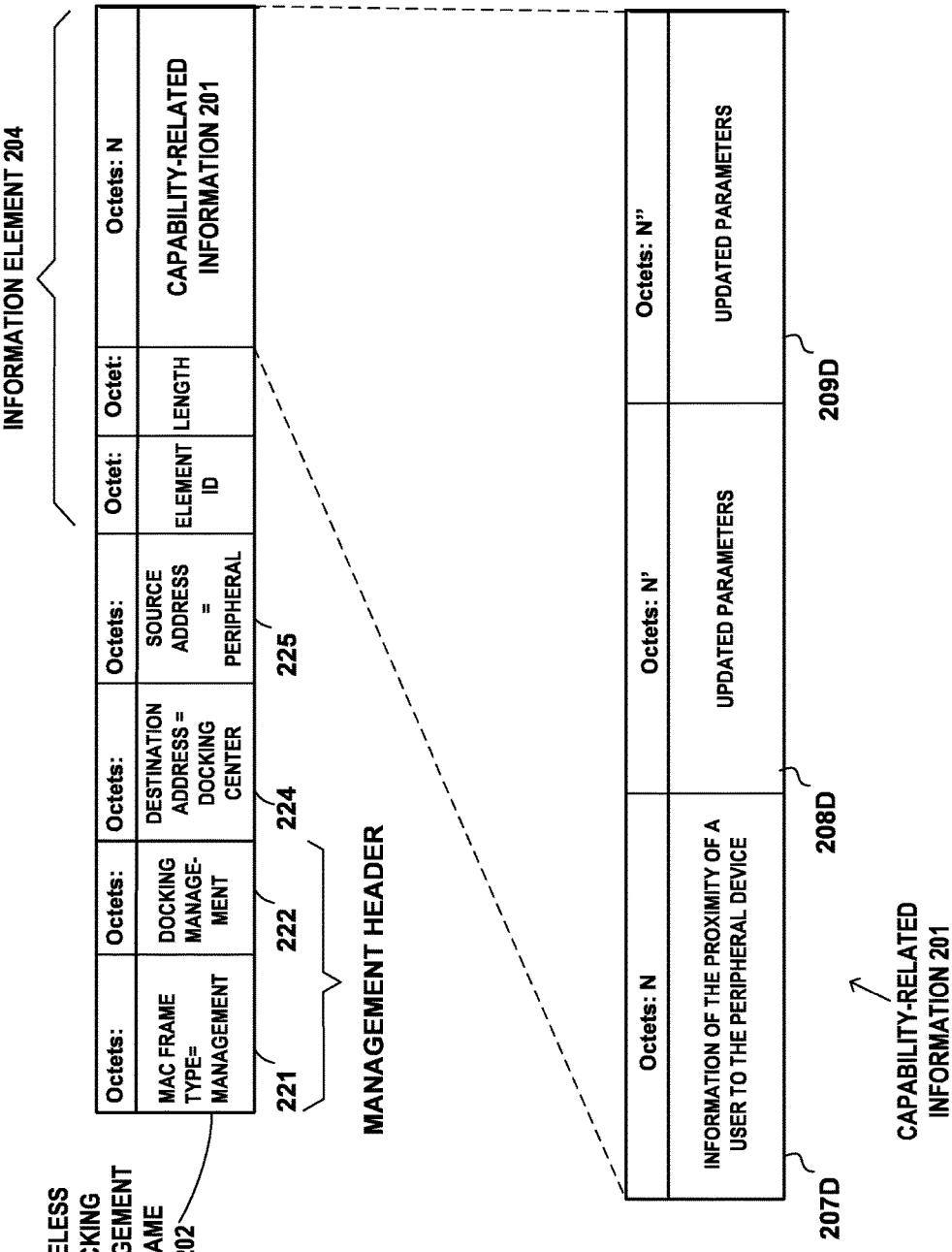
FIG. 4B1

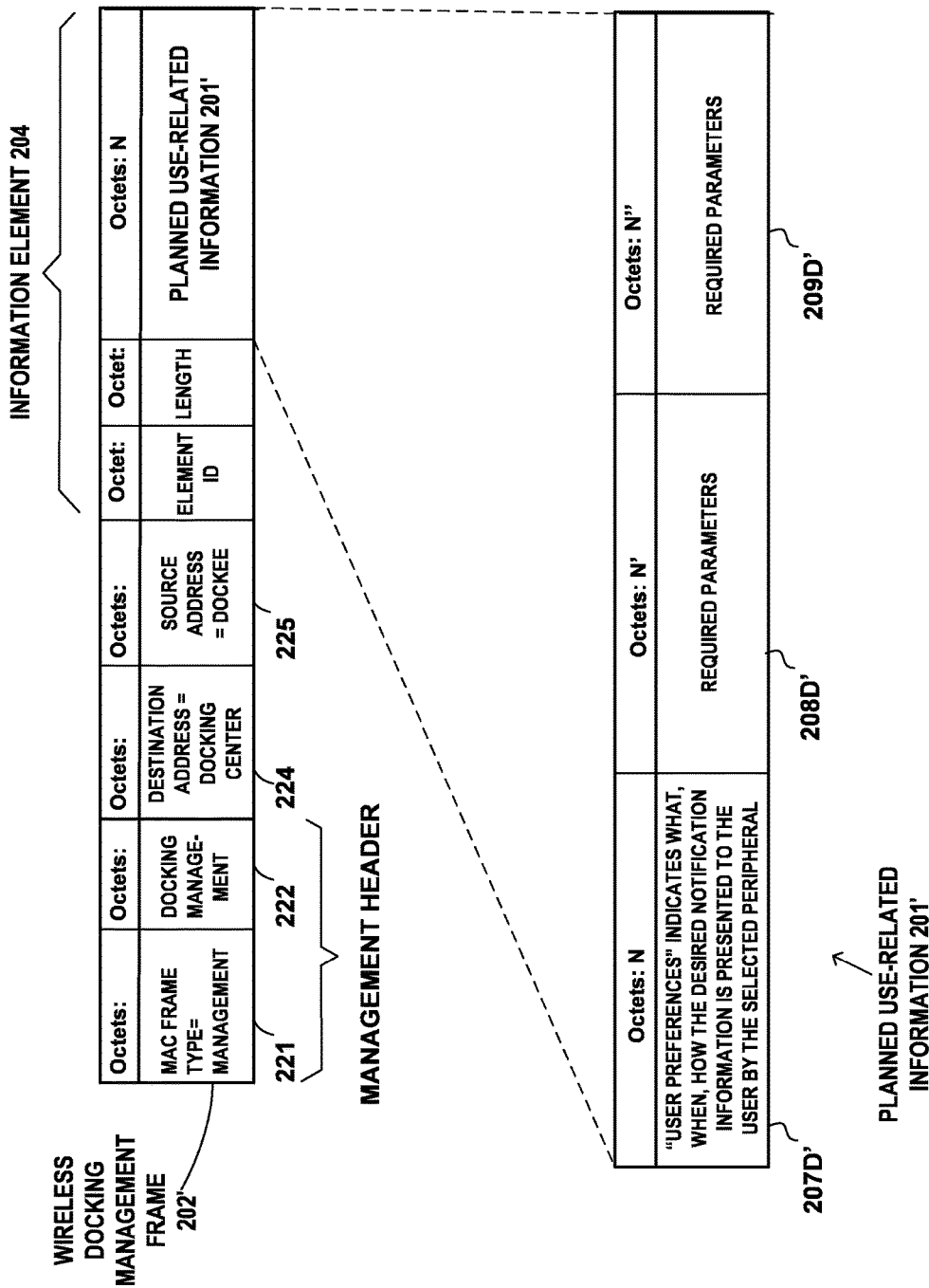

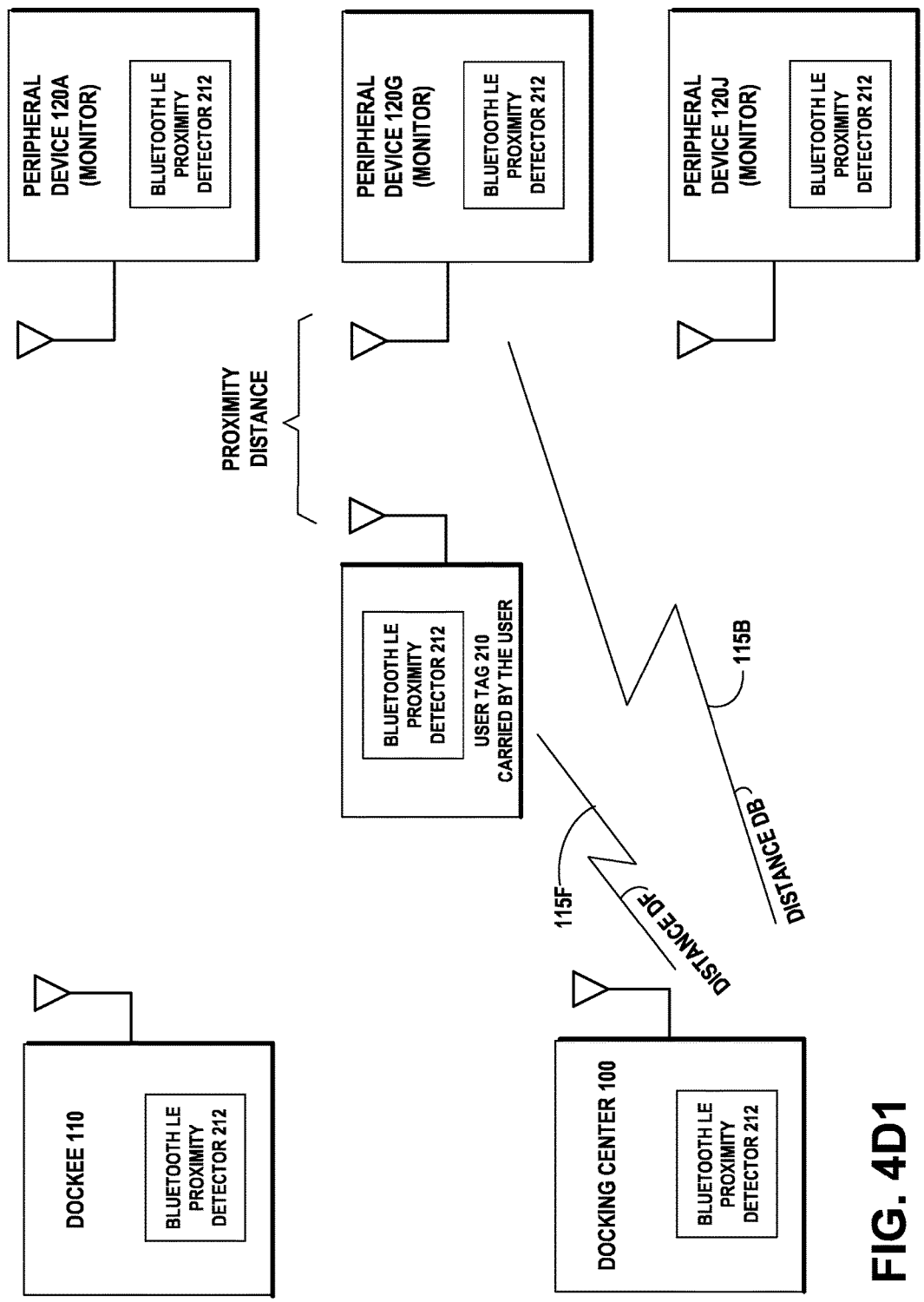

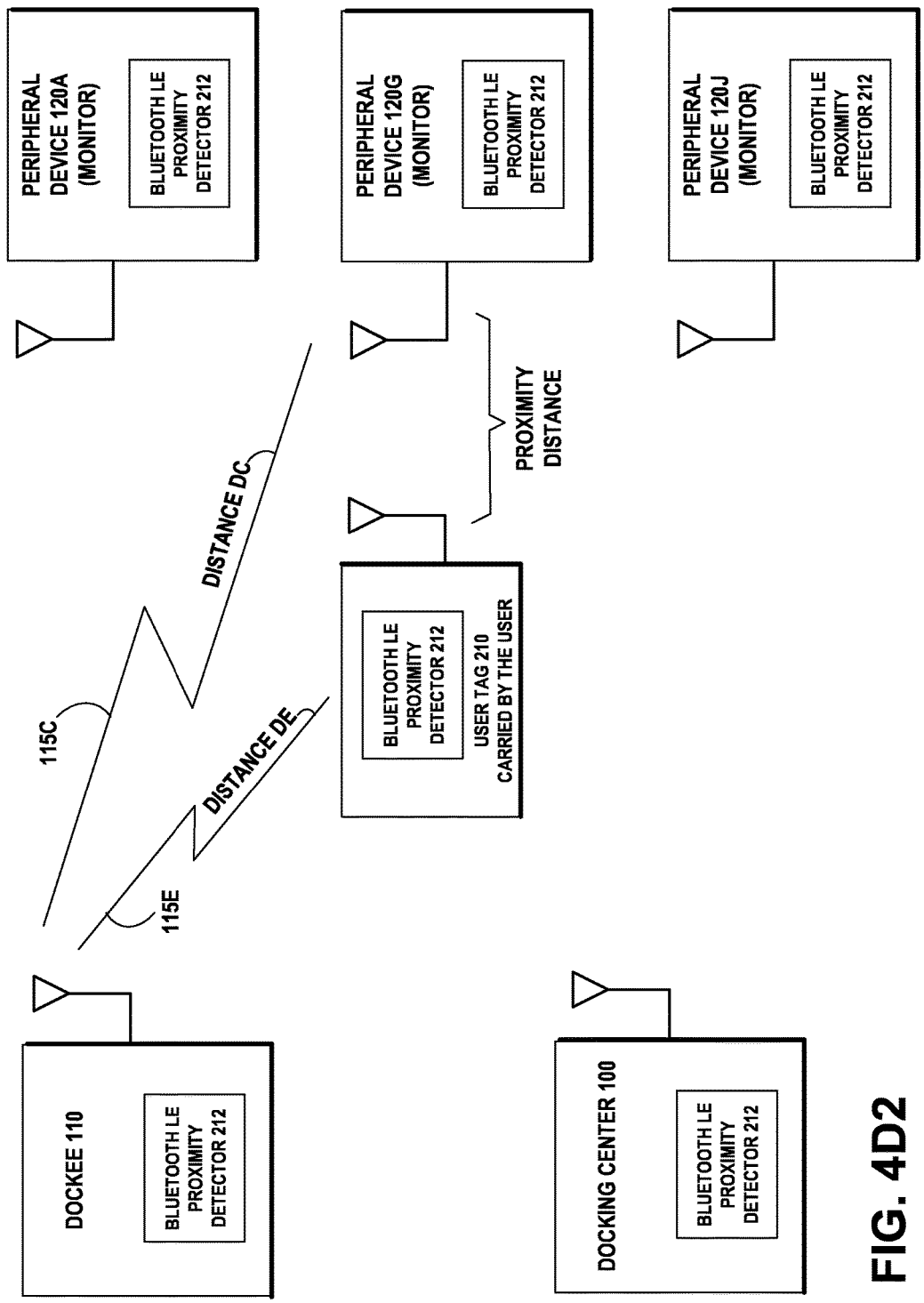
FIG. 4D2

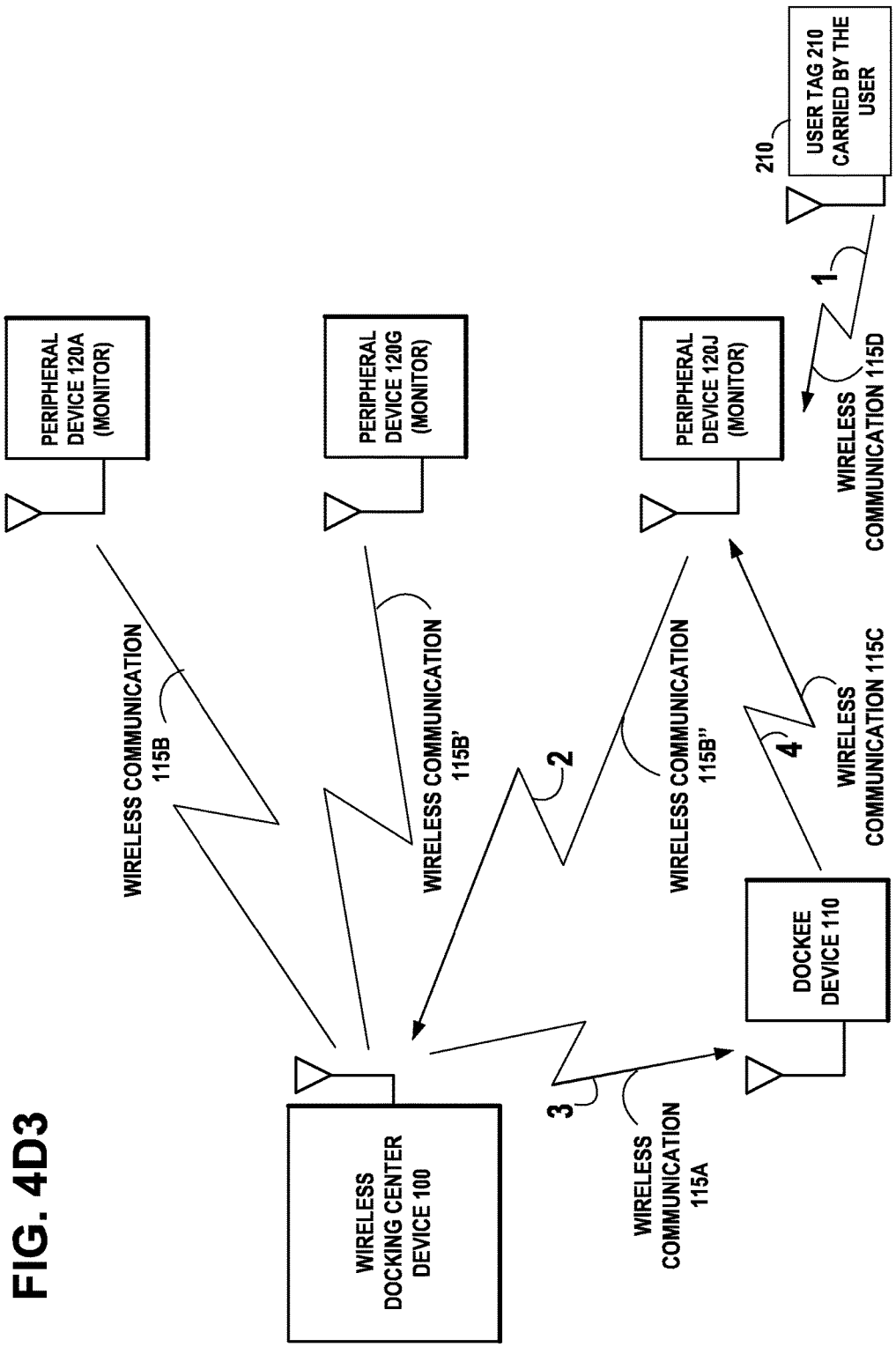
FIG. 4D3

METHOD, APPARATUS, AND COMPUTER PROGRAM PRODUCT FOR MANAGEMENT OF CONNECTED DEVICES, SUCH AS IN A WIRELESS DOCKING ENVIRONMENT—INTELLIGENT AND AUTOMATIC CONNECTION ACTIVATION

PRIORITY

The present U.S. Patent Application is a divisional of copending U.S. patent application Ser. No. 14/969,888, filed Dec. 15, 2015, which is a continuation of U.S. patent application Ser. No. 14/808,678, filed on Jul. 24, 2015, now U.S. Pat. No. 9,232,348 issued on Jan. 5, 2016, which is a continuation of U.S. patent application Ser. No. 13/973,439, filed on Aug. 22, 2013, now U.S. Pat. No. 9,131,335 issued on Sep. 8, 2015, and claims priority under 35 U.S.C. §120. The disclosures of the above priority applications are incorporated herein, in entirety, by reference.

FIELD

The field of the invention relates to wireless communication, and more particularly to management of one or more wireless devices in a wireless docking environment.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2nd Generation digital cellular network communicating in the 900 MHZ/1.8 GHZ bands in Europe and at 850 MHz and 1.9 GHZ in the United States. The 3rd and 4th Generation digital cellular network communication technologies have evolved from GSM. While long-range communication networks, like the 3rd and 4th Generation digital cellular network technologies, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wideband (UWB), ZigBee (IEEE 802.15.4, IEEE 802.15.4a), NFC (Near Field Communication), and ultra-high frequency radio frequency identification (UHF RFID) technologies. All of these wireless communication technologies have features and advantages that make them appropriate for various applications.

Due to the limitation of size and available power in a battery powered handheld device, sometimes multiple devices may be connected locally to complement each other. For example, a smartphone or a tablet may be connected to a big screen monitor and a regular keyboard for user convenience. Docking is one example of such a connected device environment, where a central device, such as a laptop, tablet, or smartphone, may be connected to one or more peripheral devices to provide additional features, functions and flexibility to a user. All of the connected devices in the docking environment, appear as one virtual feature-rich device to a user.

Traditionally, docking station hardware has been used to plug in a laptop computer for use as a desktop computer, and to directly connect it with peripherals such as a monitor, keyboard, mouse, and other common peripherals. With the availability of powerful handheld devices, such as smartphones and tablets, there is an increasing trend to provide wireless docking, using Wi-Fi for example, to connect diverse types of portable devices. In wireless docking, a Wireless Docking Center (WDC), which may be implemented as a stand-alone device, may manage a set of peripherals and a Wireless Dockee (WD), such as a laptop or smart phone, to connect the Wireless Dockee (WD) to the set of peripherals.

SUMMARY

Method, apparatus, and computer program product embodiments enable a wireless docking center device to manage one or more wireless and/or wired peripheral devices on behalf of a wireless dockee device. In an example embodiment of the invention, a wireless docking system may automatically provide only those peripherals to user's attention, which are in direct relation to user's activity and are meaningful to the user at each point in time. The set of offered peripherals may depend on the application, for example, video playing or web browsing, running in user's dockee device, such as a smartphone. An example embodiment of the invention may automatically take into account known user preferences/habits, location, etc. The selection of peripherals offered may automatically provide the best technical performance, for example, best quality display for a video. An example embodiment of the invention also enables the docking solution to allocate optimum peripheral resources on a dynamic usage basis for each user.

Docking Center Method

An example embodiment of the invention includes a method comprising:

receiving, by a wireless docking center device, from one or more wireless peripheral devices, capability-related information characterizing the one or more wireless peripheral devices;

receiving, by the wireless docking center device, from a wireless dockee device, an identification of an application to be executed by the wireless dockee device; and analyzing, by the wireless docking center device, the received capability-related information and identification of the application to be executed by the wireless dockee device, and performing an action with respect to one or more wireless peripheral devices capable of performing services required by the identification of an application to be executed by the wireless dockee device, based on the analysis.

Docking Center Apparatus

An example embodiment of the invention includes an apparatus comprising:

at least one processor;

at least one memory including computer program code;

the at least one memory and the computer program code configured to, with the at least one processor, cause the apparatus at least to:

receive from one or more wireless peripheral devices, capability-related information characterizing the one or more wireless peripheral devices;

receive from a wireless dockee device, an identification of an application to be executed by the wireless dockee device; and analyze the received capability-related information and identification of the application to be executed by the wireless dockee device, and performing an action with respect to one or more wireless peripheral devices capable of performing services required by the identification of an application to be executed by the wireless dockee device, based on the analysis.

Docking Center Program Product

An example embodiment of the invention includes a computer program product comprising computer executable program code recorded on a computer readable non-transitory storage medium, the computer executable program code comprising:

code for receiving, by a wireless docking center device, from one or more wireless peripheral devices, capability-related information characterizing the one or more wireless peripheral devices;

code for receiving, by the wireless docking center device, from a wireless dockee device, an identification of an application to be executed by the wireless dockee device; and code for analyzing, by the wireless docking center device, the received capability-related information and identification of the application to be executed by the wireless dockee device, and performing an action with respect to one or more wireless peripheral devices capable of performing services required by the identification of an application to be executed by the wireless dockee device, based on the analysis.

Dockee Method

An example embodiment of the invention includes a method comprising:

receiving, by a wireless dockee device, from a wireless docking center device, capability-related information characterizing one or more wireless peripheral devices;

analyzing, by the wireless dockee device, the capability-related information characterizing the one or more wireless peripheral devices and an identification of an application to be executed by the wireless dockee device; and performing, by the wireless dockee device, an action with respect to one or more wireless peripheral devices capable of performing services required by the application to be executed by the wireless dockee device, based on the analysis.

An example embodiment of the invention includes a method comprising:

receiving, by a wireless dockee device, from a wireless docking center device, capability-related information characterizing one or more wireless peripheral devices, wherein a battery-powered automobile is one of the one or more peripheral devices;

analyzing, by the wireless dockee device, the capability-related information characterizing the battery-powered automobile and an identification of an application to be executed by the wireless dockee device, including a map/navigation application; and performing, by the wireless dockee device, an action with respect to the battery-powered automobile, capable of performing services required by the map/navigation application to be executed by the wireless dockee device, based on the analysis, including finding a route for driving based on the map/navigation application.

Dockee Apparatus

An example embodiment of the invention includes an apparatus comprising:

at least one processor;

at least one memory including computer program code;

the at least one memory and the computer program code configured to, with the at least one processor, cause the apparatus at least to:

receive from a wireless docking center device, capability-related information characterizing one or more wireless peripheral devices;

analyze the capability-related information characterizing the one or more wireless peripheral devices and an identification of an application to be executed by the apparatus; and perform an action with respect to one or more wireless peripheral devices capable of performing services required by the application to be executed by the apparatus, based on the analysis.

Dockee Program Product

An example embodiment of the invention includes a computer program product comprising computer executable program code recorded on a computer readable non-transitory storage medium, the computer executable program code comprising:

code for receiving, by a wireless dockee device, from a wireless docking center device, capability-related information characterizing one or more wireless peripheral devices;

analyzing, by the wireless dockee device, the capability-related information characterizing the one or more wireless peripheral devices and an identification of an application to be executed by the wireless dockee device; and performing, by the wireless dockee device, an action with respect to one or more wireless peripheral devices capable of performing services required by the application to be executed by the wireless dockee device, based on the analysis.

Peripheral Device Method

An example embodiment of the invention includes a method comprising:

receiving, by a wireless peripheral device, a request from a wireless docking center device, to activate and announce its availability to a user, according to an identified application;

activating and announcing, by the wireless peripheral device, its availability to the user, according to the identified application; and transmitting, by the wireless peripheral device, to the wireless docking center device, in response to the request, an acknowledgement of the request, that the wireless peripheral devices can satisfy the request.

Peripheral Device Apparatus

An example embodiment of the invention includes an apparatus comprising:

at least one processor;

at least one memory including computer program code;

the at least one memory and the computer program code configured to, with the at least one processor, cause the apparatus at least to:

receive a request from a wireless docking center device, to activate and announce its availability to a user, according to an identified application;

activate and announce its availability to the user, according to the identified application; and transmit to the wireless docking center device, in response to the request, an acknowledgement of the request, that the apparatus can satisfy the request.

Peripheral Device Program Product

An example embodiment of the invention includes a computer program product comprising computer executable program code recorded on a computer readable non-transitory storage medium, the computer executable program code comprising:

code for receiving, by a wireless peripheral device, a request from a wireless docking center device, to activate and announce its availability to a user, according to an identified application;

code for activating and announcing, by the wireless peripheral device, its availability to the user, according to the identified application; and code for transmitting, by the wireless peripheral device, to the wireless docking center device, in response to the request, an acknowledgement of the request, that the wireless peripheral devices can satisfy the request.

BRIEF DESCRIPTION OF THE SEVERAL VIEWS OF THE DRAWINGS

FIG. 1A illustrates an example network diagram and functional block diagram of an example wireless docking center device and an example wireless dockee device, in accordance with an example embodiment of the invention.

FIG. 1D illustrates an example network diagram and functional block diagram of a combined wireless docking center device and wireless dockee device, the figure also showing the wireless peripheral device, in accordance with an example embodiment of the invention.

FIG. 1G1 illustrates an example format for a wireless docking management frame from a peripheral device to the docking center device, in accordance with an example embodiment of the invention.

FIG. 1G2 illustrates an example format for a wireless docking management frame from the dockee device to the docking center device, in accordance with an example embodiment of the invention.

FIG. 1H is an example flow diagram of a process in the wireless docking center device, in accordance with example embodiments of the invention.

FIG. 1I is an example flow diagram of a process in the wireless dockee device, in accordance with example embodiments of the invention.

FIG. 1J is an example flow diagram of a process by the combined function wireless device, in accordance with example embodiments of the invention.

FIG. 2B illustrates gathered peripheral information in a buffer of either or both the wireless docking center device and/or the wireless dockee device, the information having been gathered from one or more wireless peripheral devices for power management in a wireless docking network, in accordance with an example embodiment of the invention.

FIG. 2E1 illustrates an example format for a wireless docking management frame for power management from a peripheral device to the docking center device, in accordance with an example embodiment of the invention.

FIG. 2E2 illustrates an example format for a wireless docking management frame for power management from the dockee device to the docking center device, in accordance with an example embodiment of the invention.

FIG. 3C illustrates example application identifiers and corresponding example user preferences for an example intelligent and automatic connection activation operation in a wireless docking network, in accordance with an example embodiment of the invention.

FIG. 3D illustrates example applications and corresponding example operating parameters for an example intelligent and automatic connection activation operation in a wireless docking network, in accordance with an example embodiment of the invention.

FIG. 3E1 illustrates an example format for a wireless docking management frame for intelligent and automatic connection activation from a peripheral device to the docking center device, in accordance with an example embodiment of the invention.

FIG. 3E2 illustrates an example format for a wireless docking management frame for intelligent and automatic connection activation from the dockee device to the docking center device, in accordance with an example embodiment of the invention.

FIG. 4B1 illustrates an example format for a wireless docking management frame for information based on user proximity to a peripheral device from a peripheral device to the docking center device, in accordance with an example embodiment of the invention.

FIG. 4B2 illustrates an example format for a wireless docking management from the dockee device to the docking center device, in accordance with an example embodiment of the invention.

FIG. 4D1 illustrates an example network diagram of a wireless docking scenario where the wireless docking center device may determine that the user has approached the proximity of a peripheral device, in accordance with an example embodiment of the invention.

FIG. 4D2 illustrates an example network diagram of a wireless docking scenario where the wireless dockee device may determine that the user has approached the proximity of a peripheral device, in accordance with an example embodiment of the invention.

FIG. 4D3 illustrates an example network diagram of a wireless docking scenario where the wireless docking center device may automatically receive information of the proximity of the user to a particular one of the wireless peripheral devices, in accordance with an example embodiment of the invention.

Figure 1:
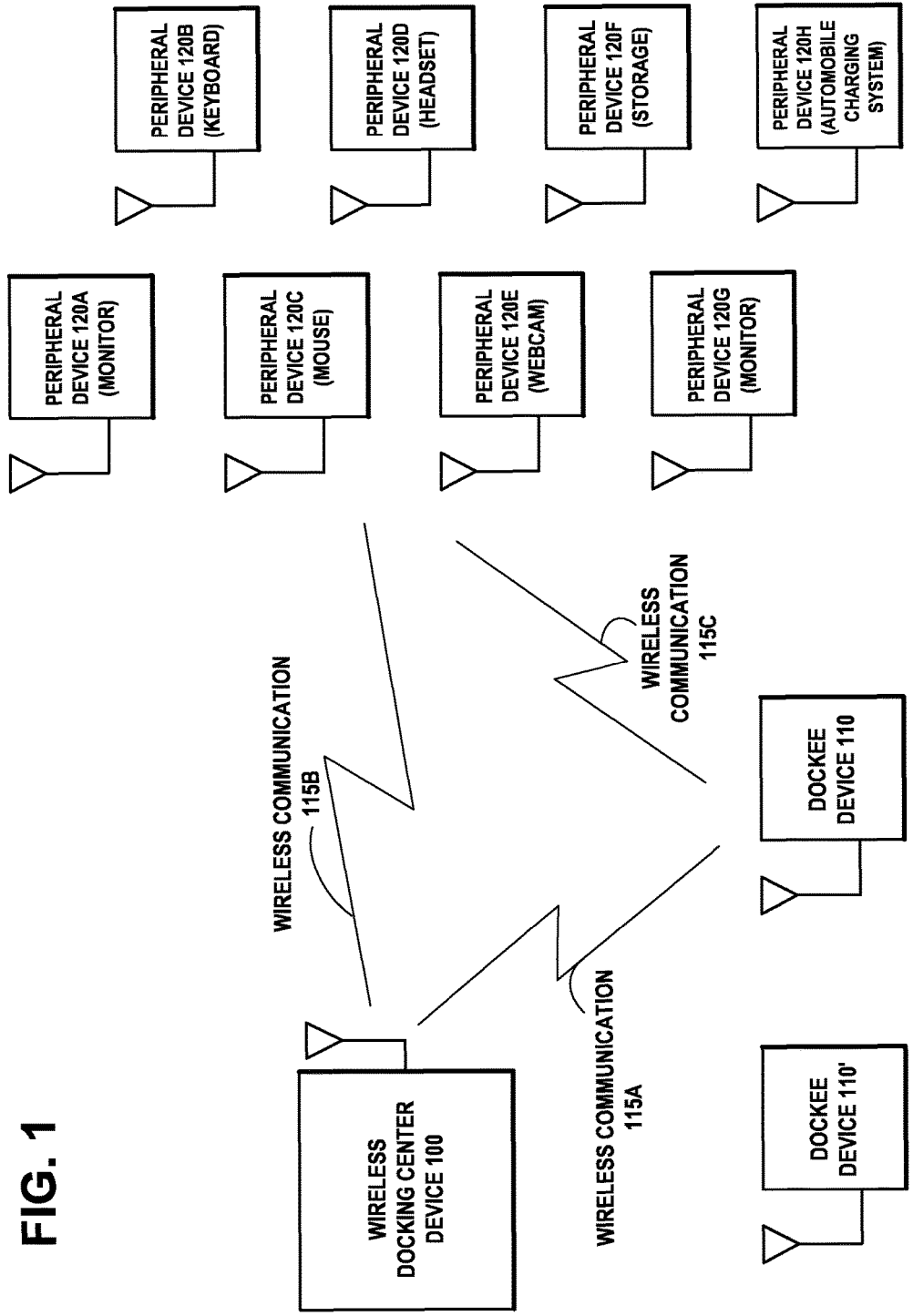
FIG. 1 illustrates an example network diagram of a wireless docking set-up, in accordance with an example embodiment of the invention.

DISCUSSION OF EXAMPLE EMBODIMENTS OF THE INVENTION:

In general, wireless docking provides the means of connecting a Wireless Dockee (WD) to a set of external peripheral devices (e.g., large screen monitor, keyboard, mouse, headset, external webcam, microphone, speaker, storage, game pad, printer) mostly for input/output purposes in different environments (e.g., home entertainment; home office; enterprise/corporate office; meeting room; public access workplaces like internet cafe, lounge, hotel, train, plane, bus; automotive environments). Here, WD means a range of portable devices like mobile phone, tablet, netbook, laptop, camera, camcorder, media player, game console. In traditional/legacy docking, a set of common peripherals are connected by wires to an electronic device (commonly called dock or docking station), and a portable device (mostly laptops) plugs-into the docking station to have connection with all the connected peripherals in one shot. As there is interesting and increasing trend of supporting wireless (e.g., Wi-Fi) by different kind of portable devices, a motivation for wireless docking is to have wireless connection between connected devices in a docking case. The intention is to improve user experience by having additional features, functions and flexibilities. In wireless docking, a logical entity, called Wireless Docking Center (WDC), manages a set of peripherals. A dockee device (WD) connects to the WDC to have access to the set or subset of all the peripherals managed by the WDC. In practice, WDC may be implemented in an independent physical device, or may be co-located in any other device (e.g., peripherals, WD). An example set-up of a wireless docking solution is shown in FIG. 1, where WDC is in an independent device. The term "docking", as used below, primarily means wireless docking.

This section is organized into the following topics:
A. WIRELESS DOCKING MANAGEMENT OF PERIPHERAL DEVICES
B. POWER MANAGEMENT IN WIRELESS DOCKING
C. INTELLIGENT AND AUTOMATIC CONNECTION ACTIVATION
D. NOTIFICATION BASED ON USER PROXIMITY TO PERIPHERAL DEVICE
E. REDIRECTING DATA TRANSMISSION BETWEEN PERIPHERALS A. Wireless Docking Management of Peripheral Devices FIG. 1 illustrates an example network diagram of a wireless docking set-up, showing examples of a wide variety of possible peripheral devices that may have either a wireless or wired connection to the docking center device, in accordance with an example embodiment of the invention. A wireless docking center device 100 may be in wireless communication 115A with one or more wireless dockee devices 110 and 110', and in wireless or wired communication 115B with one or more wireless peripheral devices 120A through 120H that may be respectively battery-powered. In accordance with an example embodiment of the invention, the wireless docking center device 100 may receive from the one or more wireless peripheral devices 120A-H, capability-related information characterizing the one or more wireless peripheral devices 120A-H. For example, the capability-related information may be power-related information of a respective battery powering the one or more peripheral devices 120A-H. The capability-related information may be a present charging state of a battery powering a high-definition display device 120A.

In accordance with an example embodiment of the invention, the wireless docking center device 100 may receive from the wireless dockee device 110, planned use-related information of the wireless dockee device. For example, planned use-related information may be an identity of a programmed application to be run on the wireless dockee device. An example application may be a video teleconferencing application that is scheduled to run for an hour on the wireless dockee device 110, using the high-definition display device 120A.

For example, planned use-related information may be when a music application is opened, it ma activate peripherals related to listening to the music. Planned use-related information may trigger short range communication between the wireless dockee device 110 and a respective peripheral and query its status (if the peripheral can be used in this service, i.e. if it has enough power, for example). In the music case, the wireless dockee device 110 may start to play the music. The wireless dockee device 110 may also inform the wireless docking center device of the power status of the wireless dockee device 110. If there is not sufficient power, the user may be provided with other options, i.e. charge the wireless dockee device 110 on a wireless charger. Alternately, the user may be provided a notification of headsets, stereos, or the like that nay be available nearby to use for music playing. The music application may present an icon of the headset or stereo on the display for selecting the option. In an example embodiment of the invention, the control of selecting the music piece may be in the wireless dockee device, but the audio may come from a headset and part of application service is in the wireless dockee device and part in the headset, for example.

In accordance with an example embodiment of the invention, the wireless docking center device 100 may formulate a specific status request to the one or more wireless peripheral devices 120A-H, based on the planned use-related information of the wireless dockee device 110. The wireless docking center device 100 accumulates capability information of the wireless peripheral devices 120A-H when requested by the wireless docking center device 100 or alternately by the wireless dockee device 110. Then the wireless docking center device 100 or the wireless dockee device 110 analyzes the capabilities and the planned use-related information and then allocates tasks or performs an action with respect to selected ones of the wireless peripheral devices 120A-H.

For example, the planned use-related information may be a video teleconferencing application that requires a specific high-definition screen resolution for the display monitor peripheral device. Although both peripheral devices 120A and 120G are display monitor peripheral devices, only display monitor peripheral device 120G has characteristics that may satisfy the specific status request. Thus, only display monitor peripheral device 120G is selected for its capability-related information characterizing its specific high-definition screen resolution. In one embodiment the mains current information of high-definition display device 120A, which usually is a TV, may provide mains current as power information. Other peripherals may have a similar situation. The mains current as power information may be used as one parameter in the dockee, for example, to decide the recommendation, display etc.

In accordance with an example embodiment of the invention, the wireless docking center device 100 may use the received capability-related information and planned use-related information, to manage the one or more wireless peripheral devices 120A-H. For example, the management of a portable, high-definition display device 120A may comprise analyzing, by the wireless docking center device 100 or the wireless dockee device 110, the received capability-related information and received planned use-related information to determine when the battery powering the portable, high-definition display device 120A will require recharging. The wireless docking center device 100, may provide to the wireless dockee device 110, information resulting from the analysis, for display by a user interface. The wireless docking center device 100 may provide to the portable, high-definition display device 120A, information resulting from the analysis, for reducing the rate of power consumption and/or recharging the battery powering the portable, high-definition display device 120A.

In an example embodiment of the invention, the wireless docking center device 100 may provide information resulting from the analysis, to the wireless dockee device 110 for display of selected ones of the one or more wireless peripheral devices 120A-H capable of performing services required by the planned use-related information of the wireless dockee device. The wireless docking center device 100 accumulates capability information of the wireless peripheral devices 120A-H when requested by the wireless docking center device 100 or alternately by the wireless dockee device 110. Then the wireless docking center device 100 or the wireless dockee device 110 analyzes the capabilities and the planned use-related information and then allocates tasks to selected ones of the wireless peripheral devices 120A-H.

FIG. 1A illustrates an example network diagram and functional block diagram of an example wireless docking center device and an example wireless dockee device, in accordance with an example embodiment of the invention. In example embodiments of the invention the dockee device may have a wireless connection to the docking center device. In example embodiments of the invention, either one of both of the wireless docking center device and the dockee device may include a Bluetooth Low Energy (LE) proximity detector. The wireless docking center device 100 may receive a request from the wireless dockee device 110 for status of the one or more wireless peripheral devices 120A-H. The wireless docking center device 100 may respond by transmitting to the wireless dockee device 110, information based on the information characterizing the one or more wireless peripheral devices specified in the request. For example, the wireless docking center device 100 may transmit to the wireless dockee device 110, power related information characterizing battery power of the battery powering the one or more wireless peripheral devices specified in the request.

The wireless docking center device 100 may include a processor 122, which includes a dual core or multi-core central processing unit 124 and 125, a random access memory (RAM) 126, a read only memory (ROM) 127, and interface circuits 128 to interface with one or more radio transceivers 208, battery or mains power 145 and optionally other power sources. In an example embodiment of the invention, the wireless docking center device 100 may also optionally include one or more of a key pad, touch screen, display, microphone, speakers, ear pieces, camera or other imaging devices, etc. The RAM and ROM may be removable memory devices 144, such as smart cards, SIMs, WIMs, semiconductor memories such as RAM, ROM, PROMS, flash memory devices, etc.

In accordance with an example embodiment of the invention, either or both of the wireless dockee device 110 and the wireless docking center device 100 may include one or both of a Bluetooth Low Energy (LE) proximity detector. They may optionally also include an NFC detector 213 for enabling basic docking, initiation and pairing between devices.

Example embodiments of the wireless docking center program 142, application 200, WLAN stack 203, and Bluetooth stack 205 may be computer code instructions stored in the RAM and/or ROM memory of the processor 122, which when executed by the central processing units (CPU), carry out the functions of the example embodiments of the invention. The gathered peripheral information buffer 146 buffers the peripheral information received from the one or more wireless peripheral devices 120A-H, for example power related information characterizing battery power of a battery powering the one or more wireless peripheral devices. The gathered peripheral information buffer 146 may be a partition in the RAM memory 126 of the processor 122. The wireless docking center device 100 and the wireless dockee device 110 may communicate with one another via the wireless communication 115A, using one or more example communications protocols such as the Bluetooth communications protocol, Bluetooth LE communications protocol, and the IEEE 802.11 wireless LAN (WLAN) protocol.

The example wireless dockee device 110 is shown optionally including similar components to those described for the example wireless docking center device 100. An example embodiment of the wireless dockee program 142', may be computer code instructions stored in the RAM and/or ROM memory of the processor 122', which when executed by the central processing units (CPU), carry out the functions of the example embodiments of the invention. A Bluetooth Low Energy (LE) RF emitter or proximity detector 212 may be included in the dockee device 110, using the Bluetooth LE protocol.

Figure 1B:
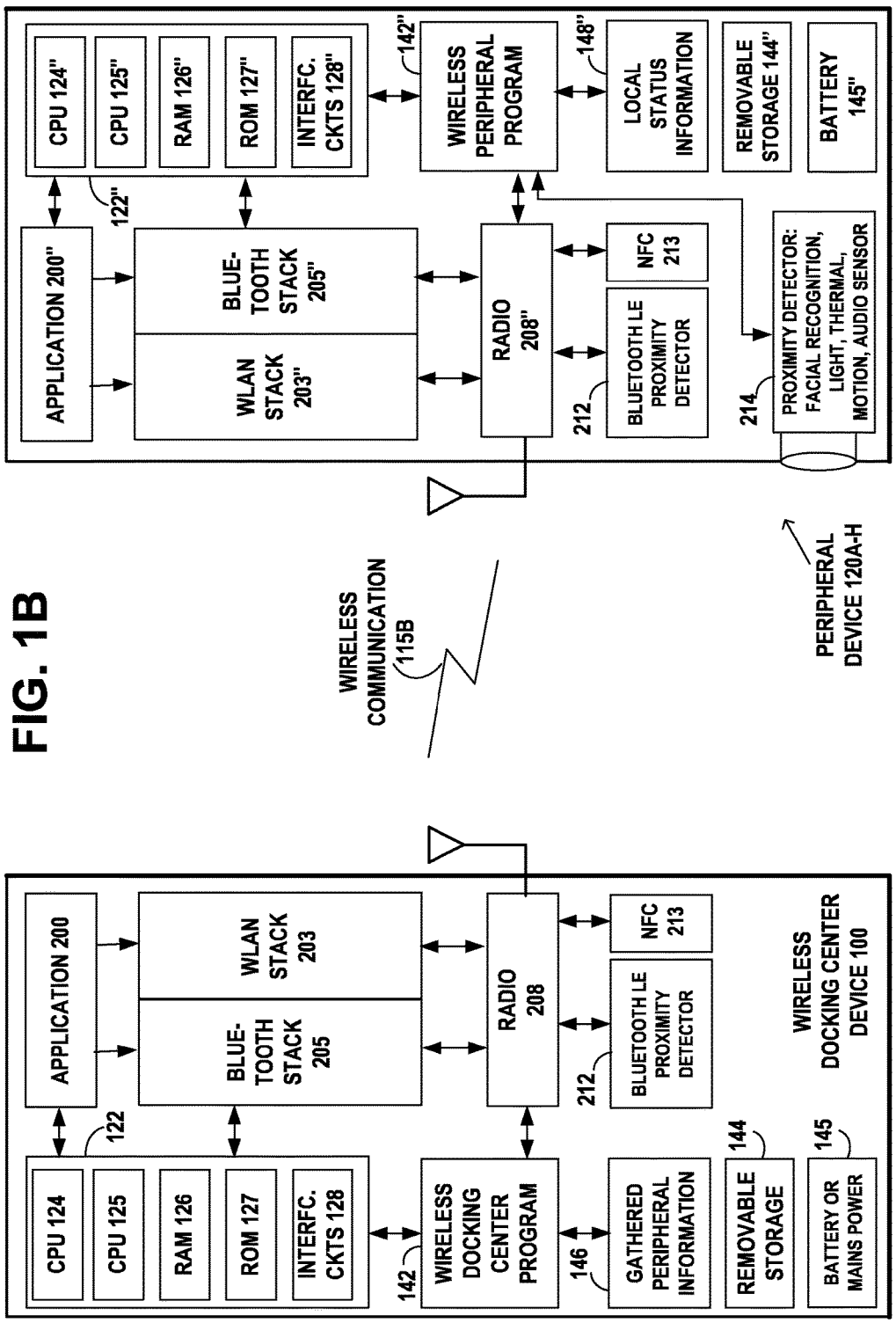
FIG. 1B illustrates an example network diagram and functional block diagram of the example wireless docking center device and an example wireless peripheral device, in accordance with an example embodiment of the invention.

FIG. 1B illustrates an example network diagram and functional block diagram of the example wireless docking center device and an example wireless peripheral device, in accordance with an example embodiment of the invention. Not all peripheral devices are necessarily equipped with all the components shown in the figure, and some peripheral devices may be connected by wire to the wireless docking center device. The example wireless peripheral device 120A-H is shown optionally including similar components to those described for the example wireless docking center device 100. An example embodiment of the wireless peripheral program 142", may be computer code instructions stored in the RAM and/or ROM memory of the processor 122", which when executed by the central processing units (CPU), carry out the functions of the example embodiments of the invention. The wireless docking center device 100 and the wireless peripheral device 120A-H may communicate with one another via the wireless communication 115B, using example communications protocols such as the Bluetooth communications protocol, Bluetooth LE communications protocol, and the IEEE 802.11 wireless LAN (WLAN) protocol.

In accordance with an example embodiment of the invention, a Bluetooth Low Energy (LE) proximity detector 212 may be included in the wireless peripheral device 120A-H, using the Bluetooth LE protocol to detect the proximity of a Bluetooth LE RF emitter or proximity detection tag possessed by the user. In accordance with an example embodiment of the invention, a proximity detector unit 214 may be used to detect the proximity of the user. The proximity unit may be based on at least one of facial recognition of the user, light sensor, thermal sensor, motion sensor, and audio sensor. The wireless peripheral device 120A-H may optionally also include an NFC detector 213 for enabling basic docking.

Figure 1C:
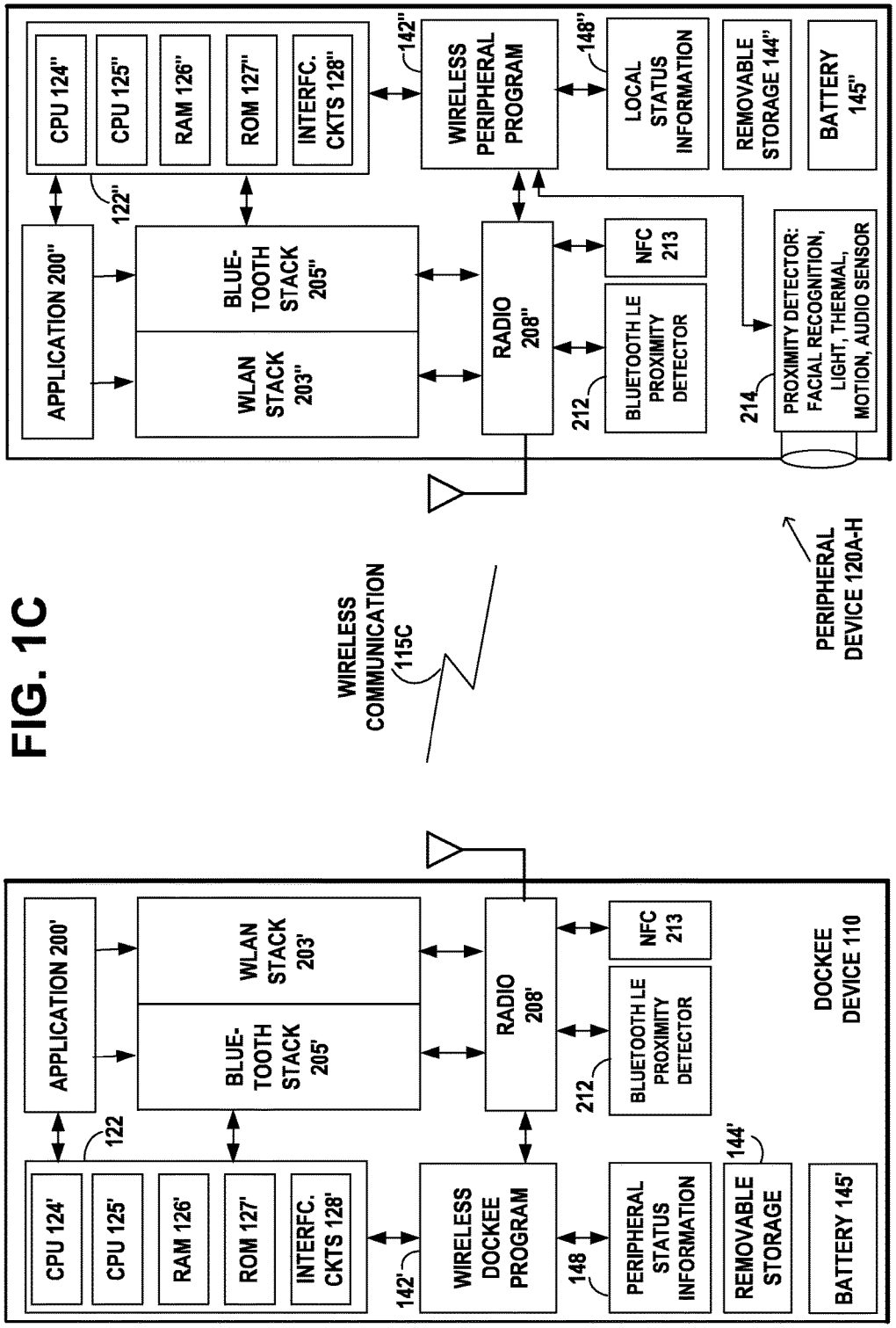
FIG. 1C illustrates an example network diagram and functional block diagram of wireless dockee device and the wireless peripheral device, in accordance with an example embodiment of the invention.

FIG. 1C illustrates an example network diagram and functional block diagram of wireless dockee device 110 and the wireless peripheral device 120A-H, in accordance with an example embodiment of the invention. The wireless dockee device 110 and the wireless peripheral device 120A-H may communicate with one another via the wireless communication 115C, using one or more example communications protocols such as the Bluetooth communications protocol, Bluetooth LE communications protocol, and the IEEE 802.11 wireless LAN (WLAN) protocol.

FIG. 1D illustrates an example network diagram and functional block diagram of a combined wireless docking center device 100 and wireless dockee device 110, as a mobile wireless device 110", the figure also showing the wireless peripheral device 120A-H, in accordance with an example embodiment of the invention. Example embodiments of the wireless docking center program 142 and the wireless dockee program 142' may be included in the combined mobile wireless device 110" to manage the one or more wireless peripheral devices 120A-H. The combined mobile wireless device 110" may be used, for example, in docking operations in an automobile environment, where a battery-powered automobile is an example wireless peripheral device 120H. In this combined case, all the connections to peripherals 120A-H are wireless.

Figure 1E:
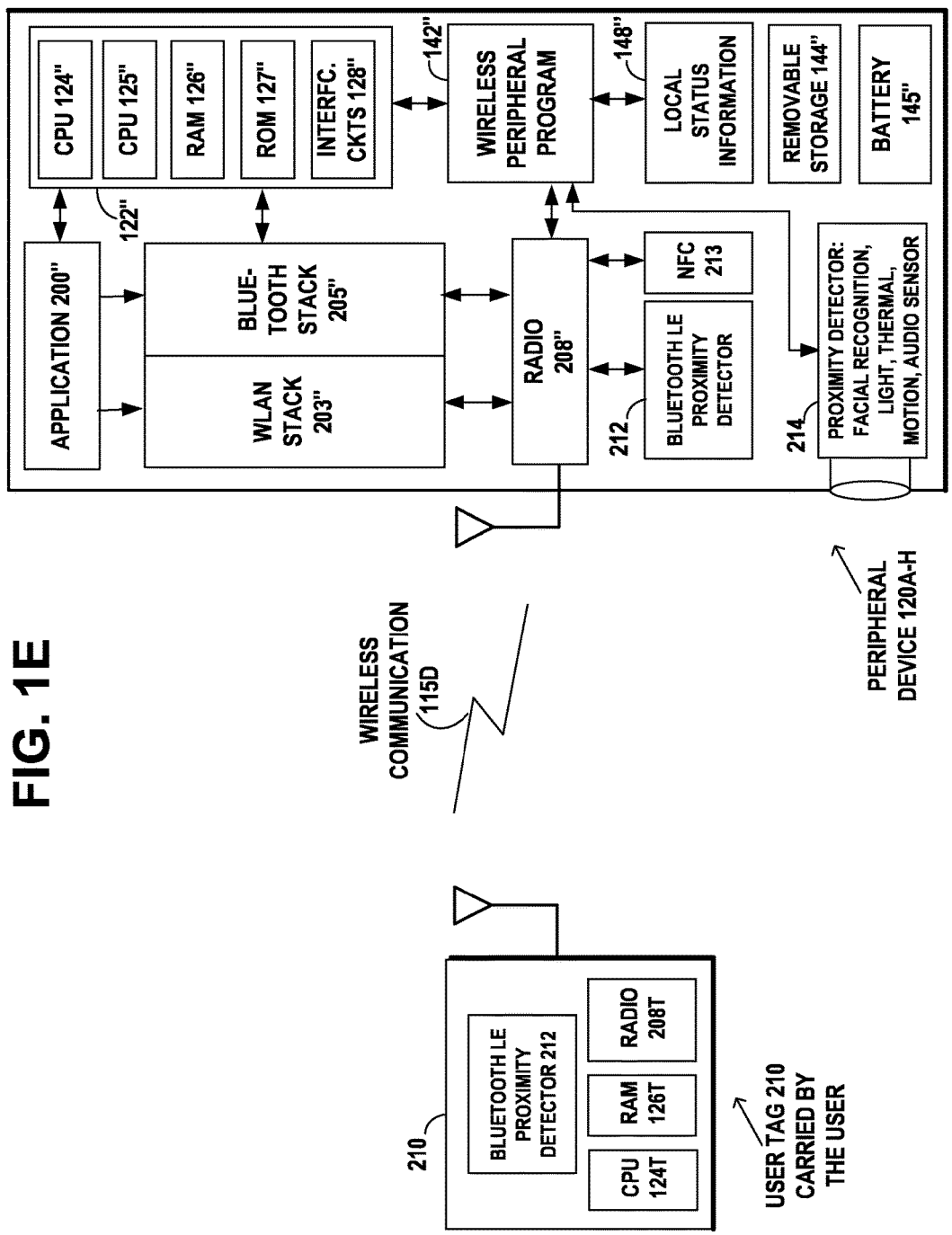
FIG. 1E illustrates an example network diagram and functional block diagram of a user tag carried by the user, the figure also showing the wireless peripheral device, in accordance with an example embodiment of the invention.

FIG. 1E illustrates an example network diagram and functional block diagram of a user tag 210 carried by the user, which may include a Bluetooth Low Energy (LE) proximity detector 212, the figure also showing the wireless peripheral device, which may include a Bluetooth Low Energy (LE) proximity detector 212, in accordance with an example embodiment of the invention. The user tag 210 may also optionally include a microprocessor CPU 124T, a RAM chip 126T and a radio 208T. The proximity of the peripheral device 120A-H to the user's tag 210 may be detected by Bluetooth Low Energy (LE) proximity detector 212 and communicated by the radio 208T to the docking center device 100 or directly to the dockee device 110. The Bluetooth LE tag 210 may be carried by the user as a wrist watch or other wearable device, such as a key fob on a belt. In accordance with an example embodiment of the invention, the capability-related information received from the wireless peripheral device 120A-H may include a notification of proximity of a user to the peripheral device. The wireless docking center device 100 may analyze the notification of proximity of the user and received planned use-related information. The wireless docking center device 100 may provide a command resulting from the analysis, to the wireless peripheral device 120A-H, to perform services required by the planned use-related information.

In accordance with an example embodiment of the invention, the planned use-related information of the wireless dockee device may be derived by the wireless dockee device from sources including at least one of user settings and one or more applications or combinations of applications such as a calendar program in the wireless dockee device, social networks available to the wireless dockee device, user activity related information accumulated by the wireless dockee device, such as phone calls recently made or received using the wireless dockee device, or current location determined by a location determining unit in the wireless dockee device. The wireless dockee device may be programmed to select one or more of the sources or combinations of the sources to generate the planned use-related information.

The dockee device 110, such as the user's smart phone or other primary device, or the wireless docking center device 100, may be able to locate the user, based on Bluetooth LE communication protocol 4.0 capabilities. The dockee device 110 or the wireless docking center device 100 may be able to locate the peripheral device 120A-H based on the detected distance or possibly the direction. The dockee device 110 or the wireless docking center device 100 may calculate the distance between the user and the peripheral device for notifications. When the user is close enough to the peripheral device, the notification is triggered in the peripheral device, for example a big screen TV. The user carrying a specific Bluetooth LE tag, may also be identified by the unique address of the Bluetooth LE tag.

Figure 1F:
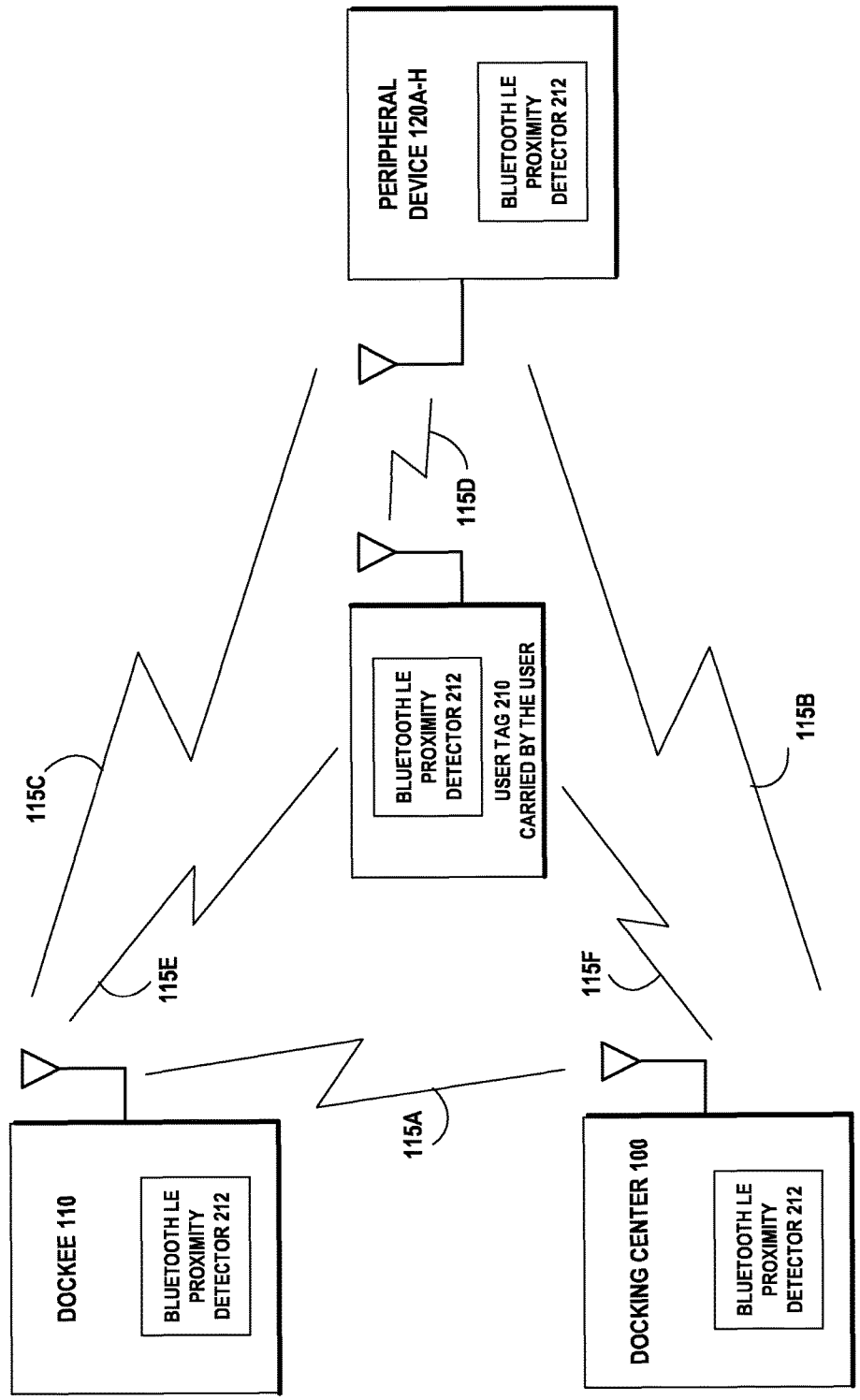
FIG. 1F illustrates an example wireless network diagram of possible Bluetooth LE wireless proximity detection between the user tag carried by the user, the dockee device, the wireless docking center device, and/or the wireless peripheral device, in accordance with an example embodiment of the invention.

FIG. 1F illustrates an example wireless network diagram of possible Bluetooth LE wireless proximity detection between the user tag 210 carried by the user, the dockee device 110, the wireless docking center device 100, and/or the wireless peripheral device 120A-H, in accordance with an example embodiment of the invention. There are various modes for detection of proximity of the user's tag 210 to the peripheral device 120A-H. For example, the peripheral device 120A-H may detect the proximity of the user's tag 210 via the Bluetooth LE link 115D and then transmit the proximity information via the Bluetooth LE link 115B to the wireless docking center 100. Alternately, the peripheral device 120A-H may detect the proximity of the user's tag 210 via the Bluetooth LE link 115D and then transmit the proximity information via the Bluetooth LE link 115C to the wireless dockee 110. In another alternative, the proximity of the peripheral device 120A-H to the user's tag 210 may be detected by the user's tag 210 over Bluetooth LE link 115D and communicated via its Bluetooth LE link 115F to the docking center device 100 or directly to the dockee device 110 over link 115E. FIGS. 4D1 and 4D2 illustrate a scenario where either the wireless docking center device 100 or the wireless dockee device 110 may measure a first distance to the user's tag 210 and a second distance to the peripheral device 120A-H and then determine the proximity distance by computing the difference in the distances, in accordance with an example embodiment of the invention.

FIG. 1G1 illustrates an example format for a wireless docking management frame 202, in accordance with an example embodiment of the invention. The example wireless docking management frame 202 may be a management frame 221/222 transmitted by a wireless peripheral device 120A-H at source address 225 to the wireless docking center device 100 at address 224, to deliver the information element 204 containing the capability-related information 201. In accordance with an example embodiment of the invention, the wireless docking center device 100 may formulate a specific status request to the one or more wireless peripheral devices 120A-H, based on the planned use-related information. The wireless docking center device 100 accumulates capability information of the wireless peripheral devices 120A-H when requested by the wireless docking center device 100 or alternately by the wireless dockee device 110. Then the wireless docking center device 100 or the wireless dockee device 110 analyzes the capabilities and the planned use-related information and then allocates tasks or performs an action with respect to selected ones of the wireless peripheral devices 120A-H. In accordance with an example embodiment of the invention, the capability-related information 201 may include:

Information 207A: characterizing the peripheral device, (eg., a high resolution display);

Information 208A: parameters (eg., screen resolution); and

Information 209A: parameters (eg., RGB color components).

FIG. 1G2 illustrates an example format for a wireless docking management frame from the dockee device to the docking center device, in accordance with an example embodiment of the invention.

In accordance with an example embodiment of the invention, the planned use-related information 201' may include:

Information 207A' : any 'User Preferences' or 'user requests' (eg. high definition display);

Information 208A': required parameters (eg., screen resolution);and

Information 209A' : required parameters (eg., RGB color components).

FIG. 1H is an example flow diagram 102 of a process in the wireless docking center device 100, in accordance with example embodiments of the invention. The steps of the flow diagram represent computer code instructions stored in the RAM and/or ROM memory of the wireless docking center device 100, which when executed by the central processing units (CPU), carry out the functions of the example embodiments of the invention. The steps may be carried out in another order than shown and individual steps may be combined or separated into component steps. Additional steps may be included in this sequence. The steps of the example method are as follows.

Step 104: receiving, by a wireless docking center device, at least from one or more wireless peripheral devices, capability-related information characterizing at least the one or more wireless peripheral devices;

Step 106: receiving, by the wireless docking center device, from a wireless dockee device, or other capable device, planned use-related information of the wireless dockee device; and Step 108: analyzing, by the wireless docking center device, the received capability-related information and planned use-related information, and performing an action with respect to one or more wireless peripheral devices capable of performing at least a portion of services required by the planned use-related information of the wireless dockee device, based on the analysis.

FIG. 1I is an example flow diagram of a process in the wireless dockee device 110, in accordance with example embodiments of the invention. The steps of the flow diagram represent computer code instructions stored in the RAM and/or ROM memory of the wireless dockee device 110, which when executed by the central processing units (CPU), carry out the functions of the example embodiments of the invention. The steps may be carried out in another order than shown and individual steps may be combined or separated into component steps. Additional steps may be included in this sequence. The steps of the example method are as follows.

Step 134: receiving, by a wireless dockee device, from a wireless docking center device, capability-related information characterizing one or more wireless peripheral devices;

Step 136: analyzing, by the wireless dockee device, the capability-related information characterizing the one or more wireless peripheral devices and planned use-related information; and Step 138: performing, by the wireless dockee device, an action with respect to one or more wireless peripheral devices capable of performing services required by the planned use-related information, based on the analysis.

SUMMARY DOCKEE METHOD

Example Embodiment 1

A method, comprising:
receiving, by a wireless dockee device, from a wireless docking center device, capability-related information characterizing one or more wireless peripheral devices;
analyzing, by the wireless dockee device, the capability-related information characterizing the one or more wireless peripheral devices and planned use-related information; and performing, by the wireless dockee device, an action with respect to one or more wireless peripheral devices capable of performing services required by the planned use-related information, based on the analysis.

Example Embodiment 2

The method of Example embodiment 1, further comprising:

providing, by the wireless dockee device, information resulting from the analysis, to the wireless docking center device, for automatically performing an action with respect to one or more of the wireless peripheral devices capable of performing services required by the planned use-related information of the wireless dockee device.

Example Embodiment 3

The method of Example embodiment 1, further comprising:

presenting, by the wireless dockee device, information resulting from the analysis, for user notification/information of selected ones of the one or more wireless peripheral devices capable of performing services required by the planned use-related information of the wireless dockee device.

Example Embodiment 4

The method of Example embodiment 1, further comprising:

transmitting, by the wireless dockee device, a request to the wireless docking center device for status of the one or more wireless peripheral devices based on the planned use-related information; and receiving by the wireless dockee device from the wireless docking center device, information based on the information characterizing the one or more wireless peripheral devices specified in the request.

Example Embodiment 5

The method of Example embodiment 1, further comprising:

computing, by the wireless dockee device, the planned use-related information based on at least one of user settings and one or more applications or combinations of applications such as a calendar program in the dockee device, social networks or user activity related information.

Example Embodiment 6

The method of Example embodiment 1, wherein the wireless docking center device and the wireless dockee device are integrated.

Example Embodiment 7

The method of Example embodiment 1, wherein the wireless dockee device receives from one or more wireless peripheral devices, capability-related information characterizing the one or more wireless peripheral devices.

SUMMARY DOCKEE APPARATUS

Example Embodiment 1

An apparatus, comprising:
at least one processor;
at least one memory including computer program code;
the at least one memory and the computer program code configured to, with the at least one processor, cause the apparatus at least to:
receive from a wireless docking center device, capability-related information characterizing one or more wireless peripheral devices;
analyze the capability-related information characterizing the one or more wireless peripheral devices and planned use-related information; and
perform an action with respect to one or more wireless peripheral devices capable of performing services required by the planned use-related information, based on the analysis.
performing, by the wireless dockee device, an action with respect to one or more wireless peripheral devices capable of performing services required by the planned use-related information, based on the analysis.

SUMMARY DOCKEE COMPUTER PROGRAM PRODUCT

Example Embodiment 1

A computer program product comprising computer executable program code recorded on a computer readable, non-transitory storage medium, the computer executable program code, when executed by a computer processor, comprising:

code for receiving, by a wireless dockee device, from a wireless docking center device, capability-related information characterizing one or more wireless peripheral devices;

code for analyzing, by the wireless dockee device, the capability-related information characterizing the one or more wireless peripheral devices and planned use-related information; and code for performing, by the wireless dockee device, an action with respect to one or more wireless peripheral devices capable of performing services required by the planned use-related information, based on the analysis.

An example embodiment of the invention may include a method, comprising:

receiving, by a wireless device, at least from one or more wireless peripheral devices, capability-related information characterizing at least the one or more wireless peripheral devices;

generating, by the wireless device, planned use-related information; and analyzing, by the wireless device, the received capability-related information and planned use-related information, and performing an action with respect to one or more wireless peripheral devices capable of performing at least a portion of services required by the planned use-related information, based on the analysis.

FIG. 1J is an example flow diagram 140 of a process by the combined function wireless device, in accordance with example embodiments of the invention. The steps of the example method are as follows.

Step 141: receiving, by a wireless device, at least from one or more wireless peripheral devices, capability-related information characterizing at least the one or more wireless peripheral devices;

Step 143: generating, by the wireless device, planned use-related information; and Step 147: analyzing, by the wireless device, the received capability-related information and planned use-related information, and performing an action with respect to one or more wireless peripheral devices capable of performing at least a portion of services required by the planned use-related information, based on the analysis.

B. Power Management in Wireless Docking

In an example embodiment of the invention, a generic solution is provided for sharing device-specific power information with other devices in a docking system. The sharing may be a basis to further enable making various innovative and value-added information to the user. The sharing may also enable recommendations to be made to a user and/or a service/application. Although the example embodiments relate to a docking system, example embodiments of the invention may be applied to any system with multiple connected devices, where some devices are battery-powered.

Power management in a docking scenario may be broken down to several components:

Collecting (making available) and maintaining different power related raw information e.g.:

relative/absolute present charging state, estimation of remaining battery life in terms of time or any relative scale, and mode of operation in terms of power consumption of a device.

Using or making available the collective/subset of power related information for analysis/calculation natively (e.g., by native software that is part of a device) or by service/application that has been downloaded.

Figure 2A:
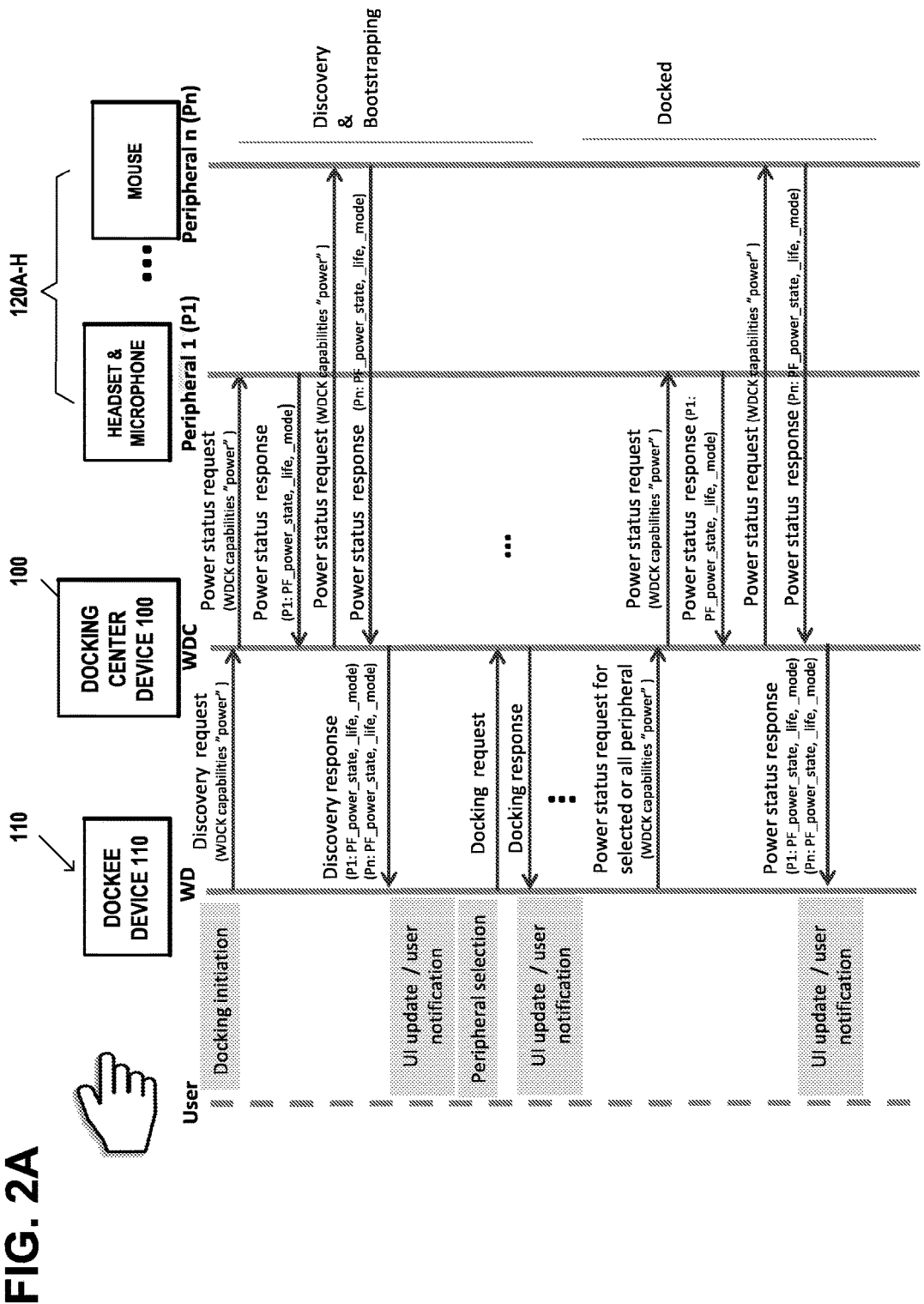
FIG. 2A illustrates a sequence diagram for power management in a wireless docking network, in accordance with an example embodiment of the invention.

Making the raw power related information and/or outcome of the analysis/calculation available to a user or a service/application, to optimize power consumption or improve experience FIG. 2A illustrates a sequence diagram for power management in a wireless docking network, in accordance with an example embodiment of the invention.

The wireless docking center device 100 receives a request from the wireless dockee device 110 for power status of a battery 145" powering the one or more wireless peripheral devices 120A-H.

The wireless docking center device 100 transmits a power status request to the one or more wireless peripheral devices 120A-H.

The wireless docking center device 100 receives from the one or more wireless peripheral devices 120A-H, in response to the power status request, power related information characterizing battery power of the battery 145" powering the one or more wireless peripheral devices 120A-H. The power-related information may be at least one of a present charging state of the battery powering the one or more peripheral devices 120A-H, an estimation of remaining battery life of the battery powering the one or more peripheral devices 120A-H, and a mode of power consumption of the one or more peripheral devices 120A-H.

The wireless docking center device 100 transmits to the wireless dockee device 110, information based on the power related information characterizing battery power of the battery 145" powering the one or more wireless peripheral devices 120A-H specified in the request.

The management of the one or more wireless peripheral devices 120A-H may comprise analyzing, by the wireless docking center device 100 or the wireless dockee device 110, the received capability-related information and received planned use-related information to determine when the battery 145" powering the one or more wireless peripheral devices 120A-H will require recharging. The wireless docking center device 100 may provide to the wireless dockee device 110, information resulting from the analysis, for user notification/information by a user interface, such as a display, or an annunciator, such as a beep or in vibration mode. The notification/information may be integrated in the user interface of the concerned application.

The management of the one or more wireless peripheral devices 120A-H may comprise analyzing, by the wireless docking center device 100 or the wireless dockee device 110, the received capability-related information and received planned use-related information to determine when the battery 145" powering the one or more wireless peripheral devices 120A-H will require recharging. The wireless docking center device 100 may provide to the one or more peripheral devices 120A-H, information resulting from the analysis, for at least one of reducing a rate of power consumption and recharging the battery powering the one or more wireless peripheral devices 120A-H.

The wireless docking center device 100 may provide to the wireless dockee device 110, at least one of a prediction as to how long certain connections between the wireless dockee device 110 and the one or more wireless peripheral devices 120A-H may be in operation before a battery power outage occurs, recommendations for charging the one or more wireless peripheral devices 120A-H sufficiently to perform certain activities and recommendations to switch from one peripheral device to another peripheral device.

While docking or being docked, a WD obtains power status from different connected peripherals. FIG. 2A shows example flow of information (between different devices in a docking solution) that enables a WD getting power status of different peripherals and the WDC. Self-explanatory names and single step (for each event) are used in the figure to help following the sequence; while exact names of different flow of information may be different, and each event may be complex with multiple steps in practice. As for example, when mapped to application layer, layer 2 and/or layer 3 protocols, multiple steps might be required for each request and response. A power status request/response may be combined with other information flow in application layer, layer 2 and/or layer 3 protocols. As for example, power status request/response in the discovery and bootstrapping phase may be part of a more generic transaction pair.

In accordance with an example embodiment of the invention, the wireless docking center device 100 may formulate a specific status request to the one or more wireless peripheral devices 120A-H, based on a specific power level required by the wireless dockee device 110. The wireless docking center device 100 accumulates capability information of the wireless peripheral devices 120A-H when requested by the wireless docking center device 100 or alternately by the wireless dockee device 110. Then the wireless docking center device 100 or the wireless dockee device 110 analyzes the capabilities and the planned use-related information and then allocates tasks or performs an action with respect to selected ones of the wireless peripheral devices 120A-H.

In response, only those wireless peripheral devices 120A-H that have characteristics that may satisfy the specific power level in the status request may be selected for capability-related information characterizing those one or more wireless peripheral devices 120A-H. For example, the planned use-related information may be a video teleconferencing application that requires a specific power level for the display monitor peripheral device. Although both peripheral devices 120A and 120G are display monitor peripheral devices, only display monitor peripheral device 120G has required power level available that may satisfy the specific status request. Thus, only display monitor peripheral device 120G may be selected for its capability-related information characterizing its specific power level.

In accordance with an example embodiment of the invention, the wireless dockee 110 may be one of the devices, in addition to the wireless peripheral devices 120A-H, from which the wireless docking center device 100 may collect power status information, so as to be able to make recommendations for actions. The power status of the wireless dockee device 110 may be needed for certain decision making scenarios.

FIG. 2B illustrates gathered peripheral information in a buffer of either or both the wireless docking center device and/or the wireless dockee device, the information having been gathered from one or more wireless peripheral devices for power management in a wireless docking network, in accordance with an example embodiment of the invention. Some or all of the gathered information may be sent by the wireless docking center device 100 to the dockee device 110. The gathered peripheral information is shown in tabular form in the figure, with a row for each example peripheral device 120A-H. The columns are peripheral devices 120A-H, battery or cable powered, charging status, individual battery time, operation mode, trigger to charge, next update, docking, and remaining session time.

In an example embodiment of the invention, upon retrieving power status of different devices, the dockee device 110 (WD) may present the full or summary of the power status information to the user in a user friendly way. For example, a self-explanatory icon may be used to highlight information, while additional information may be made available upon user interrogation in terms of voice notification or spontaneously appearing text-description on the UI. An example representation of power status information of involved devices in a docking system is shown in FIG. 2B. power status information may also be made available (e.g., via an API) for use by higher-level service or application. A peripheral may provide only some or selected power status information to the WD, and the WD may again filter collected power status information while making available for a user or service/application.

Figure 2C:
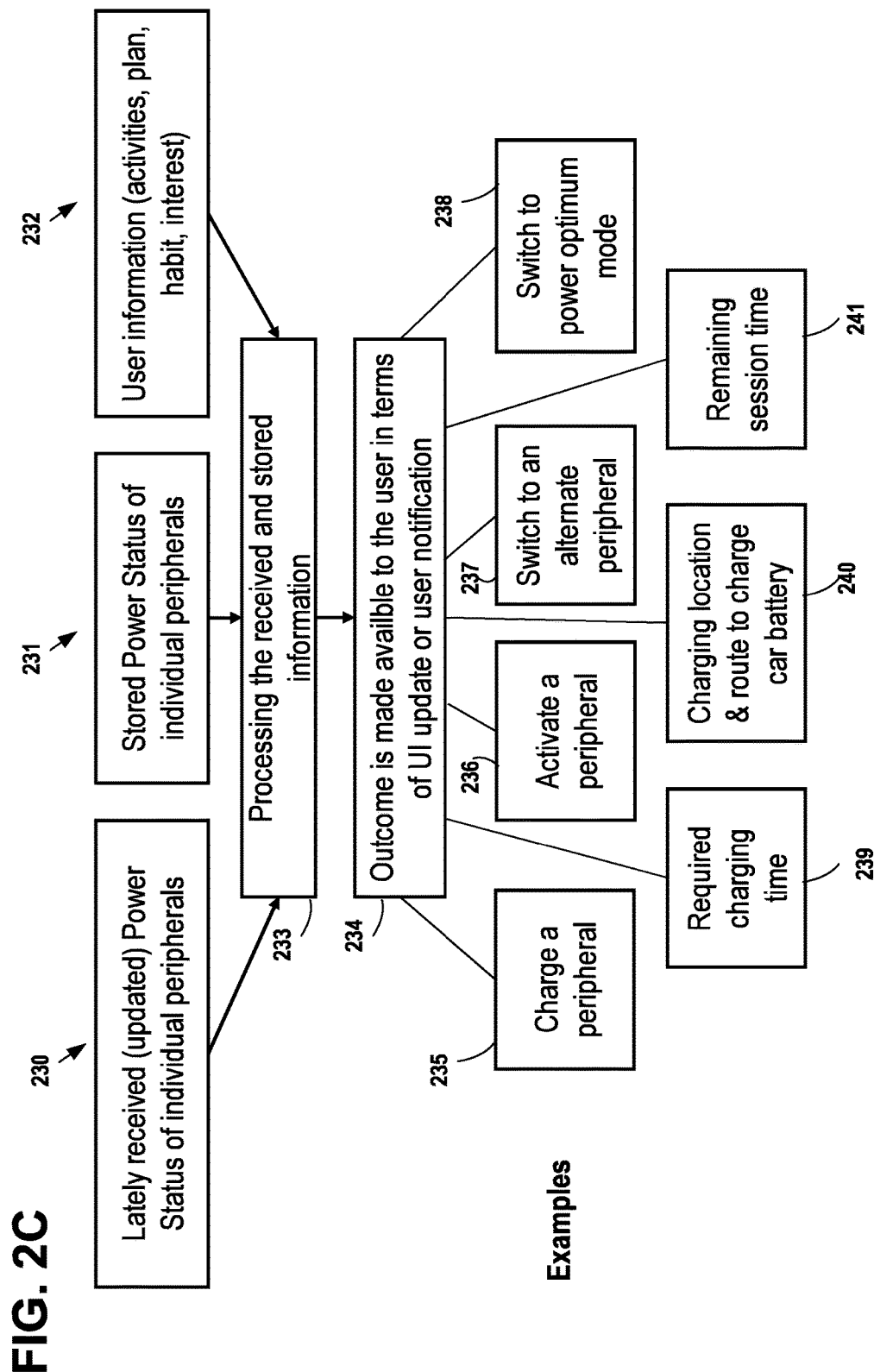
FIG. 2C illustrates an example flow diagram for several examples of power management in a wireless docking network, in accordance with an example embodiment of the invention.

FIG. 2C illustrates an example flow diagram for several examples of power management in a wireless docking network, in accordance with an example embodiment of the invention. The wireless docking center device 100 receives from the one or more wireless peripheral devices 120A-H, capability-related information, such as power status information 230 and stored power status 231 characterizing battery power of the battery 145" powering the one or more wireless peripheral devices 120A-H. The wireless docking center device 100 receives from the wireless dockee device 110, planned use-related information, such as user information 232. The management of the one or more wireless peripheral devices 120A-H may comprise processing at 233, by the wireless docking center device 100 or the wireless dockee device 110, the received capability-related information and received planned use-related information. The outcome is made available to the user at 234. The wireless docking center device 100 may provide to the wireless dockee device 110, information resulting from the analysis, for display by a user interface, including for example, charge a peripheral 235, activate a peripheral 236, switch to an alternate peripheral 237, switch power to optimum mode 238, required charging time 239, charging location and route to charge a car battery 240, and remaining session time 241.

The power status information may also be analyzed or processed natively or by higher level service or by a downloaded application to provide value-added information or guideline for any possible user action, e.g.:

charge a device that is urgently needing additional power to survive, activate a peripheral from sleep/hibernation mode, switch to another alternative peripheral within the same docking system, or switch to an alternative power optimum mode of operation.

In an example embodiment of the invention, such information or guideline may again be made available to a user or another service/application to improve the experience and/or performance. The simplified steps for processing available power information of different devices (to provide guideline for user action/notification) are shown in FIG. 2C.

User information (e.g., present activity, future plan, preference, habit) may also be used as another input for the above-mentioned analysis. User information may be, for example:

1. made available by the user herself/himself e.g., in terms of setting, and/or

2. WD may retrieve user information from available data or based on intelligent interpretation.

In an example embodiment of the invention, one possible use of the approach number 1 is as follows. A user may set threshold values for present power state that triggers user notifications e.g., for user action. FIG. 2B shows the values in terms of "trigger to charge". Notification for charging different devices may be triggered when the battery for that device has reached the set percentage value of its full charging. For example, notification for charging smartphone is triggered when the smartphone has 10% of its full charge in the example.

Figure 2D:
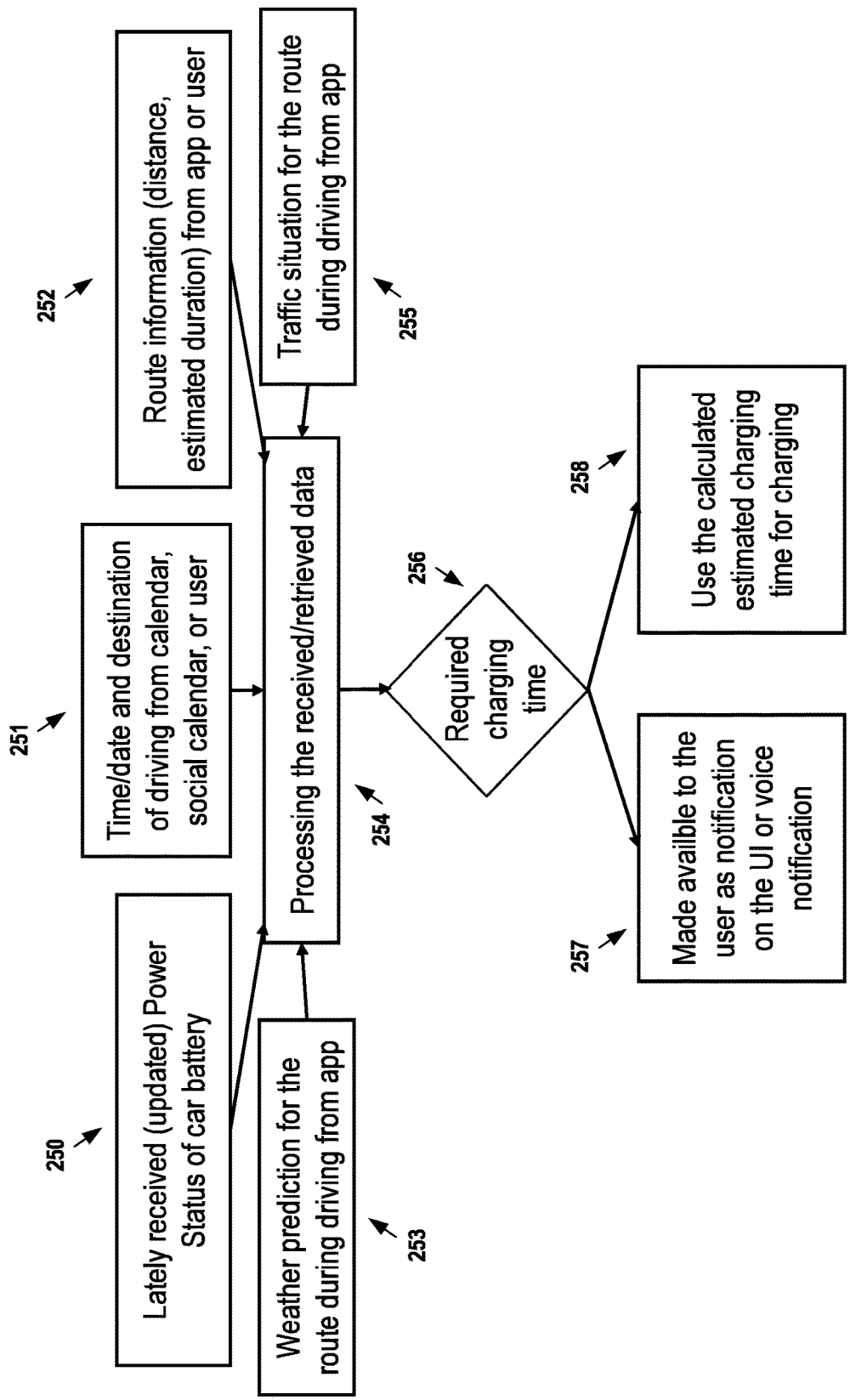
FIG. 2D illustrates an example flow diagram for an example power management operation in a wireless docking network involving automobile charging, in accordance with an example embodiment of the invention.

FIG. 2D illustrates an example flow diagram for an example automotive power management operation in a wireless docking network, in accordance with an example embodiment of the invention. The wireless docking center device 100 receives from the one or more wireless peripheral devices 120A-H, capability-related information, such as power status 250 of the car battery and sends this information to the wireless dockee device 110. The wireless dockee device 110 has the planned use-related information, such as time/date destination from the calendar, social calendar, or user 251 and also route information from an application or the user 252. The wireless dockee device 110 also has weather prediction for the route 253, and the traffic situation for the route 255. The management of the one or more wireless peripheral devices 120A-H may comprise processing at 254, by the wireless dockee device 110 (or alternately the wireless docking center device 100), the received capability-related information and planned use-related information. The outcome at 256 is the required charging time, which is made available to the user at 257 and used to calculate the estimated charging time at 258. In accordance with an example embodiment of the invention, the planned use-related information of the wireless dockee device 110 may be derived by the wireless dockee device 110 from sources, such as a calendar program in the dockee device 110, social networks available to the wireless dockee device 110, or user activity related information accumulated by the wireless dockee device 110, such as phone calls recently made or received using the wireless dockee device 110, or current location determined by a location determining unit, such as a GPS unit, in the wireless dockee device 110. In accordance with an example embodiment of the invention, the wireless dockee device 110 may be programmed to select one or more of these sources or combinations of these sources to generate the planned use-related information.

In an example embodiment of the invention, the approach number 2 may be used in docking operations in an automotive environment, where a battery-powered car is one peripheral of the car docking solution. The dockee device 110 (WD) may find from the user's calendar that the user is going to drive the car to certain destination sometime in the near future (e.g., in the next day). The dockee device 110 (WD) may then find the possible route for driving from the available map/navigation application in the WD or in the car navigation system. The route related information (e.g., distance, expected traffic/weather situation when driving is planned, expected time required for driving) and the present power state may be used in the calculation to find how much/long charging is required for the battery of the car for the next day. The calculated value may be made available to the user as a guideline, or the value may be directly used for charging the car. Alternatively, the user may also make his plan for driving available to the system by herself/himself (approach number 1). FIG. 2D shows detailed steps for finding the required charging time for the battery of a car according to the driving plan.

Another example of using power status information in an automotive environment (with battery-powered car) is to find the possible charging locations and corresponding routes to the charging locations, using the navigation/map application in the car or WD.

Another example of using available user information (approach number 2) in the analysis is, finding user weekly jogging time from a calendar application in the dockee device 110 (WD), and providing a timely notification to the user to charge the headset (used during jogging), or any other equipment, or notification for changing a new battery, e.g. in a pedometer device or a sensor with a Bluetooth Low Energy (LE) connection e.g. to a WD. Similarly, the WD may find a forthcoming meeting schedule and provide notification for charging any peripheral that is going to be used in the meeting.

There may be many other uses of both the approaches (of getting user information) described above. In general, the main idea is to find/interpret user action (e.g., based on habit, retrieved from calendar, obtained from social network, received from the user) that may require certain chargeable peripherals, and prepare the peripherals with enough charge for the whole duration of the action by user notification or guiding the charging system/application in time (e.g., before the action starts) at the right place (e.g., before the user leaves the suitable location for charging).

power status of a single peripheral is used in the analysis in most of the cases above. In contrast, the collective power status information received from all/some of the battery-powered peripherals may be used in analysis to provide useful information/guideline as well to improve user experience. For example, WDC could calculate from individual device power status information how long certain docking connection(s)/whole session may be in operation before power outage. This could take into consideration the power consumption rate of each device during a session (e.g., video streaming session with smartphone, big screen TV and wireless headset). Such guideline/information may be expressed in terms of "remaining session time" in FIG. 2B.

In summary, the example embodiments of the invention may include three components for power management in a system with connected devices (e.g., docking system)—sharing power related information among the connected devices, making the information available to a user or a service/application, and further analysis/process the information to provide useful guideline or value-added information to a user or a service/application. While all the components may be implemented in sequence, it is also possible to skip any component in an implementation. As for example, the second or third component may be skipped, or even the first component may be skipped if the power related information is available by other means.

FIG. 2E1 illustrates an example format for a wireless docking management frame 202 from a peripheral device to the wireless docking center, in accordance with an example embodiment of the invention. The example wireless docking management frame 202 may be a management frame 221/222 transmitted by a wireless peripheral device 120A-H at source address 225 to the wireless docking center device 100 at address 224, to deliver the information element 204 containing the peripheral functions (PF) status information. In accordance with an example embodiment of the invention, the peripheral functions (PF) status information may include:

PF_power_state 207B: The field shall indicate the relative power status of the peripheral.

PF_power_life 208B: The field shall indicate the remaining battery life of the peripheral in terms of time units (e.g., minutes).

PF_power_mode 209B: The field shall indicate if the peripheral is in power save (e.g., sleep, hibernation) mode. The possible value for this field may be active/normal, power optimum, sleep, and inactive, while active/normal may be the default mode.

The names for different fields are just an example, and different names may be used in standard or other documents.

In an example embodiment of the invention, support for these fields may be indicated as a capability by a device/entity. For example, a wireless docking capabilities element may have a bit for power support (in case the docking protocol is defined in binary format), or "power" as ASCII texts (in case the protocol is defined in xml format) to indicate the support for the above mentioned fields. Including the power specific bit or ASCII texts in a request or response indicate that the device issuing the request or response support the fields, so that the receiver of the request or response may act accordingly. For example, if the power specific bit or ASCII text is included in the power status request, peripheral will populate the power related fields (PF_power_state, PF_power_life, PF_power_mode) in the corresponding response. WDCK capabilities element is part of the WDCK_IE_SubElement( )structure with unique ID, while WDCK_IE_SubElement ( )is part of the Wireless Docking Information Element (WDCK IE), which is used in docking messages during discovery and docked states. The wireless docking capabilities element is part of the wireless docking information structure with unique ID, while wireless docking information structure is part of the wireless docking information element, which is used in docking messages during discovery and docked states.

The PF STATUS information is used during the docking bootstrapping and devices/services discovery phase. It is included in the L2 Service Discovery Query values. In one case, only subset of peripheral devices may be inquired for power information. The PF_STATUS information may also be used while docked on demand basis. This way, the dockee (WD) should be able to query power status of any/all connected peripherals while docked. The request may be generated on a regular basis and/or once in a while, based on implementation. In one case, the power request may be generated only for a selected sub-set of peripherals, depending on frequency of usage of peripherals by a Dockee, or only for the power critical peripherals that are determined from previous response. In response, peripheral inform its current power status information, and the Dockee updates the power indicator (FIG. 2B) on its display. Information flow for both discovery & bootstrapping phase and docked phase are shown in FIG. 2A.

The charging status of peripherals is collected (based on the values of fields above), processed, and the educated suggestions are made by the Dockee (WD), Docking center (WDC), and/or combination of both. The steps for making the suggestions are shown in FIG. 2C. Educated suggestions are made available as user notification either in term of textual/graphical/visual representation on the user interface (UI), or as voice notification.

In an example embodiment of the invention, WD would be able to know the power status of a peripheral at the beginning or during docking. The value of PF_power_state and PF_power_life may be processed and showed to a user in a user friendly way at the beginning. For example, the peripherals that are having low battery are shown with an alert (e.g., blinking red color, exclamation mark) in the list of available peripherals. The alert may be triggered according to the received value of PF_power_state and/or PF_power_life fields vs. a (user pre-defined) limit for the alert. Such indication may be used by a user to select a certain peripheral for docking. For example, user may decide not to connect with a battery critical peripheral as that is not suitable for the intended long session. The FIG. 2B also shows the remaining session/connection time for the active operation in the last column, based on the analysis made on the remaining battery life of individual peripherals.

The received value of PF_power mode field may be used to indicate user action needed, e.g., activate the peripheral. The values of PF_power state and/or PF_power_life fields may also result in a user action request, like charge the peripheral and/or switch to power save mode of operation (brightness of the display peripheral may go down, sound of audio peripheral may be reduced) or the action to take may be automated.

In one embodiment, the dockee (WD) or WDC may further analyze the present and past power status of one or more peripheral, and may derive the predicted power status for specific time in future or remaining battery life (if not provided by a peripheral), and provide user a notification accordingly. Even if a remaining battery life is provided by a peripheral, such calculation might be useful to derive remaining battery life for a specific/different mode of operation, or to double check the validity of the response provided by the peripheral, and provide user notification accordingly (e.g., remaining battery life for the present mode of operation)

In one embodiment, the values of the newly proposed PF_STATUS fields may be further used to make the selection between peripherals. For example, if a peripheral has a low power and there is an alternative peripheral available in the same docking solution, a user may be suggested to switch to the alternative peripheral or the docking solution may switch the peripheral automatically (based on settings/ depending on implementation). Example: proposing to switch the audio stream from a wireless headset to a wired loudspeaker.

In another embodiment of Docking in automotive environment (e.g., car) the values of these PF_STATUS fields may be used and processed to inform needed charging time of the car battery. The user plans a route in advance for the scheduled drive, e.g., next morning using application, such as the Nokia Drive/Maps™ in a Dockee (WD), or the dockee retrieve the information about driving plan and rout for the driving from calendar (or social network) and map applications respectively. Availability of such information may trigger the retrieval of the power status information of the car battery (which is a peripheral from docking perspective). Upon retrieval of the power status information, the dockee calculates the charging parameters that are fed to the car charging unit. The calculated charging parameter of car battery may be shown on the Map or Drive application icon, so that green or steady means the car battery has enough charge for driving the route, while red or blinking means the car battery needs more charging, and the color may dynamically change its color depending on the charging status of the car battery. The user does not need to keep the application open, but charging status will find the Drive application on the tile UI and will influence the color of the icon dynamically based on charging status. This is just one example of implementing the idea, while there are other ways to implement it as well. Alternatively, that route information is fed as an input to the Docking Center (WDC) that also has the power status information of the electric car batteries. The Docking Center then calculates the charging parameters that are fed to the car charging unit. Based on the information the car battery is charged according to the user critical need, i.e., for the planned route, and for the planned time. The implementation details described above is also valid for this alternative option of calculating charging parameters in the WDC.

In the dockee device 110 (WD) user interface (UI), the peripherals may be visually shown as icons in a tile or they are represented by a tile. The peripheral info in the tile or of the tile will be updated in WD's UI periodically or when requested/needed according to user's settings. User may manage the peripheral in that tile, e.g., by using touch screen. In one embodiment when it is necessary for the user to change from one peripheral device to another peripheral device to continue rendering because of the low power of the first peripheral device, the peripheral tile could suggest the other peripheral tile for that purpose by showing to the user by arrows or the like the best other peripheral to continue rendering. User may switch using his/her device UI between these two peripherals for continuous consumption experience. In one further embodiment the peripheral view will be shown only when requested or, e.g., when immediate action is needed.

FIG. 2E2 illustrates an example format for a wireless docking management frame for power management from the dockee device to the docking center device, in accordance with an example embodiment of the invention. The planned use-related information 201' may include the following example fields:

PF_power_state 207B': required relative power status of the peripheral.

PF_power_life 208B': required parameters (eg., battery life).

PF_power_mode 209B': required parameters (eg., power save mode).

Figure 2F:
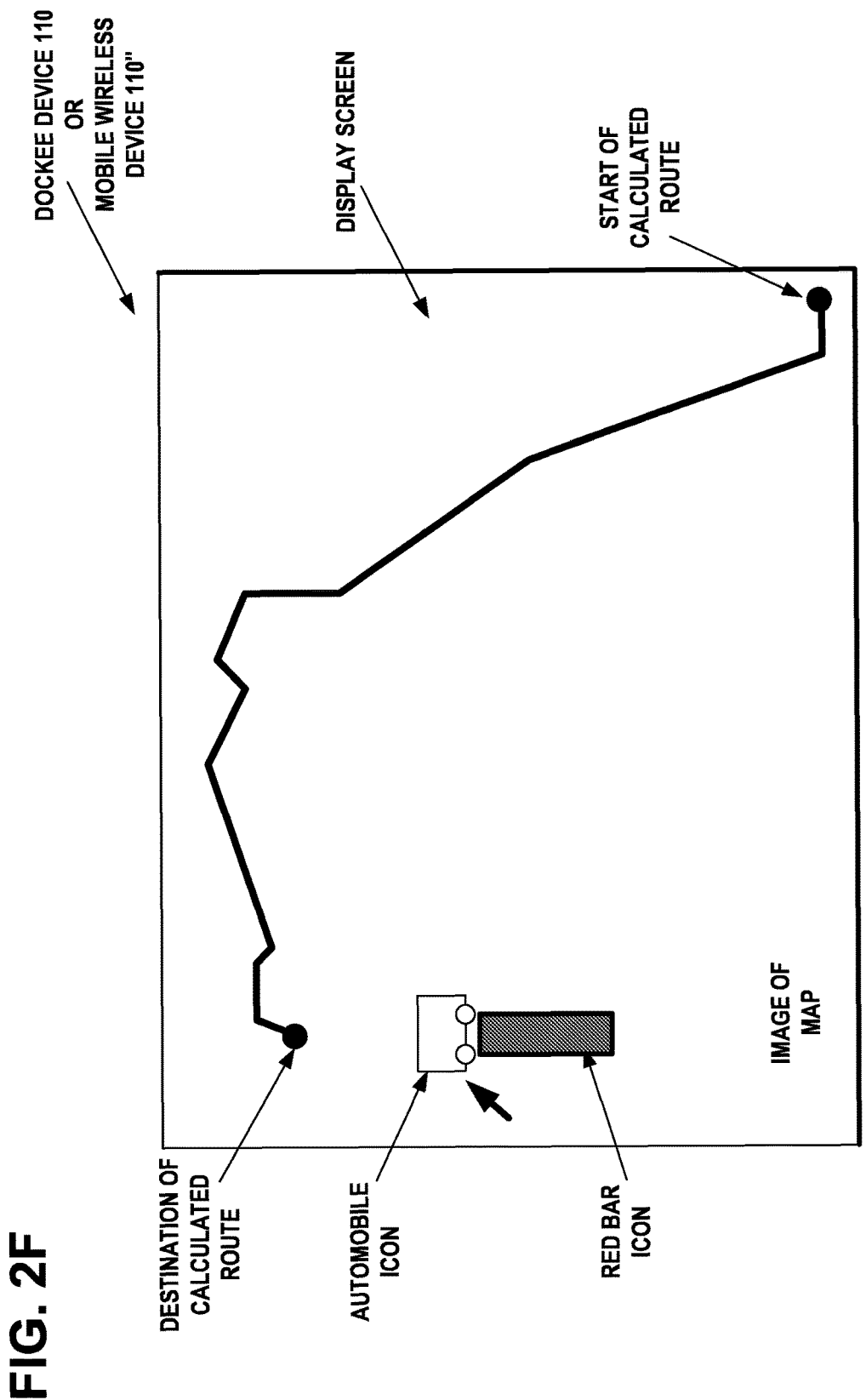
FIG. 2F illustrates an example planned travel route for an example power management of a battery in a hybrid automobile, in accordance with an example embodiment of the invention.

FIG. 2F illustrates an example planned travel route for an example power management of a battery in a hybrid, battery-powered, automobile, in accordance with an example embodiment of the invention. Example embodiments of the wireless docking center program 142 and the wireless dockee program 142' may be included in the combined mobile wireless device 110" of FIG. 1D, to manage docking operations in an automobile environment, where a battery-powered automobile is an example wireless peripheral device 120H. After the route is calculated, it is displayed on a map on the display screen of the combined mobile wireless device 110". The current status of the automobile battery's charge may also be displayed. An icon, for example a green bar, may be displayed to indicate that there is sufficient power to drive the calculated route. The figure shows the red bar icon displayed on the display screen of the combined mobile wireless device 110", which indicates that the battery needs to be charged. The user may touch the automobile icon and select the charge needed to drive the route. An additional touch of the automobile icon will begin the charging operation.

In an example use case the user may be using an electronic tablet as the combined mobile wireless device 110" and will plan the route for tomorrow's trip. When the route has been calculated and shown on the dockee's display, the automobile's icon with the power situation is displayed to show what is the current power status of the automobile. If the power status is sufficient, then no further connection or communication is needed. But, if the power status is in not sufficient, then based on the calculated route, an instruction may be issued by the combined mobile wireless device 110" to the automobile's charging system, to charge the automobile's battery to have battery charged for the planned route. When the battery has been sufficiently charged, this information will be sent by the combined mobile wireless device 110" to the map application. User may then see from the displayed map application that the automobile has a sufficient charge to drive the calculated route. In one or more embodiments, the calculated route information may trigger a connection to the car power status information and may show that on the map application. In case of two or more cars connected to the wireless docking center device the user may select on the UI, which car she/he might want to use for the trip. The respective selections may be done on the touch screen of the wireless docking device, e.g. when calculating route by means of map application.

Planned route may trigger the combined mobile wireless device 110" system to issue instructions to the charging system to start the charging, for example, 15 min or more before beginning the trip, depending on the initial charge level of the battery. After route has been calculated, the route is shown on a map. Then the required battery charge necessary to complete the route, may be displayed. With a touch display, the user may touch the automobile icon to select commencing the charging needed to complete driving the route. In an example embodiment, by touching the automobile icon, the user may have a menu displayed from which the user may select alternate charging instructions to be sent by the combined mobile wireless device 110" to the automobile's charging system.

In addition to charging for to the planned route, the charging time calculated by the combined mobile wireless device 110" system, may be used to optimize the overall power consumption. In accordance with an example embodiment of the invention, charging is calculated by the combined mobile wireless device 110" for the time period necessary to complete a planned route. For example, the driver may plan to drive 50 km today, and accordingly charging is calculated by the combined mobile wireless device 110" only for the time necessary to drive the planned 50 km.

A programmed application may be executed by a microprocessor in the automobile, for example a navigation application run by automobile's own navigation system. The automobile, considered as a peripheral device, may provide both the capability-related information and the planned use-related information, such as a planned route to a destination. The wireless dockee device 110" or the wireless docking center device may receive notification from the automobile's system, in case of changes in capability or new planned use-related information.

B. Summary Power Management in Wireless Docking

SUMMARY DOCKING CENTER METHOD

Example Embodiment 1

A method, comprising:
receiving, by a wireless docking center device, from at least one of a wireless dockee device and one or more wireless peripheral devices, power-related information of a battery powering the one or more peripheral devices;
receiving, by the wireless docking center device, from a wireless dockee device, planned use-related information of the wireless dockee device; and
analyzing, by the wireless docking center device, the received power-related information and planned use-related information, and performing an action with respect to one or more wireless peripheral devices capable of performing services required by the planned use-related information of the wireless dockee device, based on the analysis.

Example Embodiment 2

The method of Example embodiment 1, wherein the power-related information is at least one of a present charging state of a battery powering the one or more peripheral devices, an estimation of remaining battery life of the battery powering the one or more peripheral devices, a mode of power consumption of the one or more peripheral devices, a present charging state of a battery powering the wireless dockee device, an estimation of remaining battery life of the battery powering the wireless dockee device, and a mode of power consumption of the wireless dockee device.

Example Embodiment 3

The method of Example embodiment 1, further comprises:
providing, by the wireless docking center device, to the wireless dockee device, information resulting from the analysis, for user notification/information by a user interface.

Example Embodiment 4

The method of Example embodiment 1, further comprises:
providing, by the wireless docking center device, to the one or more peripheral devices and the wireless dockee device, information resulting from the analysis, for at least one of reducing a rate of power consumption and recharging the battery powering the one or more wireless peripheral devices.

Example Embodiment 5

The method of Example embodiment 1, further comprising:

transmitting by the wireless docking center device, a power status request to the at least one of a wireless dockee device and the one or more wireless peripheral devices, based on the planned use-related information of the wireless dockee device; and receiving, by the wireless docking center device, from the at least one of a wireless dockee device and the one or more wireless peripheral devices, in response to the power status request, power related information characterizing battery power of a battery powering the at least one of a wireless dockee device and the one or more wireless peripheral devices.

Example Embodiment 6

The method of Example embodiment 1, further comprising:

receiving, by the wireless docking center device, a request from the wireless dockee device for power status of a battery powering the one or more wireless peripheral devices; and transmitting by the wireless docking center device to the wireless dockee device, information based on the power related information characterizing battery power of the battery powering the one or more wireless peripheral devices specified in the request.

Example Embodiment 7

The method of Example embodiment 1, further comprising:

providing, by the wireless docking center device, to the wireless dockee device, at least one of a prediction as to how long certain connections between the wireless dockee device and the one or more wireless peripheral devices may be in operation before a battery power outage occurs, recommendations for charging the one or more wireless peripheral devices, and recommendations to switch from one peripheral device to another peripheral device.

Example Embodiment 8

The method of Example embodiment 1, wherein the one or more wireless peripheral devices comprises a charging system for an automobile battery, the received power-related information is a present charging state of the automobile battery, and the received planned use-related information is a planned traveling route for the automobile;

providing, by the wireless docking center device, to the charging system, information resulting from the analysis, for recharging the automobile battery.

Example Embodiment 9

The method of Example embodiment 1, wherein the planned use-related information of the wireless dockee device is derived by the wireless dockee device from sources including at least one of user settings and one or more applications or combinations of applications such as a calendar program in the wireless dockee device, social networks available to the wireless dockee device, user activity related information accumulated by the wireless dockee device, such as phone calls recently made or received using the wireless dockee device, or current location determined by a location determining unit in the wireless dockee device, and wherein the wireless dockee device is programmed to select one or more of the sources or combinations of the sources to generate the planned use-related information.

SUMMARY DOCKEE METHOD

Example Embodiment 1

A method, comprising:

receiving, by a wireless dockee device, from a wireless docking center device, power-related information characterizing one or more wireless peripheral devices;

analyzing, by the wireless dockee device, the power-related information characterizing the one or more wireless peripheral devices and planned use-related information; and performing, by the wireless dockee device, an action with respect to one or more wireless peripheral devices capable of performing services required by the planned use-related information, based on the analysis.

Example Embodiment 2

The method of Example embodiment 1, wherein the power-related information is at least one of a present charging state of a battery powering the one or more peripheral devices, an estimation of remaining battery life of the battery powering the one or more peripheral devices, and a mode of power consumption of the one or more peripheral devices.

Example Embodiment 3

The method of Example embodiment 1, further comprises:

presenting, by the wireless dockee device, information resulting from the analysis, for user notification/information by a user interface.

Example Embodiment 4

The method of Example embodiment 1, further comprises:

providing, by the wireless dockee device, to the wireless docking center device, information resulting from the analysis, for at least one of reducing a rate of power consumption, recharging the battery powering the one or more wireless peripheral devices, and recommending switching from a first peripheral device to another peripheral device because of power issues.

Example Embodiment 5

The method of Example embodiment 1, further comprising:

transmitting, by the wireless dockee device, a request to the wireless docking center device for power status of a battery powering the one or more wireless peripheral devices based on the planned use-related information; and receiving, by the wireless dockee device from the wireless docking center device, information based on the power related information characterizing battery power of the battery powering the one or more wireless peripheral devices specified in the request.

Example Embodiment 6

The method of Example embodiment 1, further comprising:
presenting, by the wireless dockee device, at least one of a prediction as to how long certain connections between the wireless dockee device and the one or more wireless peripheral devices may be in operation before a battery power outage occurs, recommendations for charging the one or more wireless peripheral devices and recommendations to switch from one peripheral device to another peripheral device.

Example Embodiment 7

The method of Example embodiment 1, wherein the one or more wireless peripheral devices comprises a charging system for an automobile battery, the received power-related information is a present charging state of the automobile battery, and the planned use-related information is a planned traveling route for the automobile;
providing, by the wireless dockee device, to the charging system, information resulting from the analysis, for recharging the automobile battery; and
presenting, by the wireless dockee device, information on the present charging state of the automobile battery.

Example Embodiment 8

The method of Example embodiment 1, further comprising:
computing, by the wireless dockee device, the planned use-related information based on at least one of user settings and one or more applications or combinations of applications such as a calendar program in the dockee device, social networks or user activity related information.

Example Embodiment 9

The method of Example embodiment 1, wherein the wireless dockee device receives from one or more wireless peripheral devices, capability-related information characterizing the one or more wireless peripheral devices.

C. Intelligent and Automatic Connection Activation

In an example embodiment of the invention, a wireless docking system may automatically provide only those peripherals to user's attention, which are in direct relation to user's activity and are meaningful to the user at each point in time. The set of offered peripherals may depend on the application, for example, video playing or web browsing, running in user's dockee device, such as a smartphone. An example embodiment of the invention may automatically take into account known user preferences/habits, location, etc. The selection of peripherals offered may automatically provide the best technical performance, for example, best quality display for a video. An example embodiment of the invention also enables the docking solution to allocate optimum peripheral resources on a dynamic usage basis for each user.

Figure 3A:
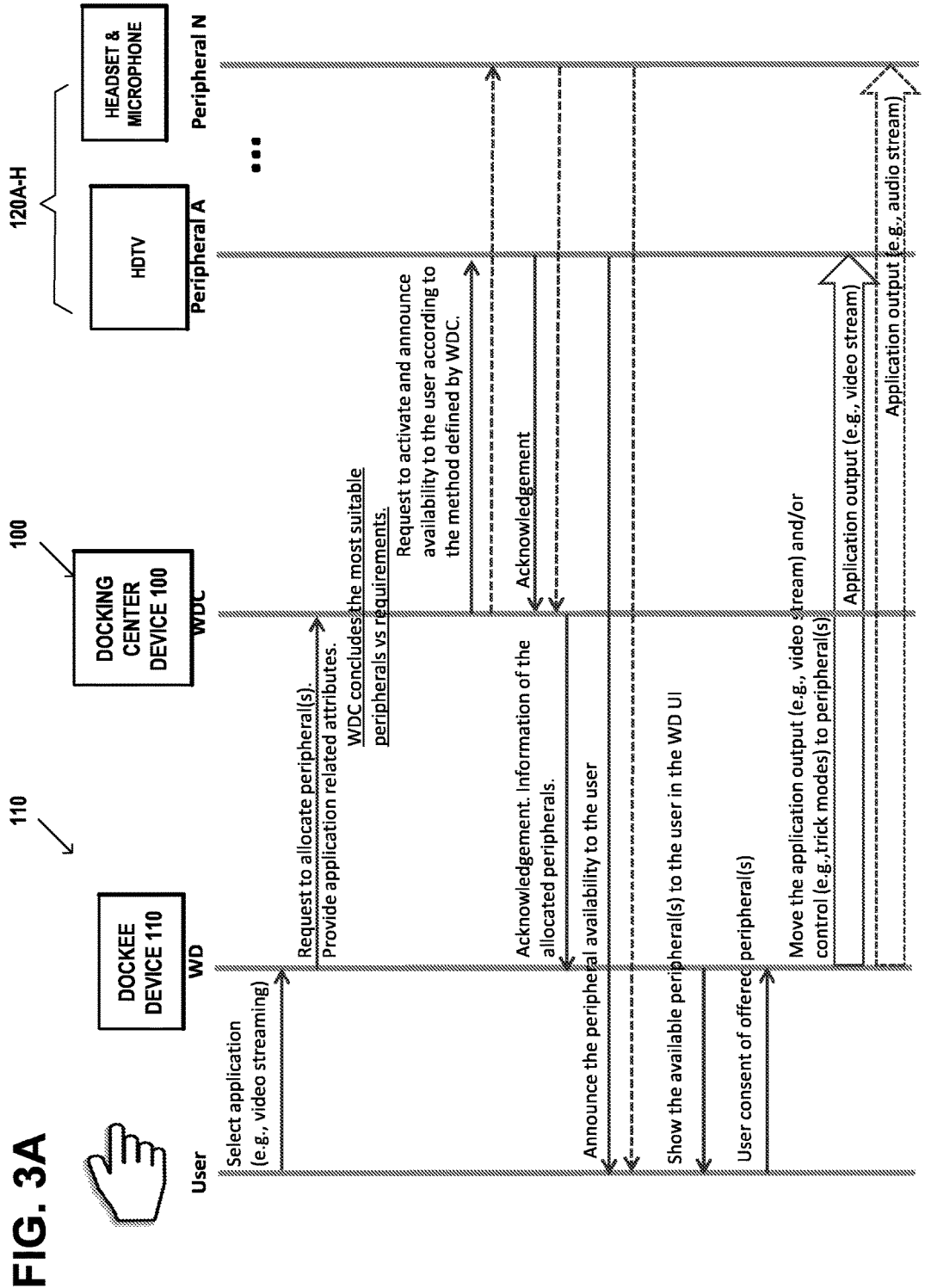
FIG. 3A illustrates an example sequence diagram for intelligent and automatic connection activation in a wireless docking network, in accordance with an example embodiment of the invention.

FIG. 3A illustrates an example sequence diagram for intelligent and automatic connection activation in a wireless docking network, in accordance with an example embodiment of the invention.

The wireless docking center device 100 may receive from one or more wireless peripheral devices 120A-H, capability-related information characterizing the one or more wireless peripheral devices. The wireless docking center device 100 may receive from the wireless dockee device 110, planned use-related information of the wireless dockee device. The planned use-related information may be an identification of an application 200' to be executed by the wireless dockee device 110. The wireless docking center device 100 may analyze the received capability-related information and received identification of the application. The wireless docking center device 100 may provide information resulting from the analysis, to the wireless dockee device 110, for display of selected ones of the one or more wireless peripheral devices 120A-H capable of performing services required by the identified application.

The wireless docking center device 100 may analyze the received capability-related information and received identification of the application. The wireless docking center device 100 accumulates capability information of the wireless peripheral devices 120A-H when requested by the wireless docking center device 100 or alternately by the wireless dockee device 110. Then the wireless docking center device 100 or the wireless dockee device 110 analyzes the capabilities and the planned use-related information and then allocates tasks or performs an action with respect to selected ones of the wireless peripheral devices 120A-H.

The wireless docking center device 100 may provide information resulting from the analysis, for automatically selecting one or more of the wireless peripheral devices 120A-H capable of performing services required by the identified application.

In accordance with an example embodiment of the invention, the wireless docking center device 100 may formulate a specific status request to the one or more wireless peripheral devices 120A-H, based on the identification of an application 200' to be executed by the wireless dockee device 110.

For example, the planned use-related information may be a video teleconferencing application that requires a specific high-definition screen resolution for the display monitor peripheral device. Although both peripheral devices 120A and 120G are display monitor peripheral devices, only display monitor peripheral device 120G has characteristics that may satisfy the specific status request. Thus, only display monitor peripheral device 120G may be selected for its capability-related information characterizing its specific high-definition screen resolution.

The wireless docking center device 100 may receive from the wireless dockee device 110, user preferences associated with the identified application. The wireless docking center device 100 may analyze the received capability-related information, the received identification of the application, and the received user preferences. The wireless docking center device 100 may select one of the peripheral devices resulting from the analysis, selecting one or more of the wireless peripheral devices 120A-H capable of performing services required by the identified application and capable of providing the user preferences associated with the identified application.

An example embodiment of the invention focuses to the phase of interaction when a user device, i.e., Dockee, has already paired and connected with the Wireless Docking Center. The WDC also knows availability and capabilities of all the peripherals in the environment and has preconfigured the connections to the peripherals.

In accordance with an example embodiment of the invention, the user may be interacting with application(s), e.g., in a smartphone. The applications may or may not need to use different functionalities of the device (video, SMS, MMS, camera, browser, music player, etc.). For example, writing SMS may not activate any peripherals device in the proximity as writing SMS is well created by the smartphone alone. However, when accessing a peripheral/peripherals could improve the user experience with an application, relevant peripheral(s) are offered for use. As an example, when listening to music with a smartphone, it might be good to know about audio peripherals nearby (e.g., headsets, stereos) that may make the music listening experience better. The peripheral(s) may be shown to the user in the Wireless Dockee screen as options to choose from. A peripheral device itself may beep/buzz/vibrate, blink a light, or say "available for use". A peripheral with a screen could show text or visual presentation indicating availability for use, or any combination of these. In case the user preferences/habits are known with an application or in a particular environment or in a particular time, the preferred peripherals may also be automatically used in the solution.

Examples of the use cases of example embodiments of the invention:

User makes a phone call—headset or speakers are offered as audio sources.

User plays a HD video—big TV screen is offered as a display.

User opens a Word document—external keyboard and/or mouse are offered as input controls to the document.

User plays music—hi-fi speakers are offered as the best or the most appropriate audio output.

User starts playing a game—big TV screen, game pad, and/or remote control are offered based on the needs of selected game User puts a mobile device on a wireless charging pad. Use of the device UI to control applications in the device becomes limited/cumbersome (even if still possible). —All the input/output peripherals that are available to help to continue the use of the smartphone applications are provided to the user (e.g., remote controller, display, keyboard, etc.)

User puts his mobile device on a wireless charging and docking station in a automobile, and the navigation application is automatically activated as a default, while simultaneously the automobile peripherals (head-up display, input controls in the steering wheel, etc.) are automatically enabled.

Figure 3B:
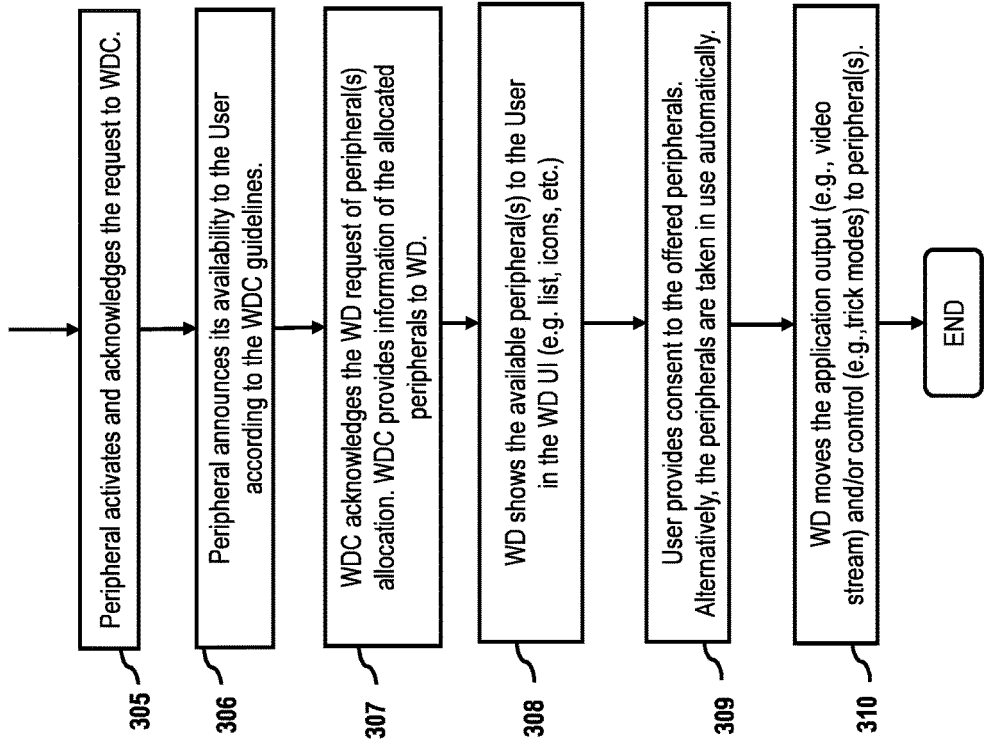
FIG. 3B illustrates an example flow diagram for an example intelligent and automatic connection activation operation in a wireless docking network, in accordance with an example embodiment of the invention.

FIG. 3B illustrates an example flow diagram 300 for an example intelligent and automatic connection activation operation in a wireless docking network, in accordance with an example embodiment of the invention. The flow diagram includes the following example steps:

Step 301: User selects and activates an application (e.g., video streaming) through the UI of a Wireless Dockee (e.g., smartphone).

Step 302: WD requests WDC to allocate peripherals for use: WD provides application identifier (e.g., video streaming) and potentially more detailed identifiers of the elementary actions required (e.g., video output/audio output with quality requirements, control with trick modes, etc.), and potential user preferences (e.g., wireless headset instead of stereo system).

Step 303: WDC finds out the most suitable peripheral(s) for the application: WDC maps the attributes/requirements received from the WD with its knowledge of each peripheral (e.g., type, capabilities, availability, proximity to the user, etc.).

Step 304: WDC requests peripheral(s) (e.g., TV screen) to activate and to announce its/their availability to the user according to the method defined by the WDC (e.g., beep/buzz/vibrate/blink light, show text/other visual method/say "available for use",etc.

Step 305: Peripheral activates and acknowledges the request to WDC.

Step 306: Peripheral announces its availability to the User according to the WDC guidelines.

Step 307: WDC acknowledges the WD request of peripheral(s) allocation. WDC provides information of the allocated peripherals to WD.

Step 308: WD shows the available peripheral(s) to the User in the WD UI (e.g. list, icons, etc.).

Step 309: User provides consent to the offered peripherals. Alternatively, the peripherals are taken in use automatically, based on the settings in a wireless dockee device.

Step 310: WD moves the application output (e.g., video stream) and/or control (e.g., trick modes) to peripheral(s).

The order of step 306 and step 307 may vary.

Based on user settings, the steps 308 and 309 may not be in use, i.e. fully automated connection activation. Consequently, the programmed action produced by the application would just begin in the optimum selection without user action needed.

Technical enablers and process steps of the invention are summarized as follows:

In WD, identification of the application and actions involved with the use of the application (writing, scrolling, moving cursor, A/V streaming, game controlling, etc.), and potential user preferences (with the application), WD signals to the WDC the application identifier, more detailed elementary actions involved, user preferences, etc.

WDC finds out the most suitable peripheral(s) for use: WDC maps the requirements received from the WD to WDC's knowledge of each peripheral (known peripheral identity, peripheral capabilities, availability, etc.) that WDC has retrieved as part of the basic docking procedures. Peripheral(s) proximity to the user could also be deployed in the WDC decision making, if possible to find out.

WDC signals to each selected peripheral a request that the peripheral should activate and should announce its availability to the user. WDC also signals to each peripheral the announcement method that is the most suitable to the situation, WDC signals information of the available peripherals to the WD, when peripheral(s) have acknowledged readiness, Peripheral(s) are announcing their availability to the user, WD shows the available peripherals in the WD UI for user consent. Alternatively, the peripherals are taken in use automatically, based on habit (e.g., previous selections) or settings.

FIG. 3C illustrates example peripheral devices, application identifiers and corresponding example user preferences for an example intelligent and automatic connection activation operation in a wireless docking network, in accordance with an example embodiment of the invention. The figure is shown in tabular form, with a row for each example peripheral device 120A-H. The columns are peripheral devices 120A-H, example application identifiers associated with each peripheral device, display low/high parameter, audio low/high parameter, test input, trick modes, point scroll, and corresponding user preferences associated with each peripheral device.

FIG. 3D illustrates example applications and corresponding example operating parameters for an example intelligent and automatic connection activation operation in a wireless docking network, in accordance with an example embodiment of the invention. The figure is shown in tabular form, with a row for each example application running in the dockee device 110. The columns are the application, display med/high parameter, audio med/high parameter, test input, trick modes, point scroll, game controls, corresponding user preferences, and example peripheral devices 120A-H associated with each example application. For example, the peripheral devices specified for video, picture gallery, and game applications may include, for example, "Big screen, e.g., TV".

FIG. 3E1 illustrates an example format for a wireless docking management frame 202, in accordance with an example embodiment of the invention. The example wireless docking management frame 202 may be a management frame 221/222 transmitted by a wireless peripheral device 120A-H at source address 225 to the wireless docking center device 100 at address 224, to deliver the information element 204 containing the capability-related information 201. In accordance with an example embodiment of the invention, the wireless docking center device 100 may formulate a specific status request to the one or more wireless peripheral devices 120A-H, based on the identification of an application 200' to be executed by the wireless dockee device 110. The wireless docking center device 100 accumulates capability information of the wireless peripheral devices 120A-H when requested by the wireless docking center device 100 or alternately by the wireless dockee device 110. Then the wireless docking center device 100 or the wireless dockee device 110 analyzes the capabilities and the planned use-related information and then allocates tasks to selected ones of the wireless peripheral devices 120A-H. In accordance with an example embodiment of the invention, the capability-related information 201 may include:

Information 207C: characterizing the peripheral device, (eg., high resolution display);

Information 208C: parameters (eg., screen resolution); and

Information 209C: parameters (eg., RGB color components).

FIG. 3E2 illustrates an example format for a wireless docking management frame for intelligent and automatic connection activation from the dockee device to the docking center device, in accordance with an example embodiment of the invention. The planned use-related information 201' may include example fields such as:

Information 207C' : video teleconferencing application to be run in dockee;

Information 208C' : required parameters (eg., specific high definition screen resolution); and Information 209C: required parameters (eg., RGB color components).

In accordance with an example embodiment of the invention, the WD receives knowledge of each peripheral from the WDC, and WD finds out the most suitable peripheral(s) for use. WD then also signals the requests to peripherals through the WDC to activate and announce availability to the user with the information of the most suitable announcement method. WD knows availability of peripherals through the acknowledgement of readiness from peripherals through the WDC.

In accordance with an example embodiment of the invention, the WDC may be missing and WD will take care of all the decision making, communication and connections with peripherals.

C. Summary Intelligent and Automatic Connection Activation

Summary Docking Center Method

Example Embodiment 1

A method, comprising:

receiving, by a wireless docking center device, from one or more wireless peripheral devices, capability-related information characterizing the one or more wireless peripheral devices;

receiving, by the wireless docking center device, from a wireless dockee device, an identification of an application to be executed by the wireless dockee device; and analyzing, by the wireless docking center device, the received capability-related information and identification of the application to be executed by the wireless dockee device, and performing an action with respect to one or more wireless peripheral devices capable of performing services required by the identification of an application to be executed by the wireless dockee device, based on the analysis.

Example Embodiment 2

The method of Example embodiment 1, further comprising:

transmitting, by the wireless docking center device, to the wireless dockee device, information resulting from the analysis, for user notification/information by a user interface of selected ones of the one or more wireless peripheral devices capable of performing services required by the identified application.

Example Embodiment 3

The method of Example embodiment 1, further comprising:

analyzing, by the wireless docking center device, the received capability-related information and received identification of the application; and providing, by the wireless docking center device, information resulting from the analysis, for performing an action with respect to the one or more wireless peripheral devices capable of performing services required by the identified application.

Example Embodiment 4

The method of Example embodiment 1, further comprising:

receiving, by the wireless docking center device, from the wireless dockee device, user preferences associated with the identified application;

analyzing, by the wireless docking center device, the received capability-related information, the received identification of the application, and the received user preferences; and providing, by the wireless docking center device, information resulting from the analysis, to the one or more wireless peripheral devices and the wireless dockee device, for automatically performing an action with respect to one or more of the wireless peripheral devices capable of performing services required by the identified application and capable of providing the user preferences associated with the identified application.

Example Embodiment 5

The method of Example embodiment 1, further comprising:
transmitting by the wireless docking center device, a status request to the one or more wireless peripheral devices, based on the identified application; and
receiving, by the wireless docking center device, from one or more wireless peripheral devices, in response to the status request, information characterizing the one or more wireless peripheral devices.

Example Embodiment 6

The method of Example embodiment 1, further comprising:
transmitting by the wireless docking center device, a request to the one or more wireless peripheral devices, to activate and announce its availability to the user according to the identified application;
receiving, by the wireless docking center device, from one or more wireless peripheral devices, in response to the request, an acknowledgement of the request; and
transmitting, by the wireless docking center device, to the dockee device, an identity of one or more wireless peripheral devices that can satisfy the request.

SUMMARY DOCKEE METHOD

Example Embodiment 1

A method, comprising:
receiving, by a wireless dockee device, from a wireless docking center device, capability-related information characterizing one or more wireless peripheral devices;
analyzing, by the wireless dockee device, the capability-related information characterizing the one or more wireless peripheral devices and an identification of an application to be executed by the wireless dockee device; and
performing, by the wireless dockee device, an action with respect to one or more wireless peripheral devices capable of performing services required by the application to be executed by the wireless dockee device, based on the analysis.

Example Embodiment 2

The method of Example embodiment 1, further comprising:
presenting, by the wireless dockee device, information resulting from the analysis, for user notification/information by a user interface of selected ones of the one or more wireless peripheral devices capable of performing services required by the identified application.

Example Embodiment 3

The method of Example embodiment 1, further comprising:
providing, by the wireless dockee device, information resulting from the analysis, to the one or more wireless peripheral devices, for automatically performing an action with respect to one or more of the wireless peripheral devices capable of performing services required by the identified application.

Example Embodiment 4

The method of Example embodiment 1, further comprising:
analyzing, by the wireless dockee device, the received capability-related information, the identification of the application, and user preferences associated with the identified application; and
providing, by the wireless dockee device, information resulting from the analysis, to the one or more wireless peripheral devices, for automatically performing an action with respect to one or more of the wireless peripheral devices capable of performing services required by the identified application and capable of providing the user preferences associated with the identified application.

Example Embodiment 5

The method of Example embodiment 1, further comprising:
transmitting by the wireless dockee device, to the wireless docking center device, a request to allocate one or more wireless peripheral devices, according to the identified application;
receiving, by the wireless dockee device, from the wireless docking center device, an identity of one or more wireless peripheral devices that can satisfy the request; and
performing, by the wireless dockee device, either a display to the user of the identity of one or more wireless peripheral devices that can satisfy the request or an automatic selection of the one or more wireless peripheral devices that can satisfy the request.

Example Embodiment 6

The method of Example embodiment 1, wherein the wireless dockee device receives from one or more wireless peripheral devices, capability-related information characterizing the one or more wireless peripheral devices.

SUMMARY PERIPHERAL DEVICE METHOD

Example Embodiment 1

A method, comprising:
receiving, by a wireless peripheral device, a request from a wireless docking center device, to activate and announce its availability to a user, according to an identified application;
activating and announcing, by the wireless peripheral device, its availability to the user, according to the identified application; and
transmitting, by the wireless peripheral device, to the wireless docking center device, in response to the request, an acknowledgement of the request, that the wireless peripheral devices can satisfy the request.

D. Notification Based on User Proximity to Peripheral Device

An example embodiment of the invention enables a wireless docking center device 100 to automatically receive a notification of the proximity of the user to a particular one of the wireless peripheral devices 120A-H, to enable the display of relevant information by the particular proximate peripheral device, when the user approaches the proximity of that proximate peripheral device. The information of proximity may be received when the dockee device 110 (primary device), such as a smartphone running the application, is not present at user's location. In response to the notice of proximity, relevant information may be sent from the dockee device 110 (primary device) to the particular one of the peripheral devices, such as breaking news, latest share price of the companies of concern, update of weather forecast of the place of interest, sensor data, such as battery status, a notification of incoming calls, or a received message-mail, calendar alerts, etc. The relevant information to be displayed, is sent to the particular wireless peripheral device that is most proximate to the RF emitter or proximity detection tag 210 in possession of the user.

In an example embodiment of the invention, one or more wireless peripheral devices 120A-H able to notify proximity and display relevant information to the user, such as a TV screen or monitor, may be used for displaying the relevant information to the user. The user's presence may be detected in the vicinity of a particular one of the peripheral devices that is most proximate to the RF emitter or proximity detection tag 210 in possession of the user. The particular proximate peripheral device transmits to the wireless docking center device 100, a wireless docking management frame containing information of the proximity of the user. The wireless docking center device 100 then notifies the wireless dockee device 110 that the user is proximate to the particular proximate peripheral device. The wireless dockee device 110 may specifically address the particular proximate peripheral device in transmitting the relevant information. The particular proximate peripheral device receives the relevant information and displays it to the user. If the user were to move away from the particular proximate peripheral device and closer to a second wireless peripheral device capable of displaying the relevant information, the second device sends a notice of proximity and takes over the display of the relevant information to the user, in the same manner. The information may be provided without specific user requests and may take into account the user's preferences for notification location, format, frequency, etc.

Alternately, in an example embodiment of the invention, the wireless dockee device may analyze the information of proximity of a user to the particular proximate peripheral device and planned use-related information, and perform an action with respect to the particular proximate peripheral device, based on the analysis.

Figure 4A:
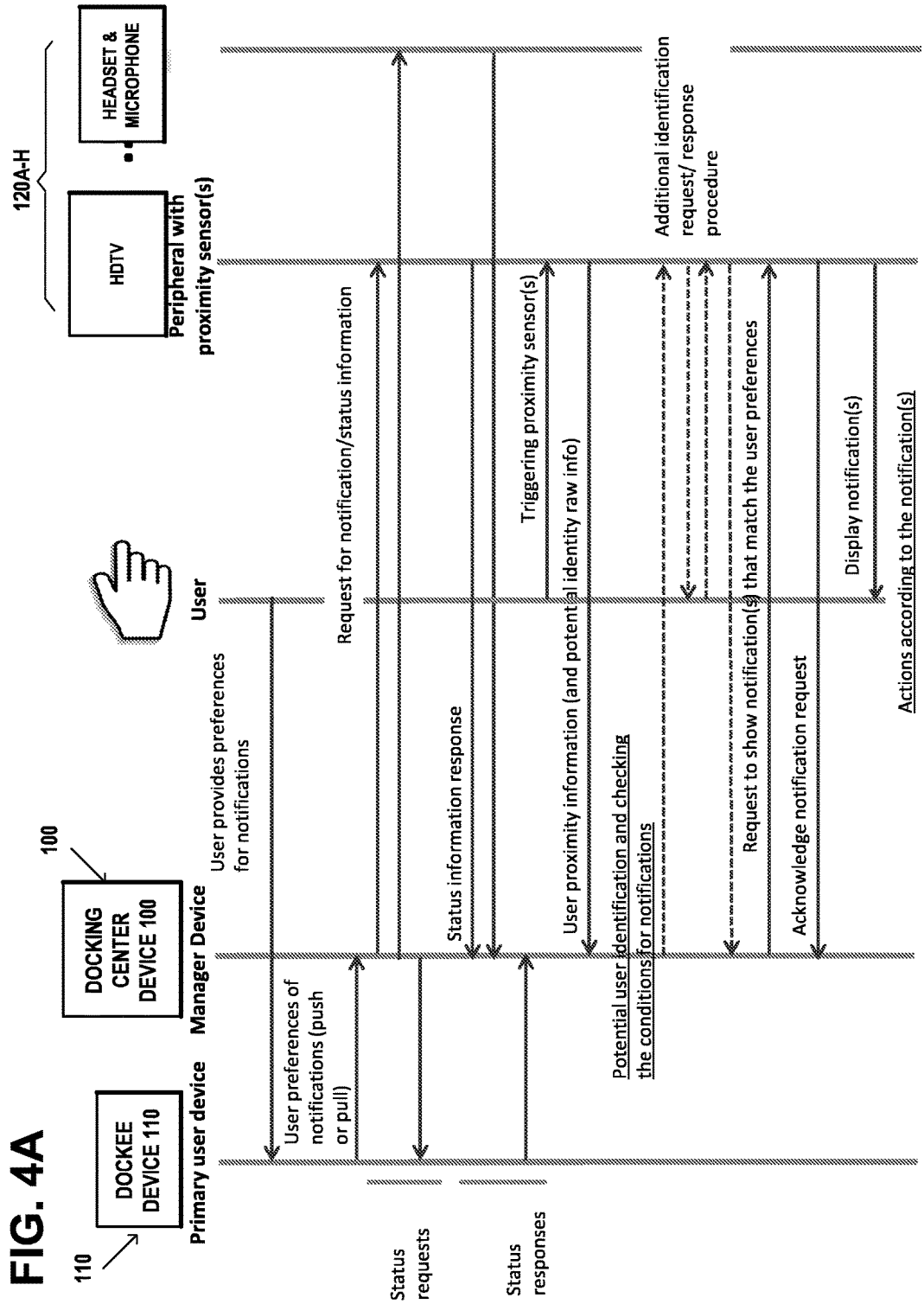
FIG. 4A illustrates an example sequence diagram for notification based on user proximity to a peripheral device in a wireless docking network, in accordance with an example embodiment of the invention.

FIG. 4A illustrates an example sequence diagram for information based on user proximity to a peripheral device in a wireless docking network, in accordance with an example embodiment of the invention.

In accordance with an example embodiment of the invention, the wireless docking center device 100 may receive from the one or more wireless peripheral devices 120A-H, capability-related information characterizing the one or more wireless peripheral devices 120A_H. In an example embodiment of the invention, the capability-related information may include information of proximity of a user to one of the one or more peripheral devices.

In an example embodiment of the invention the information of proximity of a user to one of the one or more peripheral devices 120A-H, may be determined from proximity of an RF emitter or proximity detection tag in possession of the user, as shown in FIG. 1E.

In an example embodiment of the invention the information of proximity of a user to one of the one or more peripheral devices 120A-H, determined by the proximity unit 214, based on at least one of facial recognition of the user, light sensor, thermal sensor, motion sensor, and audio sensor, as shown in FIG. 1C.

In accordance with an example embodiment of the invention, the wireless docking center device 100 may receive from the wireless dockee device 110, planned use-related information of the wireless dockee device. For example, planned use-related information may be an identity of a programmed application to be run on the wireless dockee device 110.

The wireless docking center device 100 may analyze the information of proximity of the user and received identification of the application.

The wireless docking center device 100 may provide a command resulting from the analysis, to the one of the one or more wireless peripheral devices 120A-H, to perform services required by the identified application, such as displaying or presenting information relevant to the application running on the dockee device.

FIG. 4B1 illustrates an example format for a wireless docking management frame 202, in accordance with an example embodiment of the invention. The example wireless docking management frame 202 may be a management frame 221/222 transmitted by a wireless peripheral device 120A-H at source address 225 to the wireless docking center device 100 at address 224, to deliver the information element 204 containing the capability-related information 201. In accordance with an example embodiment of the invention, a wireless peripheral device 120A-H may send a information of the proximity of a user to the peripheral device, as part of its capability-related information characterizing the device. In accordance with an example embodiment of the invention, the capability-related information 201 may include:

Information 207D: information of the proximity of a user to the peripheral device;

Information 208D: updated parameters; and

Information 209D: updated parameters.

FIG. 4B2 illustrates an example format for a wireless docking management from the dockee device to the docking center device, in accordance with an example embodiment of the invention. The planned use-related information 201' may include example fields such as:

Information 207D': "User preferences" indicates what, when, how the desired notification information is presented to the user by the selected peripheral;

Information 208D': required parameters; and

Information 209D': required parameters.

Figure 4C:
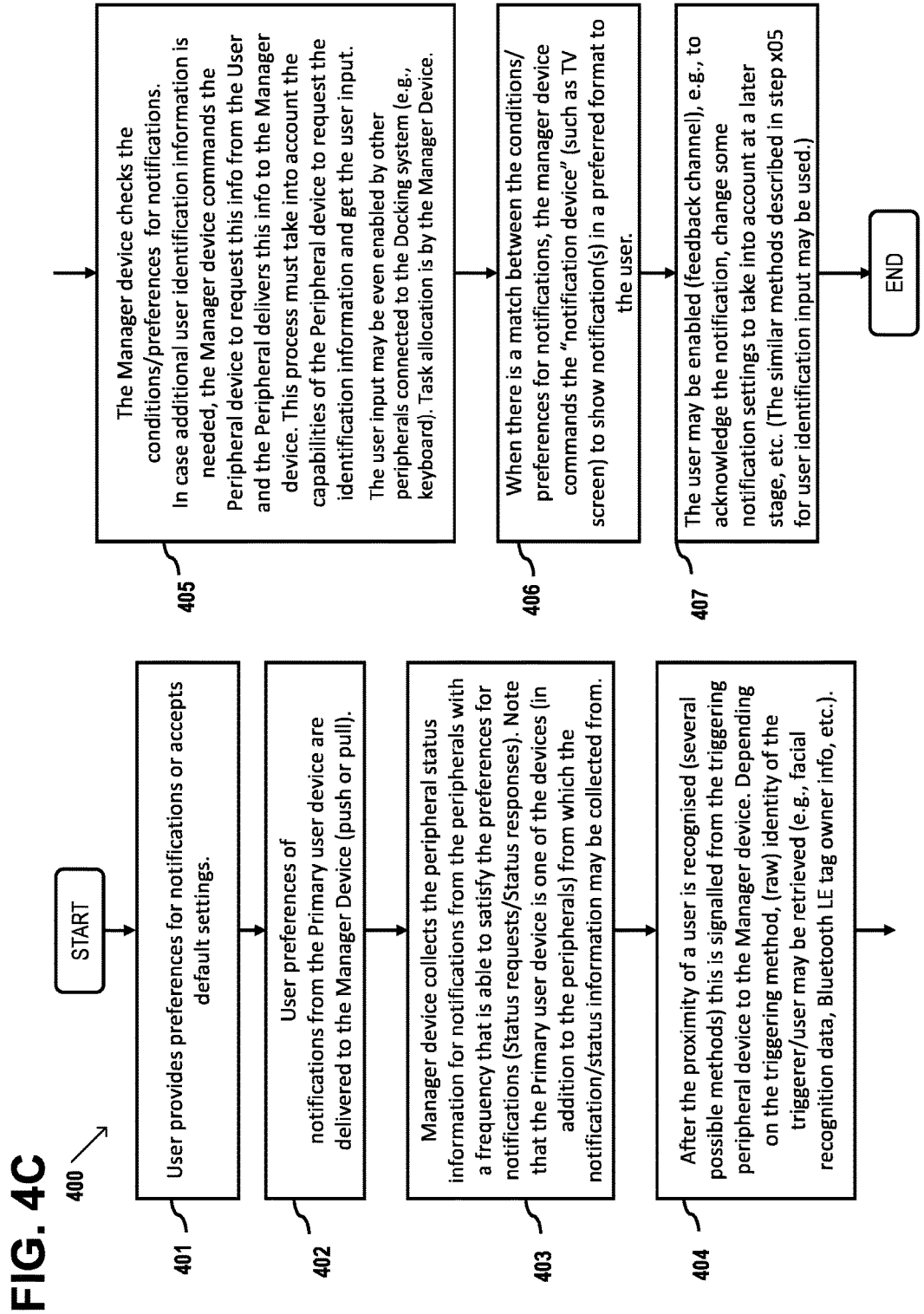
FIG. 4C illustrates an example flow diagram for an example notification of the proximity of a user to the peripheral device operation in a wireless docking network, in accordance with an example embodiment of the invention.

FIG. 4C illustrates an example flow diagram 400 for an example information of the proximity of a user to the peripheral device operation in a wireless docking network, in accordance with an example embodiment of the invention. The flow diagram includes the following example steps:

Step 401: User provides preferences for notifications or accepts default settings.

Step 402: User preferences of notifications from the dockee device 110 (Primary user device) are delivered to the wireless docking center device 100 (Manager Device) (push or pull).

Step 403: Manager device collects the peripheral status information for notifications from the peripherals with a frequency that is able to satisfy the preferences for notifications (Status requests/Status responses). Note that the dockee or Primary user device is one of the devices (in addition to the peripherals) from which the notification/status information may be collected from.

Step 404: After the proximity of a user is recognized (several possible methods) this is signaled from the triggering peripheral device to the Manager device. Depending on the triggering method, (raw) identity of the triggerer/user may be retrieved (e.g., facial recognition data, Bluetooth LE tag owner info, etc.).

Step 405: The Manager device checks the conditions/preferences for notifications. In case additional user identification information is needed, the Manager device commands the Peripheral device to request this info from the User and the Peripheral delivers this info to the Manager device. This process must take into account the capabilities of the Peripheral device to request the identification information and get the user input. The user input may be even enabled by other peripherals connected to the Docking system (e.g., keyboard). Task allocation is by the Manager Device.

Step 406: When there is a match between the conditions/preferences for notifications, the manager device commands the "notification device" (such as TV screen) to show notification(s) in a preferred format to the user.

Step 407: The user may be enabled (feedback channel), e.g., to acknowledge the notification, change some notification settings to take into account at a later stage, etc. (The similar methods described in step 405 for user identification input may be used.)

FIG. 4D1 illustrates an example network diagram of a wireless docking scenario where the wireless docking center device 100 may measure a first distance DF to an RF emitter or proximity detection tag 210 in the possession of the user and a second distance DB to a peripheral device 120G over a communications link 115B, and then determine that the user has approached the proximity of that peripheral device 120G by taking the difference between DB and DF, in accordance with an example embodiment of the invention.

Distances such as DF and DB between two devices may be measured based on the received signal strength indicator (RSSI) of received signals. The RSSI is a measurement of the power present in a received radio signal. Bluetooth receiver circuits may include an RSSI detector circuit to measure the strength of an incoming signal and generate an output representing the signal strength. The Bluetooth LE Proximity Profile enables two devices to detect their proximity by measuring the Radio Signal Strength Information (RSSI) of the connection between the devices.

In an example embodiment of the invention, the wireless docking center device 100 may measure a first distance DF and first angle of arrival (AoA) direction to the RF emitter or proximity detection tag 210 of the user and a second distance DB and second angle of arrival (AoA) direction to the peripheral device 120G over the communications link, and then determine that the user has approached the proximity of that peripheral device.

In angle of arrival (AoA) direction estimation, a directional transceiver wireless device, such as the wireless docking center device 100, may include an array of antennas arranged with a normal axis. For a linear antenna array along a linear axis of the directional transceiver, a normal axis perpendicular to the linear axis defines a plane with the linear antenna array. The apparent direction of reception of an AoA packet by the linear antenna array of the directional transceiver, as seen from a transmitting beaconing tag wireless device, such as the RF emitter or proximity detection tag 210 of the user occupying the plane, may be represented by an observation vector. The angle between the observation vector and the normal axis is defined as the angle of arrival (AoA) of the signal from the tag 210 as it approaches the antenna array of the directional transceiver of the wireless docking center device 100. A similar apparent direction of reception of an AoA packet from the transmitting wireless peripheral device 120G, may be determined by the wireless docking center device 100.

In an example embodiment of the invention, the wireless docking center device 100 may identify a specific user by the Bluetooth device address of the RF emitter or proximity detection tag 210 of the user. The Bluetooth device address is a unique, 48-bit address that may be used to identify a particular device during operations such as connecting to, pairing with, or activating the device.

FIG. 4D2 illustrates an example network diagram of a wireless docking scenario where the wireless dockee device 110 may measure a first distance DE to an RF emitter or proximity detection tag 210 in the possession of the user and a second distance DC to a peripheral device 120G over a communications link 115C, and then determine that the user has approached the proximity of that peripheral device 120G by taking the difference between DC and DE, in accordance with an example embodiment of the invention.

In an example embodiment of the invention, the wireless dockee device 110 may measure a first distance DE and first angle of arrival (AoA) direction to the RF emitter or proximity detection tag 210 of the user and a second distance DC and second angle of arrival (AoA) direction to the peripheral device 120G over the communications link, and then determine that the user has approached the proximity of that peripheral device.

In angle of arrival (AoA) direction estimation, a directional transceiver wireless device, such as the wireless dockee device 110, may include an array of antennas arranged with a normal axis. For a linear antenna array along a linear axis of the directional transceiver, a normal axis perpendicular to the linear axis defines a plane with the linear antenna array. The apparent direction of reception of an AoA packet by the linear antenna array of the directional transceiver, as seen from a transmitting beaconing tag wireless device, such as the RF emitter or proximity detection tag 210 of the user occupying the plane, may be represented by an observation vector. The angle between the observation vector and the normal axis is defined as the angle of arrival (AoA) of the signal from the tag 210 as it approaches the antenna array of the directional transceiver of the wireless dockee device 110. A similar apparent direction of reception of an AoA packet from the transmitting wireless peripheral device 120G, may be determined by the wireless dockee device 110.

In an example embodiment of the invention, the wireless dockee device 110 may identify a specific user by the Bluetooth device address of the RF emitter or proximity detection tag 210 of the user. The Bluetooth device address is a unique, 48-bit address that may be used to identify a particular device during operations such as connecting to, pairing with, or activating the device.

Figure 3B:
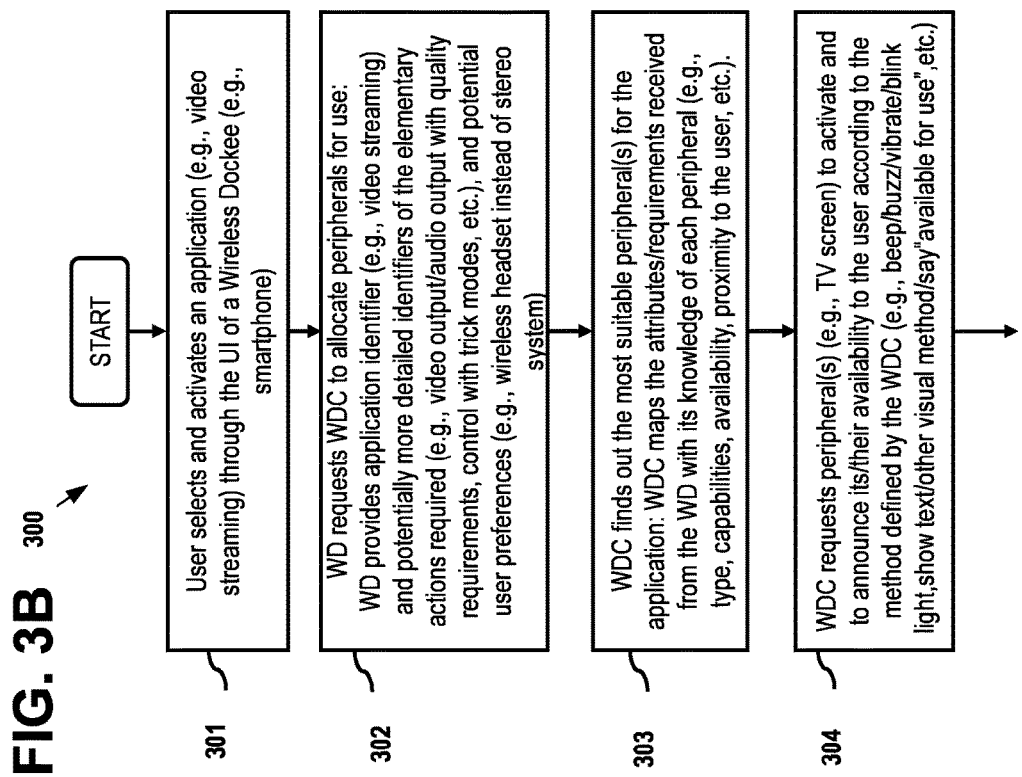

FIG. 4D3 illustrates an example network diagram of a wireless docking scenario where the wireless docking center device 100 may automatically receive a notification of the proximity of the user to a particular one of the wireless peripheral devices 120A-H, to enable the display of relevant information by the particular proximate peripheral device, when the user approaches the proximity of that proximate peripheral device. The user's presence may be detected in the vicinity of a particular proximate peripheral device by means of an RF emitter or proximity detection tag 210 in the possession of the user, in accordance with an example embodiment of the invention.

In an example embodiment of the invention, one or more wireless peripheral devices 120A, 120G, and 120J are display monitors that are equipped with Bluetooth LE proximity detectors 210, as shown in FIG. 1E. These three peripheral devices may be distributed in various locations about the user's office. The user carries a Bluetooth LE proximity emitter or proximity detection tag 210, for example as a wrist watch or other wearable device. The user's wireless dockee device 110, such as the user's smart phone, is running an application, for example an email program that randomly receives email messages via a cell phone link to the Internet. The user's wireless dockee device 110 is able to display it's received email messages on its own display screen or it may transmit the screen image of the received messages via the wireless communication link 115C to any of the display monitors, wireless peripheral devices 120A, 120G, and 120J. The wireless communication link 115C may be one or more example communications protocols such as the Bluetooth communications protocol, Bluetooth LE communications protocol, and the IEEE 802.11 wireless LAN (WLAN) protocol. In this scenario, the user's dockee device 110, such as the user's smart phone, has been placed on the user's desk and the user is walking about the office, sequentially passing the display monitors, wireless peripheral devices 120J, 120G, and 120A.

As the user approaches the display monitor, wireless peripheral device 120J, the user's Bluetooth LE proximity emitter or proximity detection tag 210 may be detected by the Bluetooth LE proximity detector 210 in the proximate peripheral device 120J. The Bluetooth LE RF signal is shown as wireless communication 115D (step 1) in FIG. 4D3. In response, the display monitor, wireless peripheral device 120J transmits to the wireless docking center device 100, via the wireless communication link 115B", a wireless docking management frame 202 containing notification 207D of the proximity of the user (step 2). The wireless docking center device 100 then transmits the proximity notification to the wireless dockee device 110, via the wireless communication link 115A, indicating that the user is proximate to the wireless peripheral device 120J (step 3). The wireless dockee device 110 may then specifically address the display monitor, wireless peripheral device 120J in transmitting the screen image of the received messages via the wireless communication link 115C (step 4). Alternately, the wireless dockee device 110 may mirror the screen image of the received messages via the wireless communication link 115C. The display monitor, wireless peripheral device 120J receives the screen image of the received messages and displays it to the user. To maintain some measure of confidentiality of the information displayed, the display operation for display monitor, wireless peripheral device 120J, may have been disabled until the proximity of the user has been detected. The unique device ID of the Bluetooth LE proximity emitter or proximity detection tag 210 may be used as a credential for enabling the display.

If the user were to move away from the first display monitor, wireless peripheral device 120J and closer to a second display monitor, wireless peripheral device 120G capable of displaying the screen image of the received messages, the second display monitor 120G may send to the wireless docking center device 100, a notice of proximity via the second wireless communication link 115B'. The wireless dockee device 110 may then specifically address the second display monitor, wireless peripheral device 120G in transmitting the screen image of the received messages via the wireless communication link 115C. The second display monitor, wireless peripheral device 120G may then resume the display of the screen image of the received messages to the user, who is now near the second display monitor. The information may be provided without specific user requests and may take into account the user's preferences for notification location, format, frequency, etc.

The wireless docking center device 100 may be able to locate a TV peripheral device and a moving user, based on Bluetooth LE tags and the proximity trigger. The wireless docking center device 100 may calculate their separation distance. The identification of the user may be based on an earlier pairing of the user's Bluetooth LE proximity tag with the Bluetooth LE proximity detector of the dockee device 110. The Bluetooth device address is a unique, 48-bit address that may be used to identify a particular device during operations such as connecting to, pairing with, or activating the device. The identification information may be delivered to the wireless docking center device 100.

In an example embodiment of the invention, user's presence in the vicinity of one or more of the networked device(s), that is/are able to show information to the user (such as TV screen or monitor), is recognized based on proximity sensor(s). The sensor(s) may comprise of light sensor, thermal sensor, motion sensor, audio sensor, etc.

In an example embodiment of the invention, when a user is recognized to be close to a device (e.g., TV screen), the user may be informed of the status, or other relevant information of any device coupled with the dockee device 110 (primary user device) (e.g., smartphone). For example, the status of battery charging level of the smartphone itself or any other device connected to the smartphone may be shown in the TV screen ("battery is full", if charging, or "the battery level of the smartphone is low and needs immediate charging", if not charging). In one embodiment the notification is shown when the user is approaching the proximity of the output device, like the television, and the notifications are disappearing when going further off without other user's interaction required. There could be a time limit when illustrating the notification again, so that the user is not annoyed. In another embodiment, the notification (when triggered) is set to be active only for a predefined time and disappears after the predefined time.

In an example embodiment of the invention, the notification information will only be shown if the user is close to the display and if there is valid "alert" or "reminder" pending. For example, the display will show battery level or other information only in the case there is a real need for the information, e.g., when battery charging level is under acceptable limit. The device managing the connections and information sharing between the networked devices may also learn the habits of a user and based on that make specific notifications to the user. For example, if the users in a family seem to play a game with certain time of hours, there might be more information, e.g., about the charging status of the gaming device, and more frequently closer to the game start than in other times. Besides, the user may enable or disable the creation of notifications based on settings in the smartphone or the networked device(s), that is/are able to show information to the user (such as TV screen or monitor). A user is enabled to select the applications or events (in the primary device or any other connected device) that may generate notification. For example, a user might be interested only about notification about a missed call, if (s)he is expecting a call, or (s)he might be interested about knowing only about any goal scored in the ongoing soccer match of the team of his/her interest from a sports application, or he may be interested about any breaking news in a CNN application.

In an example embodiment of the invention, the notification information may be communicated visually/graphically, in text, in audio, etc. In an embodiment, the display is divided to pieces or tiles. Every alert or reminder is linked/assigned to a predefined piece or tile and only the one or that part to which the alert or reminder relates will be powered for the moment the user is close enough and something is to be updated, alerted or reminded. In one embodiment, the notification may be given by an audio alert or smaller icon in one corner of the display, e.g., when user is watching a television program and he doesn't want that the watching experience is disturbed with a notification over the program on the screen.

In an example embodiment of the invention, the exact user identification of the person who triggers the proximity sensors for notifications may be a valuable feature of the proposed system. In one embodiment there could be a direct person recognition, e.g., through facial recognition with camera in the device with proximity sensors.

In an example embodiment of the invention, the user is not directly identified but, e.g., the picture of the dockee device 110 (primary user device) (such as smartphone) and/or picture of the device owner for identification purposes may be shown in the display of the notification device after proximity sensor triggering. As there may be several people whose primary devices are simultaneously connected to the system (like multiple Dockees in a Wireless Docking system), this may allow the right user to access the personal notification messages. The user may then provide a unique identifier to the system (e.g., pin code, voice recognition, fingerprint), if requested, to see the actual personal notifications.

In an example embodiment of the invention, the notifications may be automatically attached to the device (e.g., screen) that is closest to the location where the user left the primary device. In this case it is assumed there is no need to exactly identify the user in a proximity to a connected device. The wireless docking center device 100 (manager device) of the system may figure out the locations of the connected devices.

In an example embodiment of the invention, the user identification is based on his primary device put on a wireless charging pad. If there is only one device on the charging pad it is possible to assume that the user in the proximity of any of the devices connected to the system (e.g., in a docking environment) is the one whose device is on the wireless charging pad. This method could be considered as the 'best effort recognition' of the user.

In an example embodiment of the invention, when a device is put on a charging pad the system may interpret this as a permission to give notifications without limitations, i.e., no need to identify the user. In particular, in a family environment it could be acceptable to notify everyone in the family by whichever peripheral, e.g., of the battery level of devices. Any family member may act according to the notification or reject the notification and then no further notifications of a particular device is shown to the user.

In an example embodiment of the invention, the notification may also include controls (e.g., virtual control buttons) that allow the user to control the device causing the notification. One aspect may be - providing means to the user to respond/act based on the notification. For example, if there is a new message user might be able to see the message, accept/reject and/or draft a reply. Similarly, if there is news, the user might have option to go to the right page/portal to see the detail news on the TV screen. Another example may be, that user is able to put the device in a sleep mode, when there is notification of a critical battery level A detailed example of a technical implementation of an example embodiment of the invention is shown in FIG. 4A.

Example technical enablers and process steps are summarized as follows:

- The device with the interfacing application (e.g., smartphone) is connected to number of devices through wireless connections (Wi-Fi, Bluetooth, etc.).
- The capabilities of each connected device to announce notifications is collected and known by the wireless docking center device 100 (manager device). The manager device may be the smartphone or a specific device, like a Wireless Docking Center, in a Wireless docking system.
- The user preferences for alerts/reminders (what, when, how) are retrieved from the user's dockee device 110 (primary device) (e.g., smartphone) and possibly stored in the manager device. Alternatively, user preferences for alerts/reminders (what, when, how) are stored only in the primary device, if it is managing the process.
- The required information for notifications is collected from each connected device according to the user preferences and stored to the manager device.
- The connected device, with sensor(s) to recognize the user, and selected by the manager device to be used for notifications, delivers the recognition data to the manager device after user triggering.
- The manager device processes this data, potentially for exact user identification, and checks the conditions (user preferences) for notification(s). When there is a match, the manager device commands the "notification device" (such as TV screen) to show notification(s) in a preferred format to the user. Alternatively, the dockee or primary user device may be responsible for processing the data.
- There may be a (feed)back channel from the user through the "notification device" to the manager device to enable user to, e.g., identify himself, acknowledge the notification, or change some notification settings to take into account at a later stage.

In an example embodiment of the invention, may only use some/selected steps based on use case or for simplicity. For example, user identification recognition might be skipped, as mentioned before. Information collection for notifications might be only allowed from the dockee or primary device (smartphone).

D. Summary Notification Based on User Proximity to Peripheral Device

Summary Docking Center Method

Example Embodiment 1

A method, comprising:

receiving, by a wireless docking center device, from one or more wireless peripheral devices, information of proximity of a user to one of the one or more peripheral devices;

receiving, by the wireless docking center device, from a wireless dockee device, planned use-related information of the wireless dockee device; and analyzing, by the wireless docking center device, the received information of proximity of a user to one of the one or more peripheral devices and the planned use-related information, and performing an action with respect to one or more wireless peripheral devices capable of a presentation of a notification to the user, based on the analysis.

Example Embodiment 2

The method of Example embodiment 1, further comprising:
providing, by the wireless docking center device, a command resulting from the analysis, to the one of the one or more wireless peripheral devices, to present a notification to the user.

Example Embodiment 3

The method of Example embodiment 1, wherein the planned use-related information is an identification of an application to be executed by the wireless dockee device;
providing, by the wireless docking center device, a command resulting from the analysis, to the one of the one or more wireless peripheral devices, to at least one of present a notification and perform a presentation to the user.

Example Embodiment 4

The method of Example embodiment 1, wherein the information of proximity of a user to one of the one or more peripheral devices is determined from proximity of a proximity detection tag in possession of the user.

Example Embodiment 5

The method of Example embodiment 1, wherein the wireless docking center device measures a first distance to a proximity detection tag of the user and a second distance to a peripheral device over a communications link, and then determines that the user has approached the proximity of that peripheral device.

Example Embodiment 6

The method of Example embodiment 1, wherein the wireless docking center device measures a first distance and first direction to a proximity detection tag of the user and a second distance and second direction to a peripheral device over a communications link, and then determines that the user has approached the proximity of that peripheral device.

Example Embodiment 7

The method of Example embodiment 1, wherein the information of proximity of a user to one of the one or more peripheral devices is determined by at least one of facial recognition of the user, light sensor, thermal sensor, motion sensor, and audio sensor.

Example Embodiment 8

The method of Example embodiment 1, wherein the information of proximity of a user includes information identifying a specific user based on a proximity detection tag in possession of the user.

Example Embodiment 9

A method, comprising:
receiving, by a wireless docking center device, from one or more wireless peripheral devices, information of proximity of a user to one of the one or more peripheral devices; and
analyzing, by the wireless docking center device, the received information of proximity of a user to one of the one or more peripheral devices, and performing an action with respect to one or more wireless peripheral devices capable of a presentation of a notification to the user, based on the analysis.

SUMMARY DOCKEE METHOD

Example Embodiment 1

A method, comprising:
receiving, by a wireless dockee device, from a wireless docking center device, information of proximity of a user to one of one or more peripheral devices;
analyzing, by the wireless dockee device, the information of proximity of the user to one of the one or more peripheral devices and planned use-related information; and
performing, by the wireless dockee device, an action with respect to one or more wireless peripheral devices capable of a presentation of a notification to the user, based on the analysis.

Example Embodiment 2

The method of Example embodiment 1, further comprising:
providing, by the wireless dockee device, a command resulting from the analysis, to the one of the one or more wireless peripheral devices, to present a notification to a user.

Example Embodiment 3

The method of Example embodiment 1, wherein the planned use-related information is an identification of an application to be executed by the wireless dockee device;
providing, by the wireless dockee device, a command resulting from the analysis, to the one of the one or more wireless peripheral devices, to perform a presentation of a notification to the user.

Example Embodiment 4

The method of Example embodiment 1, wherein the information of proximity of a user to one of the one or more peripheral devices is determined from proximity of a proximity detection tag in possession of the user.

Example Embodiment 5

The method of Example embodiment 1, wherein the information of proximity of a user to one of the one or more peripheral devices is determined by at least one of facial recognition of the user, light sensor, thermal sensor, motion sensor, and audio sensor.

Example Embodiment 6

The method of Example embodiment 1, wherein the wireless dockee device measures a first distance to a proximity detection tag of the user and a second distance to a peripheral device over a communications link, and then determines that the user has approached the proximity of that peripheral device.

Example Embodiment 7

The method of Example embodiment 1, wherein the wireless dockee device measures a first distance and first direction to a proximity detection tag of the user and a second distance and second direction to a peripheral device over a communications link, and then determines that the user has approached the proximity of that peripheral device.

Example Embodiment 8

The method of Example embodiment 1, wherein the information of proximity of a user includes information identifying a specific user based on a proximity detection tag in possession of the user.

Example Embodiment 9

The method of Example embodiment 1, wherein the wireless dockee device receives from one or more wireless peripheral devices, capability-related information characterizing the one or more wireless peripheral devices.

Example Embodiment 10

A method, comprising:
receiving, by a wireless dockee device, from one or more wireless peripheral devices, information of proximity of a user to one of the one or more peripheral devices; and
analyzing, by the wireless dockee device, the received information of proximity of a user to one of the one or more peripheral devices, and performing an action with respect to one or more wireless peripheral devices capable of a presentation of a notification to the user, based on the analysis.

SUMMARY PERIPHERAL DEVICE METHOD

Example Embodiment 1

A method, comprising:
detecting, by a wireless peripheral device, proximity of a user;
transmitting, by the wireless peripheral device, to a wireless docking center device, information of proximity of the user; and
receiving, via the wireless docking center device, selection by the wireless dockee device, to perform of a notification, in response to the detected proximity of the user.

Example Embodiment 2

The method of Example embodiment 1, wherein the detection of proximity of a user is determined from proximity of a proximity detection tag in possession of the user.

Example Embodiment 3

The method of Example embodiment 1, wherein the detection of proximity of a user is determined by at least one of facial recognition of the user, light sensor, thermal sensor, motion sensor, and audio sensor.

Example Embodiment 4

The method of Example embodiment 1, wherein the wireless peripheral device transmits information to the wireless docking center device to enable measurement of a distance and direction to the wireless peripheral device, to enable a determination that the user has approached the proximity of that peripheral device.

Example Embodiment 5

The method of Example embodiment 1, wherein the wireless peripheral device transmits information to the wireless dockee device to enable measurement of a distance and direction to the wireless peripheral device, to enable a determination that the user has approached the proximity of that peripheral device.

E. Redirection of Data Transmission Between Peripherals

An example embodiment of the invention incorporates a new approach in the data communication (transmission) in docking, so that selected payload data may be transmitted directly between specific input/output peripherals without routing the data via the WD (the device running the application). An example embodiment of the invention enables transmission of data to the final destination with minimum transmission hops. An example embodiment of the invention leads to faster data transmission, help avoiding unnecessary coding (decoding & encoding) cycles, and help to optimize power efficiency in WD.

An example embodiment of the invention, the WDC re-directs/directly forwards the data coming from the peripheral acting as a data source to the peripheral acting as a data output (display, audio, text, etc.) for a user without involving the WD in the payload data transmission path. As WDC is managing connections to all the peripherals, it knows the connection topology and connection interfaces between the peripherals. This combined with the information (retrieved from the WD) of the application running in the WD, the data streams involved, and potentially the preferred user preferences for the input and output devices enables the WDC to define the optimum route for the payload from the input peripheral(s) to the output peripheral(s).

Figure 5A:
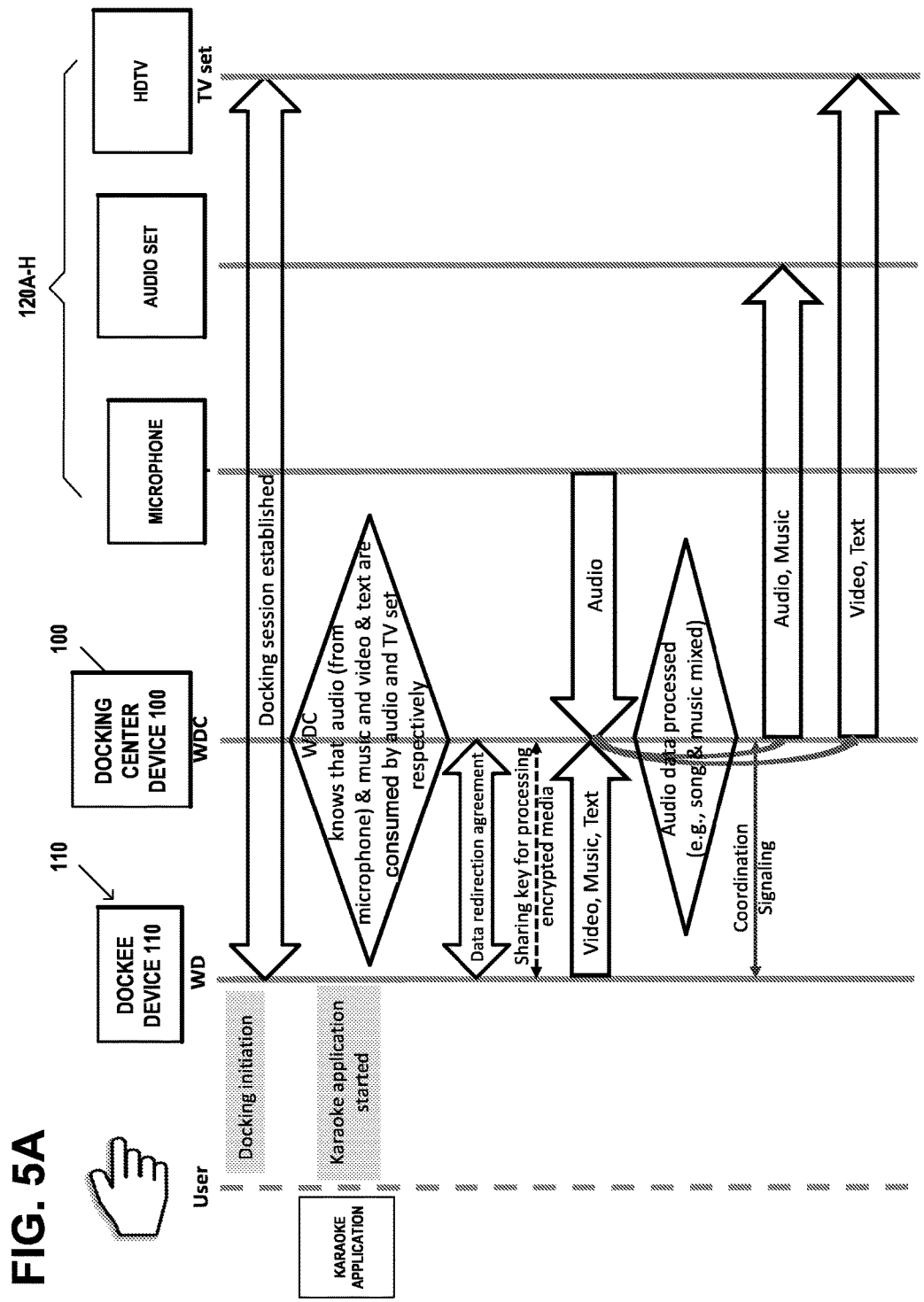
FIG. 5A illustrates an example sequence diagram for redirecting data transmission between peripherals in a wireless docking network, in accordance with an example embodiment of the invention.

FIG. 5A illustrates an example sequence diagram for redirecting data transmission between wireless peripheral devices 120A-H in a wireless docking network, in accordance with an example embodiment of the invention.

In accordance with an example embodiment of the invention, the wireless docking center device 100 may receive from the one or more wireless peripheral devices 120A-H, capability-related information characterizing the one or more wireless peripheral devices 120A_H. For example, the capability-related information may be notification that data output by a first peripheral device is currently directed to a second peripheral device of the one or more peripheral devices 120A-H.

In accordance with an example embodiment of the invention, the wireless docking center device 100 may negotiate with the wireless dockee device 110, redirection-related information. Redirection-related information may originate with the dockee device 110 and be sent to the wireless docking center device. Alternately, the redirection-related information may originate with the wireless docking center device 100, as a recommendation made to the wireless dockee device 110 because the wireless docking center device 100 may know the wireless peripherals 120A-H and their capabilities best. Overall, redirection may be negotiation between the wireless docking center device 100 and the dockee device 110.

In accordance with an example embodiment of the invention, the wireless dockee device may analyze the received capability-related information and redirection-related information, and perform an action with respect to first and second peripheral devices of the one or more wireless peripheral devices, for redirection of the data, based on the analysis.

In accordance with an example embodiment of the invention, consider that a Karaoke application is running in a smartphone (WD), which may be connected to different peripherals through the WDC as follows:

wireless microphone for capturing audio (audio input), audio set for playing the captured audio along with the background music coming from the Karaoke application (audio output), and big monitor (TV set) for displaying the text and background video of a song (video output).

In accordance with an example embodiment of the invention, the WDC knows (e.g., through the signaling between the WD and WDC using the docking protocol in a docking setup, active peripherals connected to the WDC, and the data transmission between the WDC and WD/PFs) that Karaoke application is running in the WD, the audio input coming from the microphone is consumed in the audio set, and the song text and background video is displayed in the TV set. The WDC redirects the audio from the microphone directly to the audio set without sending the audio data to the WD with the Karaoke application first. Here, the WDC has an additional responsibility of mixing and synchronizing audio from the microphone and music from the WD, and then transmit the mixed audio signal to the audio set, so that the synchronized song and music are played in the audio set. In essence, WDC works as a mixer on behalf of the Karaoke application, and thus needs to inform the Karaoke application in the WD about this, so that the application knows about it and may adjust the operations accordingly. The WDC also informs the application in WD about redirecting audio from the microphone to audio set. The communication between WDC and WD, mentioned above, is mostly for coordination of roles and activities, and attributed as Coordination Signaling from now on. The relevant information flow between WD, WDC, microphone and audio set is shown in FIG. 5A.

Figure 5B:
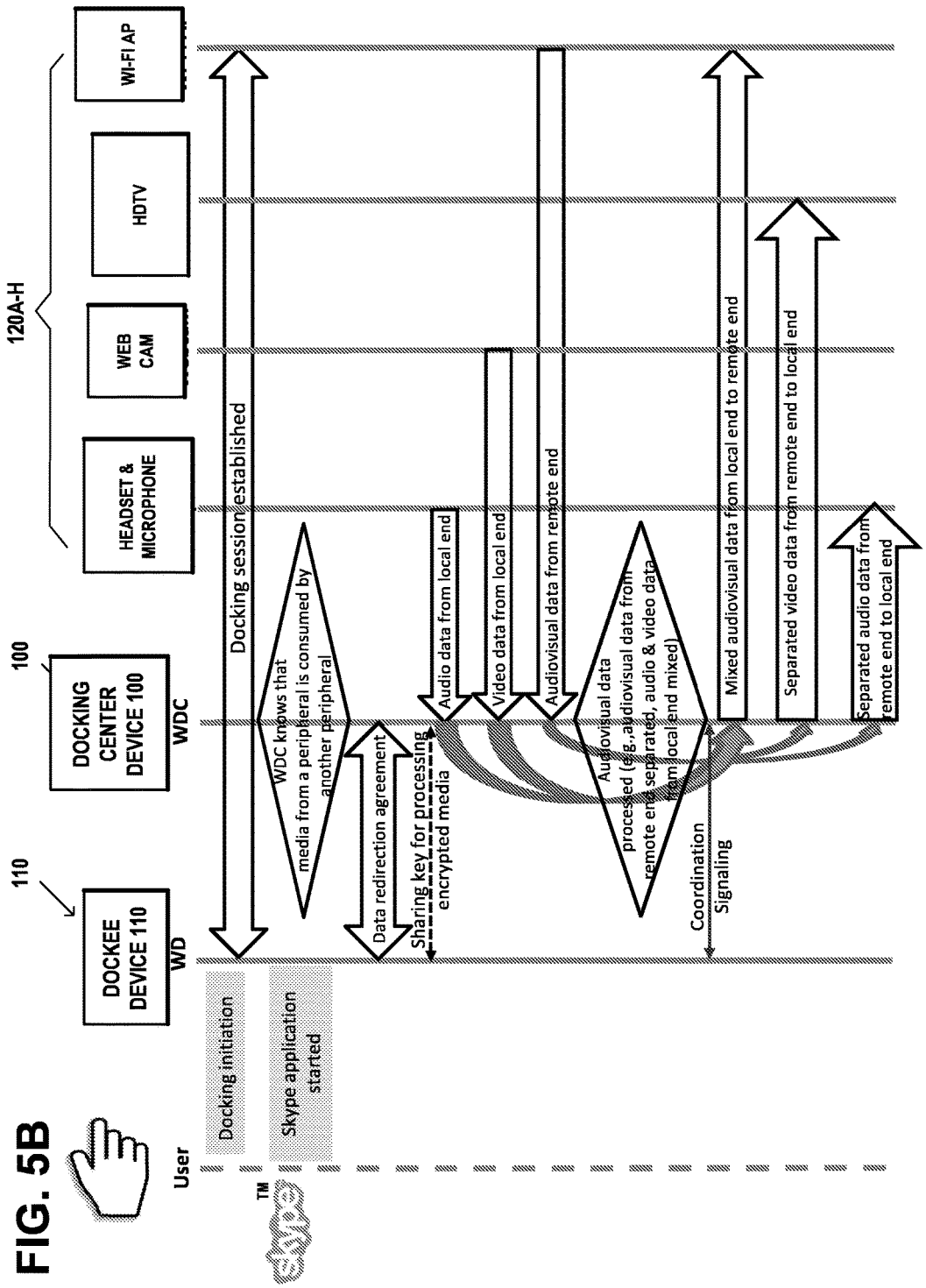
FIG. 5B illustrates another example sequence diagram for redirecting data transmission between peripherals in a wireless docking network, in accordance with an example embodiment of the invention.

FIG. 5B illustrates another example sequence diagram for redirecting data transmission between peripherals in a wireless docking network, in accordance with an example embodiment of the invention.

In accordance with an example embodiment of the invention, redirecting of audiovisual content may be a voice/video call (e.g., Skype™). Let us consider that a user of a WD is using the Internet access provided by the WDC for a Skype call. In this docking case, the WD is connected to a headset, a TV set and Wi-Fi AP via the WDC. WDC knows based on the communication between the WD and WDC using the docking protocol that the audio/video stream of the Skype call is consumed by the headset (audio) and TV set (video) .The WDC negotiates with the WD (or based on the pre-settings to allow 'redirect' whenever possible, or in the beginning of the docking session) of redirecting the audio and video streams. WDC separates the streams and redirects the audio stream to the headset and video stream to the TV set directly. At the same time the WDC informs the Skype application running in the WD over docking protocol about the media processing and redirection in/by the WDC in terms of Coordination Signaling.

In accordance with an example embodiment of the invention, if the user is using a webcam and a microphone, which are external peripherals to the WD, to capture video and audio locally for the call, the streams may be mixed and redirected directly through the WDC towards the Wi-Fi AP for the remote end of the call. The relevant information flow during a Skype call for the media redirection by the WDC including WD, WDC, headset & microphone, webcam, TV set and Wi-Fi AP is shown in FIG. 5B.

In accordance with an example embodiment of the invention, redirecting case may be when a camcorder is used for capturing an event in terms of audiovisual stream, and the stream is forwarded to a big screen (TV set) for playing. Here, an application in WD is controlling the operation, while the WD is connected to a camcorder (audio/video input), TV set (video output), and audio set (audio output) via WDC. Here, the WDC redirects the audio stream to audio set and video stream to TV set. Before the redirection, the WDC needs to separate the stream, and also informs the application in WD about the redirection in terms of Coordination Signaling.

In accordance with an example embodiment of the invention, redirection media content by the WDC may be forwarding print data directly from mass storage to a printer. Here, the WD is connected to a mass storage and a printer via WDC. Upon realizing that an application in WD made a print request of a content stored in the mass storage, the WDC directly forwards (redirect) the data from the mass storage to the printer, and informs the application in WD about this redirection over the docking protocol.

In accordance with an example embodiment of the invention, the WDC may have additional responsibility of e.g., mixing, separating and directing media to the right peripheral on behalf of the application in WD, which is using the docking setup. Hence, it is advantageous that the application and WDC are working in coordination.

In accordance with an example embodiment of the invention, the WDC may also agree (negotiate) with the WD about redirecting certain media beforehand to avoid any confusion and overlap. The agreement may be made as part of capability negotiation at the beginning of establishing a docking session. Alternatively, the WDC may agree about it only when it notes a need for redirection. In any case, the means for agreement may be part of docking protocol.

Figure 5C:
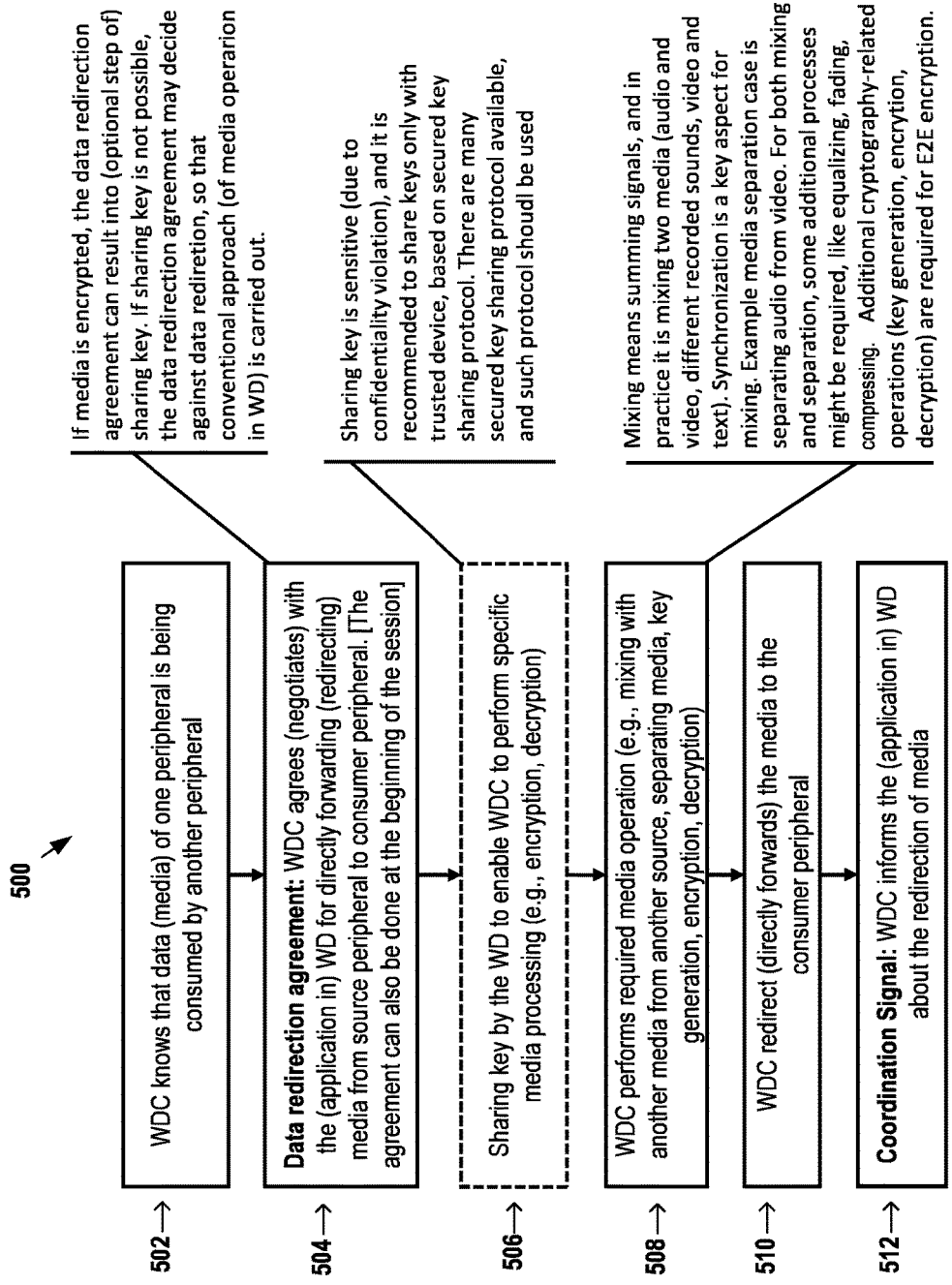
FIG. 5C illustrates an example flow diagram for redirecting data transmission between peripherals in a wireless docking network, in accordance with an example embodiment of the invention.

FIG. 5C illustrates an example flow diagram 500 of an example process for redirecting data transmission between peripherals in a wireless docking network, in accordance with an example embodiment of the invention. The steps in the example process may be as follows:

Step 502: WDC knows that data (media) of one peripheral is being consumed by another peripheral.

Step 504: Data redirection agreement: WDC agrees (negotiates) with the (application in) WD for directly forwarding (redirecting) media from source peripheral to consumer peripheral. [The agreement can also be done at the beginning of the session. If media is encrypted, the data redirection agreement can result into (optional step of) sharing key. If sharing key is not possible, the data redirection agreement may decide against data redirection, so that conventional approach (of media operation in WD) is carried out.

Step 506: Sharing key by the WD to enable WDC to perform specific media processing (e.g., encryption, decryption). Sharing key is sensitive (due to confidentiality violation), and it is recommended to share keys only with trusted device, based on secured key sharing protocol. There are many secured key sharing protocol available, and such protocol should be used.

Step 508: WDC performs required media operation (e.g., mixing with another media from another source, separating media, key generation, encryption, decryption). Mixing means summing signals, and in practice it is mixing two media (audio and video, different recorded sounds, video and text). Synchronization is a key aspect for mixing. Example media separation case is separating audio from video. For both mixing and separation, some additional processes might be required, like equalizing, fading, compressing. Additional cryptography-related operations (key generation, encryption, decryption) are required for end-to-end (E2E) encryption.

Step 510: WDC redirect (directly forwards) the media to the consumer peripheral.

Step 512: Coordination Signal: WDC informs the (application in) WD about the redirection of media.

In summary, in accordance with an example embodiment of the invention, the WDC may manage direct communication for media (user plane) between two (or more) peripherals in a docking solution, when one peripheral(s) is consuming the media from another peripheral(s), while for the control plan communication the WD is still involved for coordination and management.

In accordance with an example embodiment of the invention, although docking system is mentioned here explicitly, the idea may be applied to any solution or system where multiple devices are connected to a central entity e.g., in a star network topology.

Figure 5D:
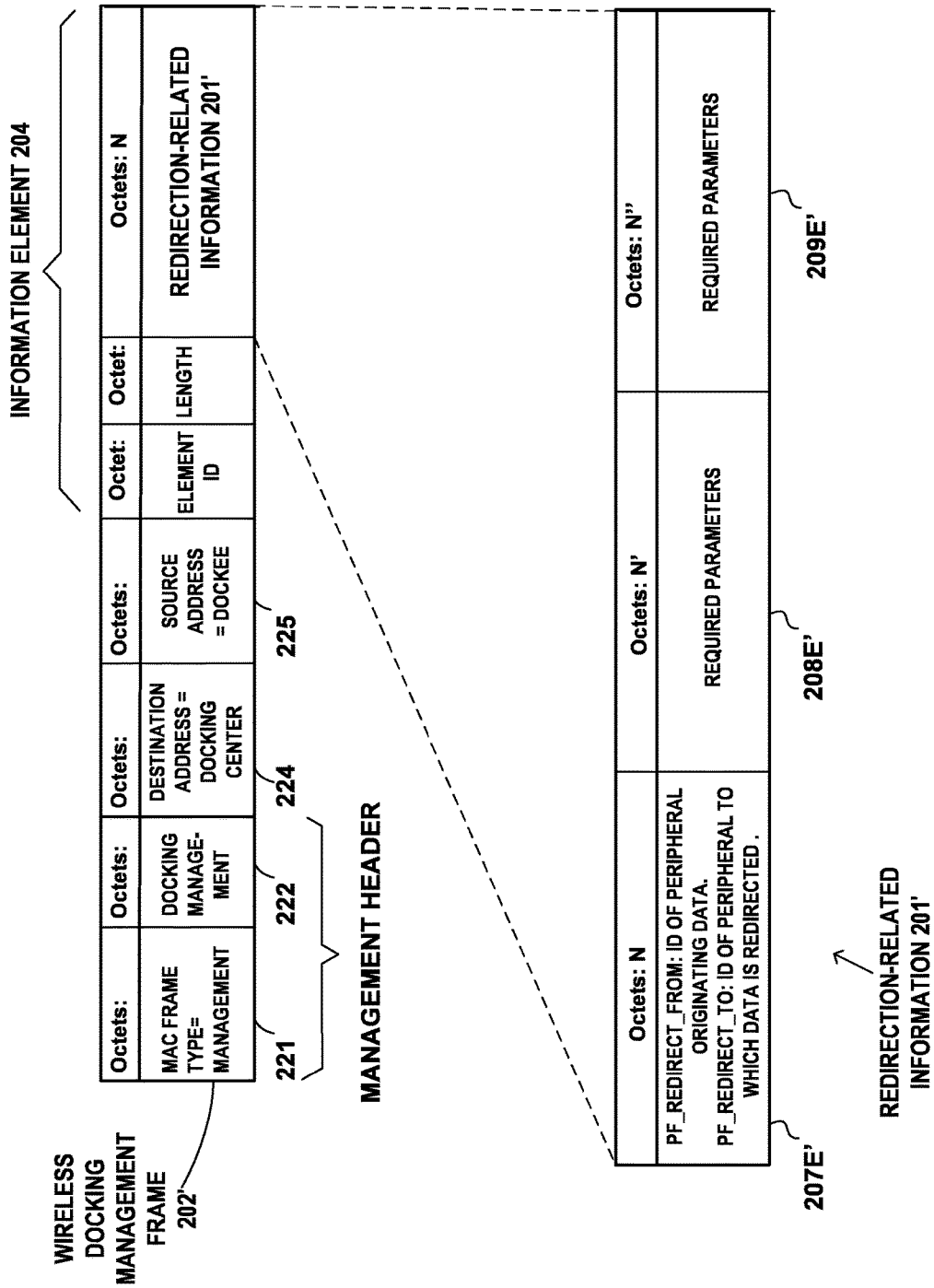
FIG. 5D illustrates an example format for a wireless docking management frame for redirecting data transmission between peripherals, in accordance with an example embodiment of the invention.

FIG. 5D illustrates an example format for a wireless docking management frame 202', in accordance with an example embodiment of the invention. The example wireless docking management frame 202 may be a management frame 221/222 transmitted by a wireless dockee device 110 at source address 225 to the wireless docking center device 100 at address 224, to deliver the information element 204 containing the redirection-related information 201'. In accordance with an example embodiment of the invention, the wireless docking center device 100 may negotiate with the wireless dockee device 110, redirection-related information. Overall, redirection may be negotiation between the wireless docking center device 100 and the dockee device 110. In accordance with an example embodiment of the invention, the redirection-related information 201' may include:

207E': PF_redirect_from: ID of peripheral originating data.

PF_redirect_to: ID of peripheral to which data is redirected.

208E': required parameters

209E': required parameters

In accordance with an example embodiment of the invention, the agreement/negotiation between WDC and WD may enable WDC to directly forward (redirect) media to a peripheral, capability negotiation mechanism may be extended. For example, wireless docking capabilities element may have a bit for this redirect media support (in case the docking protocol is defined in binary format), or "redirect_media" as ASCII texts (in case the protocol is defined in xml format) to indicate the support for the idea presented in the invention. Including the redirect specific bit or ASCII texts in a request or response indicate that the device issuing the request or response support the fields, so that the receiver of the request or response may act accordingly.

In accordance with an example embodiment of the invention, the WDC may indicate WD about media redirection, PF_STATUS information may be extended. PF_STATUS information describes the Peripheral Functions managed by a WDC. Redirection related fields may be included in the data structure of the PF_STATUS information. For example, following fields may be added:

PF_redirect_to: The ID (PF_ID) of the peripheral where the data of this peripheral is redirected to.

PF_redirect_from: The ID (PF_ID) of the peripheral from where the data is redirected to this peripheral.

The names for different fields are just example, and different names may be used in standard or other documents.

E. Summary Redirect Data Transmission Between Peripherals

Summary Docking Center Method

Example Embodiment 1

A method, comprising:

receiving, by a wireless docking center device, from one or more wireless peripheral devices, capability-related information characterizing the one or more wireless peripheral devices;

negotiating, by the wireless docking center device, with a wireless dockee device, redirection-related information; and analyzing, by the wireless docking center device, the received capability-related information and redirection-related information, and performing an action with respect to first and second peripheral devices of the one or more wireless peripheral devices, for redirection of the data, based on the analysis.

Example Embodiment 2

A method of Example embodiment 1, wherein the redirection-related information is an ID of the first peripheral device originating the data and an ID of the second peripheral device to which the data is to be redirected.

SUMMARY DOCKEE METHOD

Example Embodiment 1

A method, comprising:

receiving, by a wireless dockee device, from wireless docking center device, capability-related information characterizing the one or more wireless peripheral devices;

negotiating, by the wireless dockee device, with the wireless docking center device, redirection-related information; and analyzing, by the wireless dockee device, the received capability-related information and redirection-related information, and performing an action with respect to first and second peripheral devices of the one or more wireless peripheral devices, for redirection of the data, based on the analysis.

Example Embodiment 2

A method of Example embodiment 1, wherein the redirection-related information is an ID of the first peripheral device originating the data and an ID of the second peripheral device to which the data is to be redirected.

Example Embodiment 3

The method of Example embodiment 1, wherein the wireless dockee device receives from one or more wireless peripheral devices, capability-related information characterizing the one or more wireless peripheral devices.

Using the description provided for the several example embodiments disclosed herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes may be made to the specific example embodiments without departing from the spirit and scope of the invention.

What is claimed is:

1. A method, comprising:
receiving, by a wireless peripheral device, a request from a wireless docking center device, to activate and announce its availability to a user, according to an identified application;
activating and announcing, by the wireless peripheral device, its availability to the user, according to the identified application; and
transmitting, by the wireless peripheral device, to the wireless docking center device, in response to the request, an acknowledgement of the request, that the wireless peripheral devices can satisfy the request.

2. The method of claim 1, further comprising:
transmitting, by the wireless peripheral device, to the wireless docking center device, power-related information of a battery powering the wireless peripheral device;
receiving, by the wireless peripheral device, from the wireless docking center device, a command to perform services required by planned use-related information of a wireless dockee device associated with the wireless docking center device, based on the transmitted power-related information.

3. The method of claim 2, further comprising:
receiving, by the wireless peripheral device, from the wireless docking center device, a power status request to the wireless peripheral device, based on planned use-related information of the wireless dockee device associated with the wireless docking center device; and
transmitting, by the wireless peripheral device, to the wireless docking center device, in response to the power status request, power related information characterizing battery power of a battery powering the wireless peripheral device.

4. The method of claim 3, wherein the wireless peripheral device comprises a charging system for a vehicle battery, the transmitted power-related information is a present charging state of the vehicle battery, and the planned use-related information is a planned traveling route for the vehicle;
receiving, by the charging system, from the wireless docking center device, information for recharging the vehicle battery.

5. The method of claim 1, further comprising:
transmitting, by the wireless peripheral device, to the wireless docking center device, capability-related information characterizing the wireless peripheral device.

6. The method of claim 1, further comprising:
receiving, by the wireless peripheral device, from the wireless docking center device, information for automatically performing an action with respect to the identified application.

7. The method of claim 2, further comprising:
transmitting, by the wireless peripheral device, to the wireless dockee device associated with the wireless docking center device, capability-related information characterizing the wireless peripheral device.

8. An apparatus, comprising:
at least one processor;
at least one memory including computer program code;
the at least one memory and the computer program code configured to, with the at least one processor, cause the apparatus at least to:
receive a request from a wireless docking center device, to activate and announce its availability to a user, according to an identified application;
activate and announce its availability to the user, according to the identified application; and
transmit to the wireless docking center device, in response to the request, an acknowledgement of the request, that the apparatus can satisfy the request.

9. The apparatus of claim 8, further comprising:
the at least one memory and the computer program code configured to, with the at least one processor, cause the apparatus at least to:
transmit to the wireless docking center device, power-related information of a battery powering the wireless peripheral device;
receive from the wireless docking center device, a command to perform services required by planned use-related information of a wireless dockee device associated with the wireless docking center device, based on the transmitted power-related information.

10. The apparatus of claim 9, further comprising:
the at least one memory and the computer program code configured to, with the at least one processor, cause the apparatus at least to:
receive from the wireless docking center device, a power status request to the wireless peripheral device, based on planned use-related information of the wireless dockee device associated with the wireless docking center device; and
transmit to the wireless docking center device, in response to the power status request, power related information characterizing battery power of a battery powering the wireless peripheral device.

11. The apparatus of claim 10, further comprising:
wherein the wireless peripheral device comprises a charging system for a vehicle battery, the transmitted power-related information is a present charging state of the vehicle battery, and the planned use-related information is a planned traveling route for the vehicle;
the at least one memory and the computer program code configured to, with the at least one processor, cause the apparatus at least to:
receive from the wireless docking center device, information for recharging the vehicle battery.

12. The apparatus of claim 8, further comprising:

the at least one memory and the computer program code configured to, with the at least one processor, cause the apparatus at least to:

transmit to the wireless docking center device, capability-related information characterizing the wireless peripheral device.

13. The apparatus of claim 8, further comprising:

the at least one memory and the computer program code configured to, with the at least one processor, cause the apparatus at least to:

receive from the wireless docking center, information for automatically performing an action with respect to the identified application.

14. The apparatus of claim 9, further comprising:

the at least one memory and the computer program code configured to, with the at least one processor, cause the apparatus at least to:

transmit to the wireless dockee device associated with the wireless docking center device, capability-related information characterizing the wireless peripheral device.

15. A computer program product comprising computer executable program code recorded on a computer readable non-transitory storage medium, the computer executable program code comprising:

code for receiving, by a wireless peripheral device, a request from a wireless docking center device, to activate and announce its availability to a user, according to an identified application;

code for activating and announcing, by the wireless peripheral device, its availability to the user, according to the identified application; and code for transmitting, by the wireless peripheral device, to the wireless docking center device, in response to the request, an acknowledgement of the request, that the wireless peripheral devices can satisfy the request.

16. The computer program product of claim 15, further comprising:

code for transmitting, by the wireless peripheral device, to the wireless docking center device, power-related information of a battery powering the wireless peripheral device;

code for receiving, by the wireless peripheral device, from the wireless docking center device, a command to perform services required by planned use-related information of a wireless dockee device associated with the wireless docking center device, based on the transmitted power-related information.

17. The computer program product of claim 16, further comprising:

code for receiving, by the wireless peripheral device, from the wireless docking center device, a power status request to the wireless peripheral device, based on planned use-related information of the wireless dockee device associated with the wireless docking center device;

and code for transmitting, by the wireless peripheral device, to the wireless docking center device, in response to the power status request, power related information characterizing battery power of a battery powering the wireless peripheral device.

18. The computer program product of claim 17, further comprising:

wherein the wireless peripheral device comprises a charging system for a vehicle battery, the transmitted power-related information is a present charging state of the vehicle battery, and the planned use-related information is a planned traveling route for the vehicle;

code for receiving, by the charging system, from the wireless docking center device, information for recharging the vehicle battery.

19. The computer program product of claim 15, further comprising:

code for transmitting, by the wireless peripheral device, to the wireless docking center device, capability-related information characterizing the wireless peripheral device.

20. The computer program product of claim 15, further comprising:

code for receiving, by the wireless peripheral device, from the wireless docking center, information for automatically performing an action with respect to the identified application.

* * * * *